(12) United States Patent
McCalib, Jr.

(10) Patent No.: US 12,162,704 B2
(45) Date of Patent: Dec. 10, 2024

(54) AUTOMATED PRODUCT UNLOADING, HANDLING, AND DISTRIBUTION

(71) Applicant: Lab0, Inc., Washougal, WA (US)

(72) Inventor: David Bruce McCalib, Jr., Ridgefield, WA (US)

(73) Assignee: Lab0, Inc., Washougal, WA (US)

(*) Notice: Subject to any disclaimer, the term of this patent is extended or adjusted under 35 U.S.C. 154(b) by 0 days.

(21) Appl. No.: 18/649,455

(22) Filed: Apr. 29, 2024

(65) Prior Publication Data

US 2024/0279008 A1     Aug. 22, 2024

Related U.S. Application Data

(63) Continuation of application No. PCT/US2022/079613, filed on Nov. 10, 2022.

(Continued)

(51) Int. Cl.
    *B65G 67/24*     (2006.01)
    *B25J 9/00*     (2006.01)
    (Continued)

(52) U.S. Cl.
    CPC ............ *B65G 67/24* (2013.01); *B25J 9/0084* (2013.01); *B25J 9/0093* (2013.01); *B25J 9/1612* (2013.01); *B25J 9/1664* (2013.01); *B25J 9/1666* (2013.01); *B25J 9/1697* (2013.01); *B25J 19/021* (2013.01); *B65B 11/045* (2013.01); *B65G 47/90* (2013.01);
    (Continued)

(58) Field of Classification Search
    CPC ...... B65G 67/24; B65G 47/90; B65G 47/905; B65G 57/24; B65G 61/00; B65G 65/005; B65G 65/02; B65G 2203/0233; B65G 2203/041; B25J 9/0084; B25J 9/0093; B25J 9/1612; B25J 9/1664; B25J 9/1666; B25J 9/1697; B25J 19/021; B65B 11/045
    See application file for complete search history.

(56) References Cited

U.S. PATENT DOCUMENTS 2,515,936 A     7/1950     Armistead, Jr.
3,844,422 A     10/1974     Smith et al.
(Continued)

FOREIGN PATENT DOCUMENTS

CA     2515936 A1     8/2004
JP     2012144327 A     8/2012
(Continued)

*Primary Examiner* — Thomas Randazzo
(74) *Attorney, Agent, or Firm* — Rowan TELS LLC

(57) ABSTRACT

Disclosed is a robotic system including a telescoping transport conveyor with an automated unloader attached. The automated unloader includes a loading conveyor with at least two articulated robots attached to the first loading conveyor end. The automated unloader includes a control system with logic controlling the unloading of material to be handled from a transport container onto the telescoping transport conveyor, and thence to an automated palletizing system, where materials are loaded on pallets and supported by a pallet sleeve during storage or during transport to a stabilization system where pallet loads are stretch wrapped. Further disclosed are methods for controlling and operating the same to fully automate product unloading, handling, and distribution throughout a material handling facility.

20 Claims, 27 Drawing Sheets

Related U.S. Application Data

(60) Provisional application No. 63/278,022, filed on Nov. 10, 2021.

(51) Int. Cl.
*B25J 9/16* (2006.01)
*B25J 19/02* (2006.01)
*B65B 11/04* (2006.01)
*B65G 47/90* (2006.01)
*B65G 57/24* (2006.01)
*B65G 61/00* (2006.01)
*B65G 65/00* (2006.01)
*B65G 65/02* (2006.01)

(52) U.S. Cl.
CPC .......... *B65G 47/905* (2013.01); *B65G 57/24* (2013.01); *B65G 61/00* (2013.01); *B65G 65/005* (2013.01); *B65G 65/02* (2013.01); *B65G 2203/0233* (2013.01); *B65G 2203/041* (2013.01)

(56) References Cited

U.S. PATENT DOCUMENTS

| | | | |
|---|---|---|---|
| 4,500,001 A | 2/1985 | Daniels | |
| 5,046,303 A | 9/1991 | Becicka et al. | |
| 5,139,388 A | 8/1992 | Martin | |
| 5,755,550 A | 5/1998 | Brandt et al. | |
| 6,860,088 B2 | 3/2005 | Goodman | |
| 7,266,422 B1 | 9/2007 | DeMotte et al. | |
| 7,634,894 B2 | 12/2009 | Yohe et al. | |
| 8,074,431 B1 | 12/2011 | Pierson et al. | |
| 8,539,739 B2 | 9/2013 | Pierson et al. | |
| 9,126,770 B1 | 9/2015 | Widder et al. | |
| 9,315,345 B2 * | 4/2016 | Girtman | B65G 61/00 |
| 9,457,970 B1 | 10/2016 | Zevenbergen et al. | |
| 9,475,660 B2 | 10/2016 | Batrin et al. | |
| 9,511,957 B1 | 12/2016 | Saylor | |
| 9,688,489 B1 | 6/2017 | Zevenbergen et al. | |
| 9,744,669 B2 | 8/2017 | Wicks et al. | |
| 10,099,867 B2 | 10/2018 | Ge et al. | |
| 10,336,562 B2 * | 7/2019 | Girtman | B65G 67/26 |
| 10,392,199 B2 | 8/2019 | Karpala | |
| 10,392,203 B2 | 8/2019 | Saylor | |
| 10,464,762 B2 | 11/2019 | Girtman | |
| 10,556,761 B2 | 2/2020 | Criswell | |
| 10,633,202 B2 | 4/2020 | McMurrough et al. | |
| 10,696,494 B1 | 6/2020 | Diankov et al. | |
| 10,786,899 B2 | 9/2020 | Kimoto | |
| 10,843,882 B2 | 11/2020 | Worsley et al. | |
| 10,994,949 B2 | 5/2021 | Chavez et al. | |
| 11,020,854 B2 | 6/2021 | Kanunikov et al. | |
| 11,062,457 B2 * | 7/2021 | Yu | G06V 10/255 |
| 11,780,101 B2 * | 10/2023 | Diankov | G06T 1/0014 382/153 |
| 2008/0046116 A1 | 2/2008 | Khan et al. | |
| 2010/0068027 A1 | 3/2010 | Mitchell | |
| 2010/0146907 A1 | 6/2010 | Fritzsche et al. | |
| 2010/0324729 A1 | 12/2010 | Ruge | |
| 2014/0199142 A1 * | 7/2014 | Criswell | B65G 57/20 414/809 |
| 2014/0341694 A1 * | 11/2014 | Girtman | B65G 59/02 414/796.5 |
| 2017/0305694 A1 * | 10/2017 | McMurrough | G06T 17/10 |
| 2018/0009611 A1 | 1/2018 | Tempany | |
| 2018/0111769 A1 * | 4/2018 | Yuvaraj | B25J 9/1687 |
| 2018/0194575 A1 | 7/2018 | Anderson | |
| 2018/0222693 A1 | 8/2018 | Heston | |
| 2020/0078938 A1 | 3/2020 | Bradski et al. | |
| 2020/0276713 A1 * | 9/2020 | Zhang | G06T 7/85 |
| 2021/0031373 A1 | 2/2021 | Drumwright et al. | |
| 2021/0122589 A1 * | 4/2021 | Griggs | B65G 67/08 |
| 2021/0347588 A1 * | 11/2021 | Harres | B65G 67/24 |
| 2021/0402622 A1 * | 12/2021 | Hartmann | B25J 15/10 |
| 2022/0097243 A1 * | 3/2022 | Makhal | B25J 19/023 |
| 2023/0062676 A1 * | 3/2023 | Patil | B25J 9/0084 |
| 2023/0106508 A1 * | 4/2023 | Allen | B65G 67/24 700/225 |
| 2023/0150137 A1 * | 5/2023 | Sun | B25J 9/1697 700/248 |

FOREIGN PATENT DOCUMENTS

| | | |
|---|---|---|
| KR | 100984538 B1 | 10/2010 |
| WO | 2018029271 A1 | 2/2018 |
| WO | 2021091926 A1 | 5/2021 |

* cited by examiner

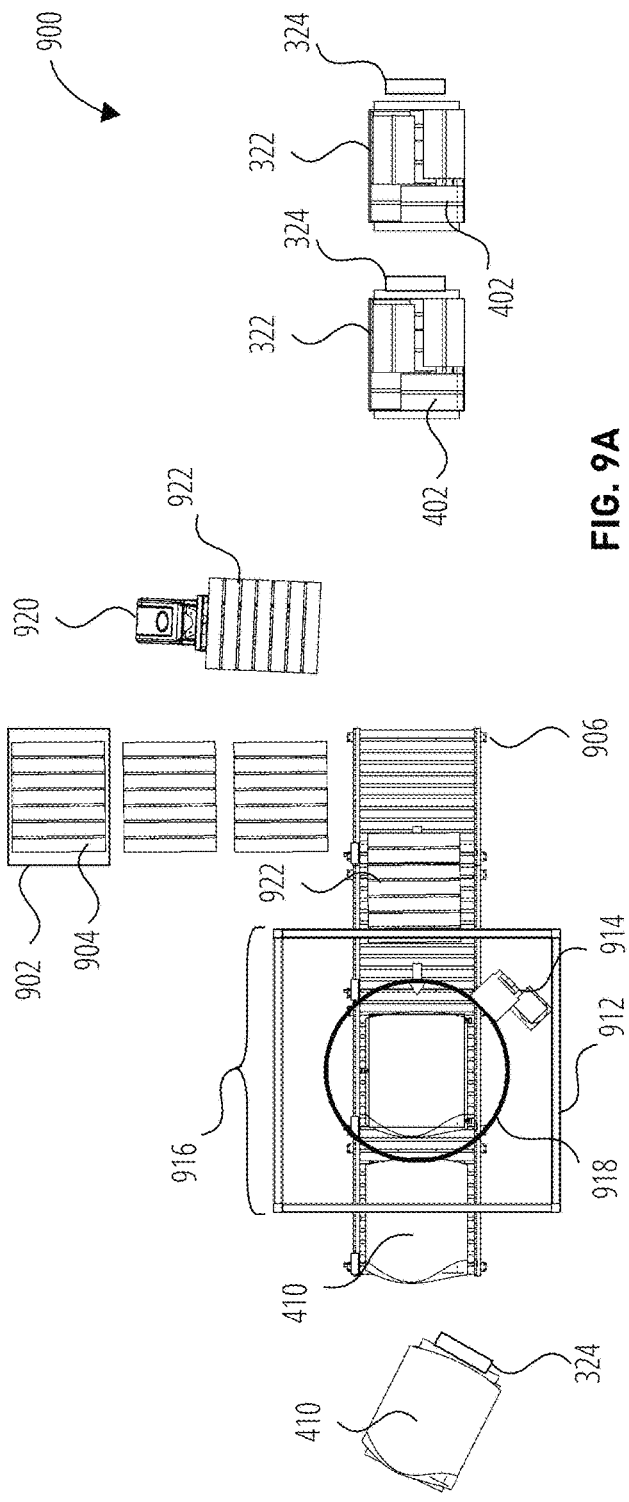
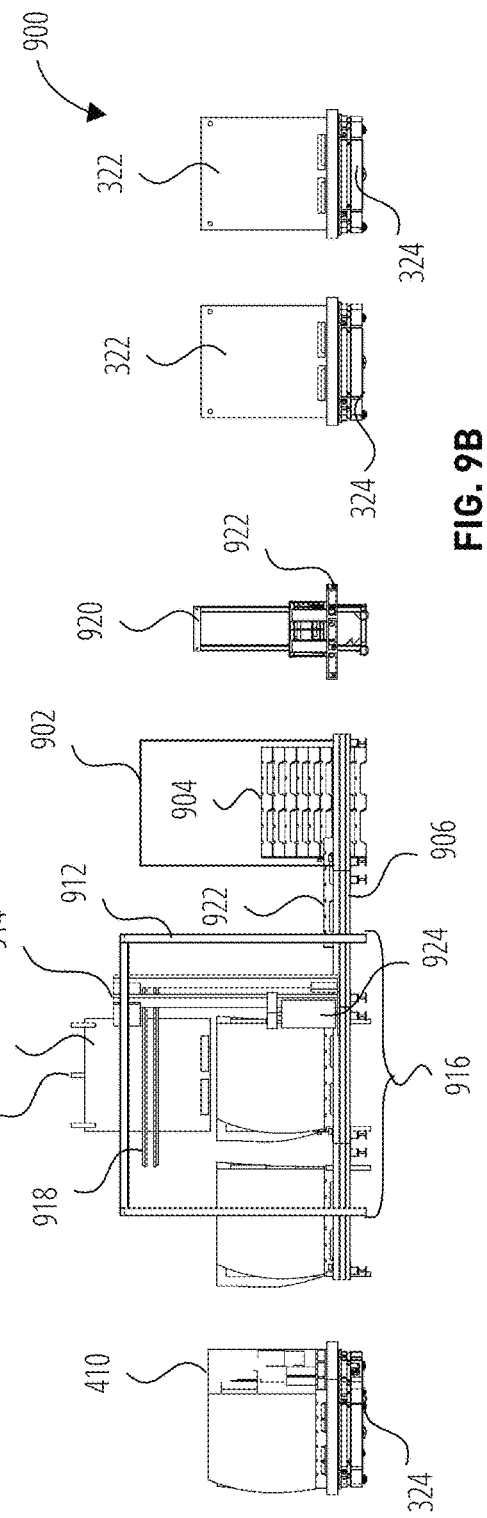
FIG. 9A
FIG. 9B

AUTOMATED PRODUCT UNLOADING, HANDLING, AND DISTRIBUTION

CROSS-REFERENCE TO RELATED APPLICATIONS

This application is a continuation of International Patent Application designating the U.S. Ser. No. PCT/US22/79613, filed Nov. 10, 2022, which claims the benefit of U.S. provisional patent application Ser. No. 63/278,022, filed on Nov. 10, 2021, each of which is incorporated herein by reference in its entirety.

BACKGROUND

With the transportation and distribution of goods through logistical systems, manual loading and unloading of products/packages in trucks, trailers, and containers is a resource-intensive endeavor. The inbound receiving and outbound shipping docks found in logistical systems such as warehousing, distribution, cross-docking, etc., involve manual unloading/loading of freight from trailers, trucks, and shipping containers. In most examples, the loading and unloading process may take multiple hours to complete and is typically done manually or with the aid of conveyor systems to aid in the material flow. The typical rate per person to unload and palletize in these operations is around 250 to 400 cases per hour, which may typically result in three trucks turned per day per the associated role that will be filled with multiple people throughout the day. In an effort to turn the loading docks faster, multiple associated roles may work collaboratively. On average in the United States, with the fully burdened labor rate, the cost of manual unloading per day is over $1000 USD per dock when two to three associated roles are assigned this task.

With the distributed nature of global logistics, when products are shipped directly from a manufacturer to the first node of distribution, the freight may commonly be configured and fluid loaded to optimize for shipping density; as such, products are grouped together when having the same single Stock Keeping Unit (SKU). Typically, fluid-loaded freight arrives in one of three configurations: single SKU, snake or wave SKU, or mixed-load containerization. In snake or wave SKU loading, there are multiple SKUs loaded in the fluid load container, and each unique SKU is loaded next to similar SKUs. In mixed-load containerization, multiple SKUs are loaded in a container without a specific ordering, and each SKU is randomly located.

Transportation from the container into the warehouse is an arduous, repetitive task plagued by high turnover of human labor due to the environment and ergonomics of manually lifting products that may weigh as much as eighty pounds. Moving materials in these environments takes a constant rotation of labor to minimize risk and exposure to injury. It is difficult to load cases (freight) manually onto a pallet in the trailer or shipping containers so that the stacked cases are stable when cases of different sizes and weights are presented in random order for palletizing. Thus, unloading typically requires pallet load stabilization, and pallets are usually stabilized by manually shrink-wrapping plastic material around them and the cases they carry to prevent inadvertent displacement of the cases during downstream transportation. In addition to the manpower resources that are expended in loading and/or unloading a truck, trailer, or container, the downtime of the truck sitting idle at a loading dock may contribute to higher costs due to paying a truck driver to sit idle while the truck or trailer is being loaded/unloaded), or from fees associated with a limited supply of shipping containers.

At a later point in the logistical system value chain, pallets are broken apart to support distribution needs. Inevitably the pallet requires load stabilization of stretch wrapping of plastic material or other means to allow for defect-free transportation across the logistical nodes and within facilities. It is difficult to store and retrieve the pallets and break them down automatically. Typically, the removal of load stabilization plastic stretch wrap is done manually, alongside commercially available systems costing hundreds of thousands of dollars per installation, that typically remove entire layers of the pallet to feed into automated cases storage and retrieval systems.

The intralogistics status-quo involving the transportation of palletized unit loads into and out of facilities is costly and difficult due to the numerous manual interventions that take place in the care of palletization, load stabilization, transportation, storage, and de-palletization within logistical systems. To address this, some efforts have been made toward automation; however, these approaches lack high functional utility and attractive rates and return on investments due to a low degree of elegance in the design architecture, the coupling of too many functions, and poor integration of technologies. In most cases, there are two treatments of automation: one that involves the bulk flow of materials from trailers using parallel conveyors and end-effectors, and another that involves single robotics systems with low levels of perception of the state of packages. With the bulk flow architectures, the packages become jammed and locked during the flow and are damaged. As well, expensive material handling is needed to deal with the bulk unstructured flow of materials. Single industrial robotic systems suffer from low throughput, and utilization of the main robotic degrees of freedom may be less than 50%, as the robot has to pick an item, move to drop it off, and then move back and acquire another item. There exists no design that is able to automatically unload single and snake SKU loads, inspect the materials to be handled, and automatically palletize, transport, and store without stretch wrapping load stabilization techniques.

FIELD OF THE INVENTION

This invention relates to the automatic unloading/loading of fluid-loaded cases of various sizes, shapes, and weights that are transported on trucks, trailers, and shipping containers, as well as the automatic palletization of fright/cases into load-stabilized unit loads of pallets. By way of addition, it relates to the transfer and storage of unit load quantities of packages that enable high levels of automation in the distribution, cross-docking, storage, and shipment of products across logistical systems.

BRIEF SUMMARY

In one aspect, a robotic system includes a telescoping transport conveyor. The robotic system also includes an automated unloader attached to the telescoping transport conveyor, the automated unloader including a loading conveyor with a first loading conveyor end and a second loading conveyor end. The automated unloader includes at least two articulated robots attached to the first loading conveyor end, where each articulated robot includes at least six degrees of freedom, at least one of a two-dimensional (2D) camera and a three-dimensional (3D) camera, and an end effector. The automated unloader includes a grounded base including wheels or tracks, a base support including a pivot, the support attached to the second loading conveyor end, and a translational actuator, where the loading conveyor pivot is configured to allow the raising and lowering of the loading conveyor by extending or retracting the translational actuator. The robotic system also includes a control system with logic to coordinate operation of the at least two articulated robots, where coordination includes the position and the movement of each robot and components of each robot, with respect to time. The logic performs a perception scan of at least a portion of a visible wall of materials to be handled (MTBH), where the perception scan captures a 2D image and a 3D image including 3D point cloud data of MTBH. The logic builds a 6-degrees of freedom pose for each unit of MTBH, including analyzing the 2D image to determine which segment of the 2D image belongs to each MTBH, extrapolates for each unit of MTBH, at least one of the size, orientation, origin of interest, center of mass from the 2D image, queries the 3D image to obtain depth information, orientation of each MTBH in 3D, and dimensions of each side of each MTBH, as expressed in the reference frame of the 2D camera and the 3D camera, and determines a frame of reference of the 2D camera and the 3D camera as a function of a tilting angle of the unloading conveyor and the robots with the attached 2D camera and 3D cameras. The logic determines a primary frame of reference of the automated unloader using at least the frame of reference of 2D camera and the frame of reference of the 3D camera. The logic builds a virtual representation of each unit of the MTBH detected in the perception scan, wherein the virtual representation creates 6-degrees of freedom poses for each unit of MTBH with respect to the primary frame of reference of the automated unloader, then calculates picking poses that each include a picking position and a picking orientation, where the picking positions are in the center of a face of each unit of MTBH, and the picking orientations are normal to one face of each unit of MTBH. The logic determines at least one motion plan using a search-based algorithm with inputs including at least one of the picking poses for each unit of MTBH, minimization of torque on the robot motors, minimization of motion path length, and collision avoidance with other dynamic or static elements of the environment. The logic selects a motion plan based on a scoring algorithm, where the scoring algorithm is based at least in part on picking poses of each unit of MTBH with respect to the other units of MTBH. The logic determines a pickup sequence based at least in part on the selected motion plan for each MTBH, the picking poses of each unit of MTBH with respect to the other units of MTBH, and coordinating operation of the at least two articulated robots. The logic directs the automated unloader to execute the pickup sequence.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9A illustrates a plan view of an automated pallet load stabilization system 900 supported with mobile robotics, the interface between the robotic material handling system according to various embodiments of the present disclosure.

FIG. 9B illustrates a side elevation view of the automated pallet load stabilization system 900 in accordance with one embodiment.

DETAILED DESCRIPTION

The present disclosure relates to automating the entire process of unloading stacked materials to be handled (MTBH) from a trailer or container of a delivery vehicle at a material handling facility by automating the building of pallets, storing, retrieval, transportation of pallets, and de-palletizing into other pallets suitable for distribution, without the need for human assistance and labor. A material handling facility may be a sorting center, shipping center, packing center, distribution center, fulfillment center, or other shipping, handling, or packing facility, among similar facilities. At the material handling facilities, carrier vehicles may deliver packages of inventory, prepackaged orders, and/or other types of packages via trucks, trailers, and other types of shipping containers.

Typically, as vehicles carrying containers arrive at material handling facilities, workers manually unload packages from containers, manually build pallets, and manually apply load stabilization in the form of stretch wrapping. The robotic and automation architecture disclosed herein allows end-to-end automation. By automating the related activities of unloading packages, palletization, load stabilization, transportation, storage, retrieval, and de-palletization at material handling facilities, unloading time, cost, and potential worker injury may be reduced. The end-to-end automated package unloading system, palletization, load stabilization, transportation, storage, and retrieval system of the present disclosure may efficiently unload the multiple layers of packages stacked in the trailer or container received at the material handling facility, convert them into pallets augmented with a pallet sleeve, transport them, place them into storage, retrieve them, and apply load stabilization (e.g., stretch wrapping) automatically through the use of mobile robotic transportation, allowing for all types of typical material handling activities and methods (e.g., sorting, storing, shipping, etc.). The disclosed system uses multiple robotic arms working together to unload containers. It uses multiple perception systems to understand where the MTBH is located in free space.

While the making and using of various embodiments of the present disclosure are discussed in detail below, it should be appreciated that the concepts disclosed herein may be embodied in a wide variety of specific contexts. The specific embodiments discussed herein are merely illustrative of specific ways to make and use the disclosed system and do not delimit the scope of the present disclosure.

Figure 1:
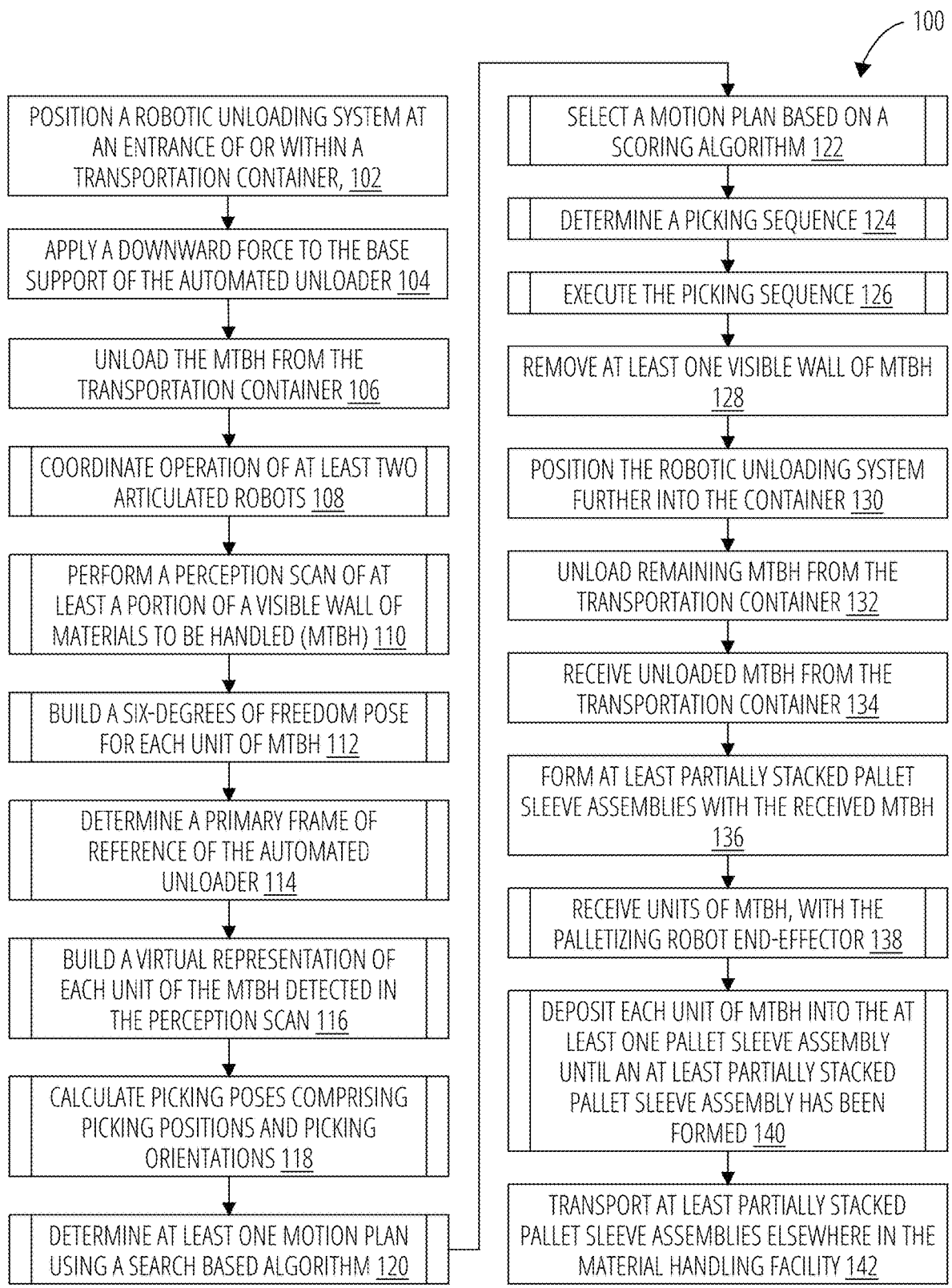
FIG. 1 illustrates an automated unloading and palletizing routine 100 in accordance with one embodiment.
Figure 3A:
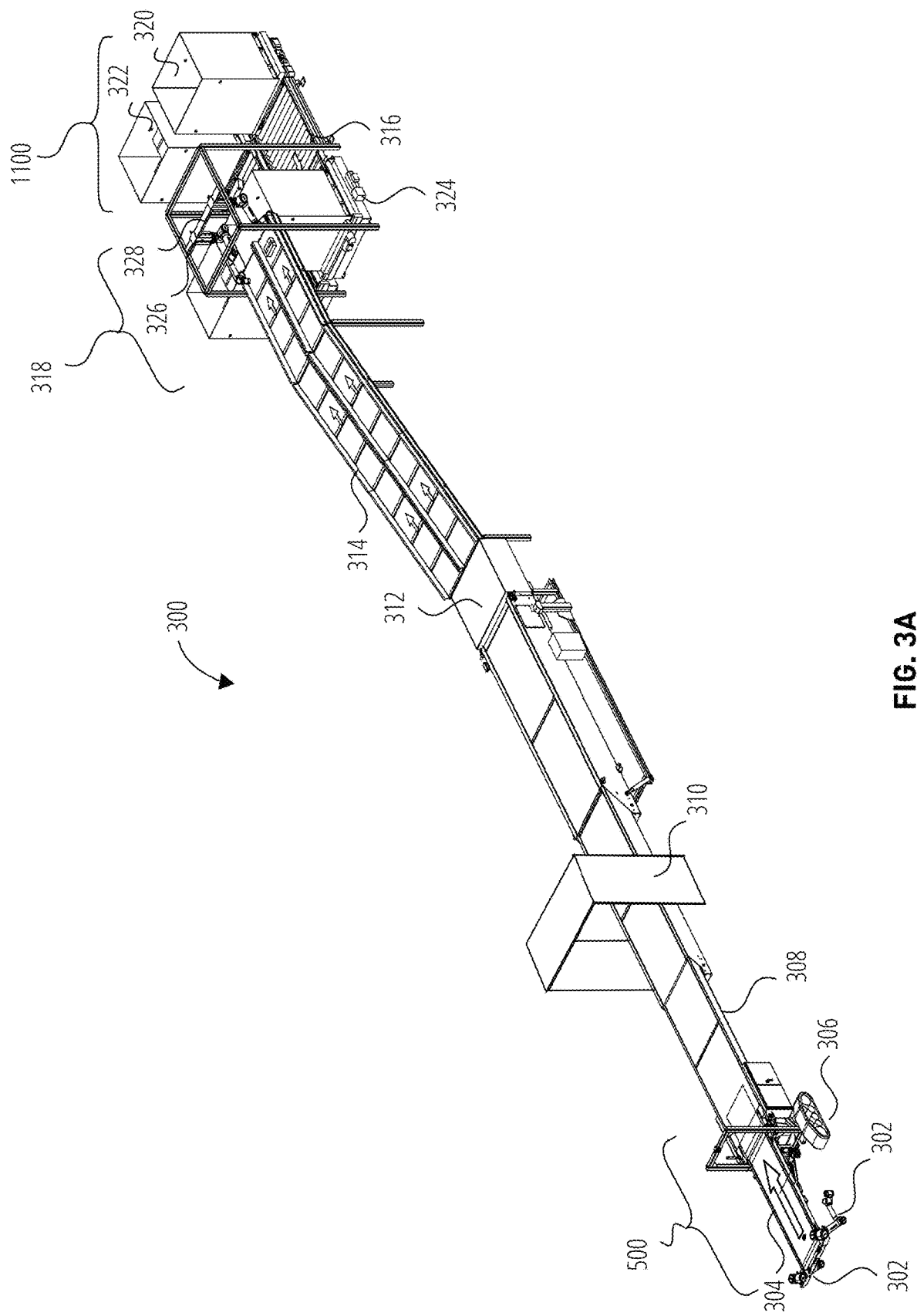
FIG. 3A illustrates a perspective view of a robotic unloading system 300 that may be used to unload packages from vehicle trailers onto a conveyor system and an integrated robotic palletizer according to various embodiments of the present disclosure.
Figure 3B:
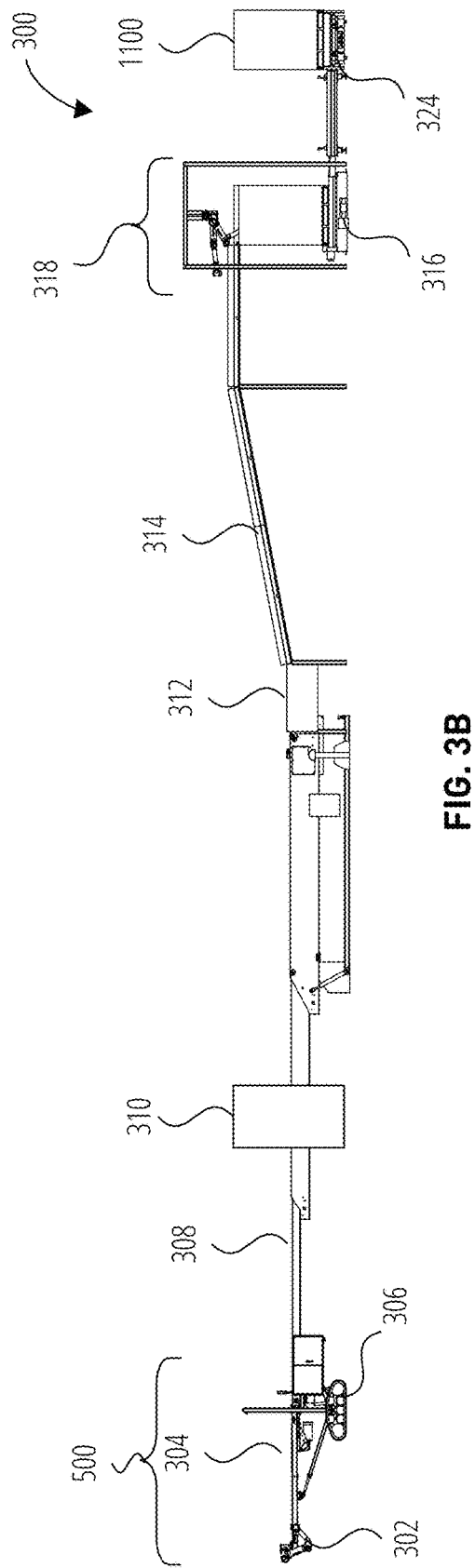
FIG. 3B illustrates a side elevation view of the robotic unloading system 300 in accordance with one embodiment.
Figure 3C:
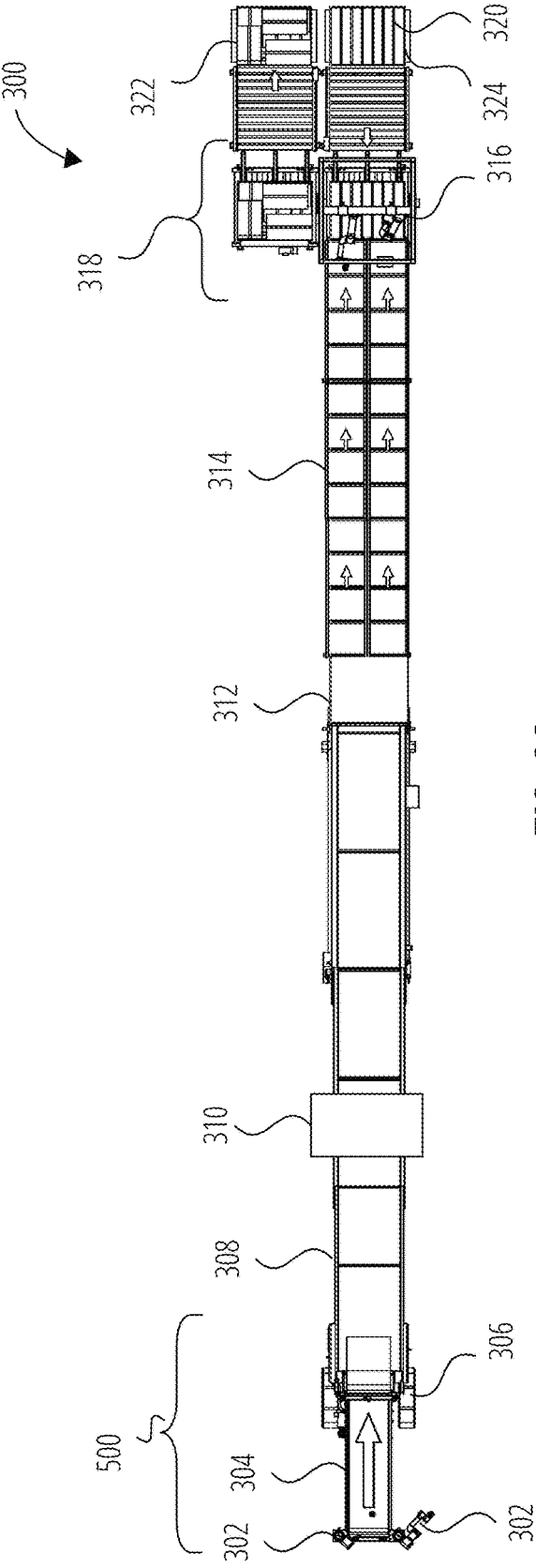
FIG. 3C illustrates a plan view of the robotic unloading system 300 in accordance with one embodiment.

FIG. 1 illustrates an example automated unloading and palletizing routine 100 for unloading MTBH from a transport container docked at a material handling facility through the action of a robotic unloading system 300 such as is illustrated in FIG. 3A through FIG. 3C. Some or all of the steps of automated unloading and palletizing routine 100 may be performed by control systems such as the unloading control system 1300 illustrated in FIG. 13 and the palletizing control system 1400 of FIG. 14, which may interact with other control systems across the material handling facility according to the end-to-end control system diagram 1600 shown in FIG. 16.

Although the example automated unloading and palletizing routine 100 depicts a particular sequence of operations, the sequence may be altered without departing from the scope of the present disclosure. For example, some of the operations depicted may be performed in parallel or in a different sequence that does not materially affect the function of the automated unloading and palletizing routine 100. In other examples, different components of an example device or system that implements the automated unloading and palletizing routine 100 may perform functions at substantially the same time or in a specific sequence. Some or all of automated unloading and palletizing routine 100 may in other embodiments be augmented or replaced by routines such as the automated truck unloading routine 1700 illustrated in FIG. 17 and the pick routine for individual articulated robot 1800 illustrated in FIG. 18, and may be supported by algorithms such as those described with respect to the automated truck unloading flow diagram 1900 of FIG. 19, the detection cache flow diagram 2000 of FIG. 20, the planner flow diagram 2100 of FIG. 21, and the execution flow diagram 2200 of FIG. 22.

According to some examples, the method includes positioning a robotic unloading system at an entrance of or within a transportation container, at block 102. For example, the operations team 412 illustrated in FIG. 4 may position a robotic unloading system at an entrance of or within a transportation container. The robotic unloading system may be a system such as the robotic unloading system 300 illustrated in FIG. 3A through FIG. 3C.

According to some examples, the method includes applying a downward force to the base support of the automated unloader at block 104. For example, the telescoping transport conveyor 308 illustrated in FIG. 3A may apply a downward force to the base support of the automated unloader. The application of this downward force preloads and stabilizes the automated unloader 500 against imbalanced loading as MTBH is picked up and dropped, and maintains strong grounded contact with uneven or sloped container floors.

According to some examples, the method includes unloading the MTBH from the transportation container at block 106. For example, the robotic unloading system 300 illustrated in FIG. 3A may unload the MTBH from the transportation container. The actions of block 104 may be supported by the logical algorithm described in subroutine block 108 through subroutine block 126.

According to some examples, the method includes coordinating operation of at least two articulated robots at subroutine block 108. For example, the unloading control system 1300 illustrated in FIG. 13 may coordinate operation of at least two articulated robots. Coordination may include position and movement of each robot and components of each robot, with respect to time.

According to some examples, the method includes performing a perception scan of at least a portion of a visible wall of materials to be handled (MTBH) at subroutine block 110. For example, the robot-mounted camera 504 illustrated in FIG. 5A may perform a perception scan of at least a portion of a visible wall of materials to be handled (MTBH). The perception scan captures a 2D image and a 3D image including 3D point cloud data of the MTBH. The robot-mounted camera 504 may be a 2D camera and/or a 3D camera.

According to some examples, the method includes building a six-degrees of freedom pose for each unit of MTBH at subroutine block 112. For example, the unloading control system 1300 illustrated in FIG. 13 may build a six-degrees of freedom pose for each unit of MTBH. According to some examples, the method includes analyzing the 2D image to determine which segment of the 2D image belongs to each MTBH. According to some examples, the method includes extrapolating for each unit of MTBH, at least one of size, orientation, origin of interest, and center of mass from the 2D image. According to some examples, the method includes querying the 3D image to obtain depth information, orientation of each MTBH in 3D, and dimensions of each side of each MTBH, as expressed in a field of view of at least one of the 2D camera and the 3D camera of each of the at least two articulated robots. According to some examples, the method includes, for each of the at least two articulated robots, a frame of reference of the 2D camera and a frame of reference of the 3D camera as a function of a tilting angle of the loading conveyor and a position configuration of the robot joints.

According to some examples, the method includes determining a primary frame of reference of the automated unloader at subroutine block 114. For example, the unloading control system 1300 illustrated in FIG. 13 may determine a primary frame of reference of the automated unloader. The primary frame of reference may be determined using at least one of the frame of reference of the 2D camera and the frame of reference of the 3D camera.

According to some examples, the method includes building a virtual representation of each unit of the MTBH detected in the perception scan at subroutine block 116. For example, the unloading control system 1300 illustrated in FIG. 13 may build a virtual representation of each unit of the MTBH detected in the perception scan. The virtual representation creates six-degrees of freedom poses for each unit of MTBH with respect to the primary frame of reference of the automated unloader.

According to some examples, the method includes calculating picking poses comprising picking positions and picking orientations at subroutine block 118. For example, the unloading control system 1300 illustrated in FIG. 13 may calculate picking poses comprising picking positions and picking orientations. The picking positions may be in the center of a face of each unit of MTBH, and the picking orientations are normal to one face of each unit of MTBH.

According to some examples, the method includes determining at least one motion plan using a search-based algorithm at subroutine block 120. For example, the unloading control system 1300 illustrated in FIG. 13 may determine at least one motion plan using a search-based algorithm. The inputs to the search-based algorithm may include the picking poses for each unit of MTBH, minimization of torque on the robot motors, minimization of motion path length, and collision avoidance with other dynamic or static elements of a surrounding environment.

According to some examples, the method includes selecting a motion plan based on a scoring algorithm at subroutine block 122. For example, the unloading control system 1300 illustrated in FIG. 13 may select a motion plan based on a scoring algorithm. The scoring algorithm is based at least in part on picking poses of each unit of MTBH with respect to other units of MTBH. Attributes of the scoring algorithm may also include at least one of the minimization of torque on the robot motors, the minimization of motion path length, position, velocity, acceleration, jerk, snap, trajectory normalized distance, and attributes related to configuration space, free space, target space, and obstacle space.

According to some examples, the method includes determining a picking sequence at subroutine block 124. For example, the unloading control system 1300 illustrated in FIG. 13 may determine a picking sequence. The picking sequence may be based at least in part on the selected motion plan for each MTBH, the picking poses of each unit of MTBH with respect to other units of MTBH, and coordinated operation of the at least two articulated robots.

According to some examples, the method includes executing the picking sequence at subroutine block 126. For example, the articulated robot 302 illustrated in FIG. 3A may execute the picking sequence.

According to some examples, the method includes removing at least one visible wall of MTBH at block 128. For example, the robotic unloading system 300 illustrated in FIG. 3A may remove at least one visible wall of MTBH.

According to some examples, the method includes positioning the robotic unloading system further into the container at block 130. For example, the telescoping transport conveyor 308 illustrated in FIG. 3A may position the robotic unloading system further into the container. This may allow the at least two articulated robots to access remaining MTBH.

According to some examples, the method includes unloading remaining MTBH from the transportation container at block 132. For example, the robotic unloading system 300 illustrated in FIG. 3A may unload remaining MTBH from the transportation container.

According to some examples, the method includes receiving unloaded MTBH from the transportation container at block 134. For example, the automated palletizing system 318 illustrated in FIG. 3A may receive unloaded MTBH from the transportation container. The automated palletizing system may be such as the automated palletizing system 318 described in FIG. 3A through FIG. 3C.

According to some examples, the method includes forming at least partially stacked pallet sleeve assemblies with the received MTBH at block 136. For example, the palletizing robot 326 illustrated in FIG. 3A may form at least partially stacked pallet sleeve assemblies with the received MTBH. This action may be accomplished as described in subroutine block 138 and subroutine block 140.

According to some examples, the method includes receiving units of MTBH, with the palletizing robot end-effector at subroutine block 138. For example, the palletizing robot 326 illustrated in FIG. 3A may receive units of MTBH, with the palletizing robot end-effector.

According to some examples, the method includes depositing each unit of MTBH into the at least one pallet sleeve assembly until an at least partially stacked pallet sleeve assembly has been formed at subroutine block 140.

According to some examples, the method includes transporting at least partially stacked pallet sleeve assemblies elsewhere in the material handling facility at block 142. For example, the autonomous mobile robot or AMR 324 illustrated in FIG. 3A may transport at least partially stacked pallet sleeve assemblies elsewhere in the material handling facility. The at least partially stacked pallet sleeve assemblies may in some embodiments be transported to an automated pallet load stabilization system 900 or an automated crane storage and retrieval system 1200.

Figure 2:
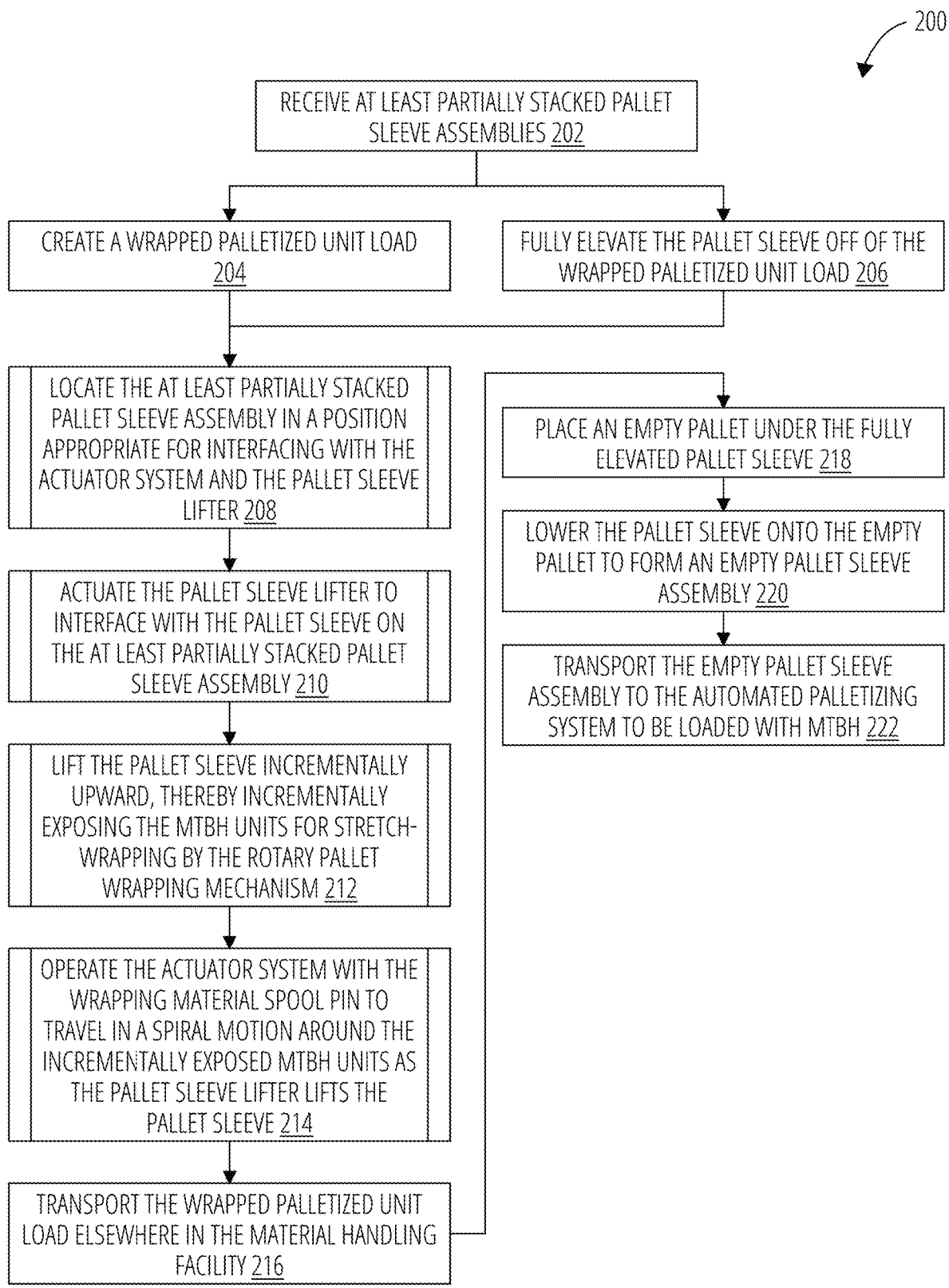
FIG. 2 illustrates a pallet load stabilizing routine 200 in accordance with one embodiment.
Figure 10:
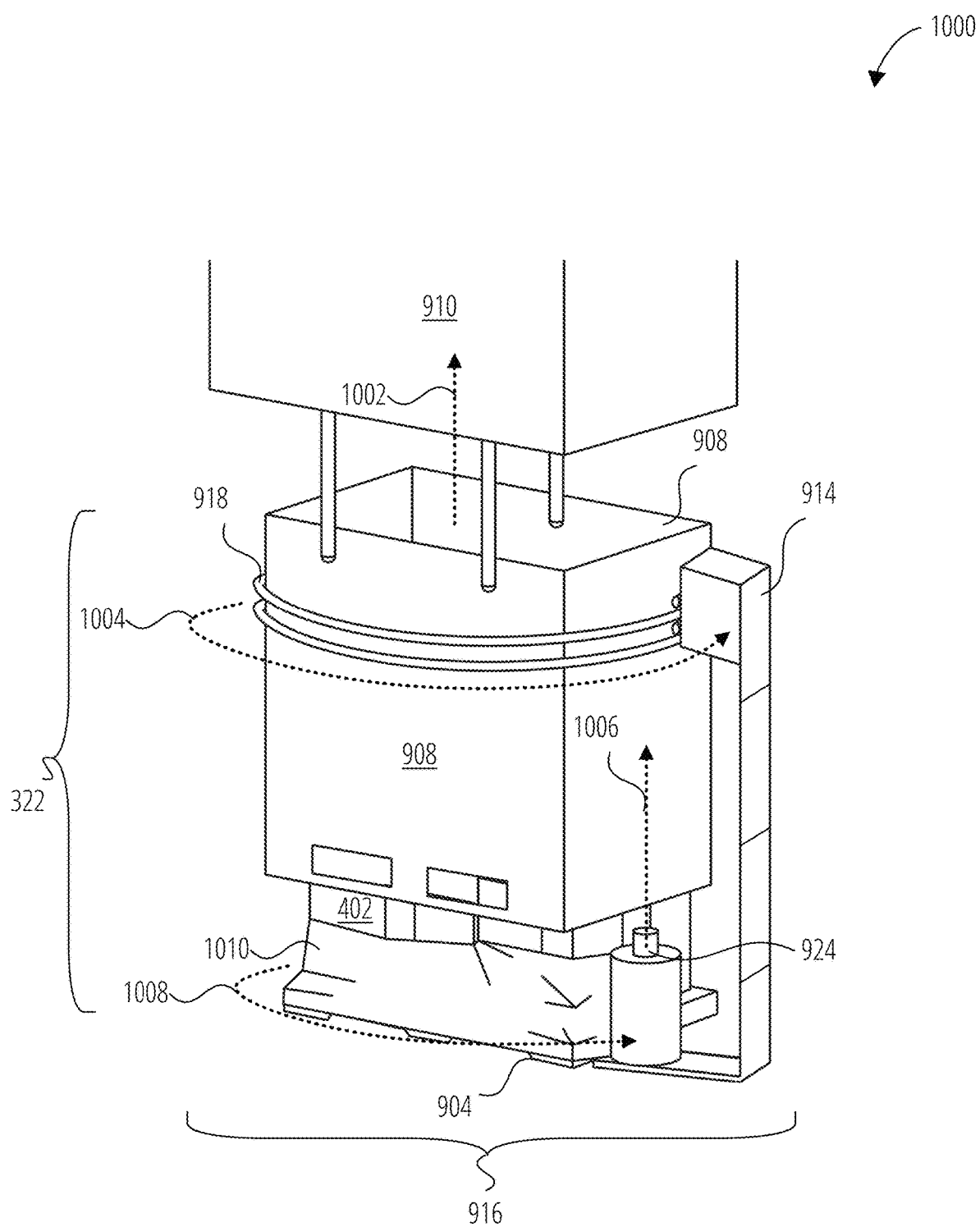
FIG. 10 illustrates concurrent wrapping and lifting action 1000 in accordance with one embodiment.

FIG. 2 illustrates an example pallet load stabilizing routine 200 for an automated pallet load stabilization system 900 such as is illustrated in FIG. 9A and FIG. 9B, as well as FIG. 10. Some or all of the steps of automated unloading and palletizing routine 100 may be performed by control systems such as the load stabilization control system 1500 illustrated in FIG. 15, which may interact with other control systems across the material handling facility according to the end-to-end control system diagram 1600 shown in FIG. 16.

Although the example pallet load stabilizing routine 200 depicts a particular sequence of operations, the sequence may be altered without departing from the scope of the present disclosure. For example, some of the operations depicted may be performed in parallel or in a different sequence that does not materially affect the function of the pallet load stabilizing routine 200. In other examples, different components of an example device or system that implements the pallet load stabilizing routine 200 may perform functions at substantially the same time or in a specific sequence.

According to some examples, the method includes receiving at least partially stacked pallet sleeve assemblies at block 202. For example, the automated pallet load stabilization system 900 illustrated in FIG. 9A may receive at least partially stacked pallet sleeve assemblies. The automated pallet load stabilization system 900 is described in detail with respect to FIG. 9A and FIG. 9B. At least Partially stacked pallet sleeve assemblies may arrive from the automated palletizing system 318 via AMR 324.

According to some examples, the method includes creating a wrapped palletized unit load at block 204. For example, the rotary pallet wrapping mechanism 916 illustrated in FIG. 9A may create a wrapped palletized unit load. The steps involved in this action may be performed concurrently with those involved in the actions of block 206.

According to some examples, the method includes fully elevating the pallet sleeve off of the wrapped palletized unit load at block 206. For example, the pallet sleeve lifter 910 illustrated in FIG. 9B may fully elevate the pallet sleeve off of the wrapped palletized unit load. This step and the step of block 204 may be accomplished as described in subroutine block 208 through subroutine block 214.

According to some examples, the method includes locating the at least partially stacked pallet sleeve assembly in a position appropriate for interfacing with the actuator system and the pallet sleeve lifter at subroutine block 208. For example, the MHE 906 illustrated in FIG. 9A may locate the at least partially stacked pallet sleeve assembly in a position appropriate for interfacing with the actuator system and the pallet sleeve lifter.

According to some examples, the method includes actuating the pallet sleeve lifter to interface with the pallet sleeve on the at least partially stacked pallet sleeve assembly at subroutine block 210. For example, the load stabilization control system 1500 illustrated in FIG. 15 may actuate the pallet sleeve lifter to interface with the pallet sleeve on the at least partially stacked pallet sleeve assembly.

According to some examples, the method includes lifting the pallet sleeve incrementally upward, thereby incrementally exposing the MTBH units for stretch-wrapping by the rotary pallet wrapping mechanism at subroutine block 212. For example, the pallet sleeve lifter 910 illustrated in FIG. 9B may lift the pallet sleeve incrementally upward, thereby incrementally exposing the MTBH units for stretch-wrapping by the rotary pallet wrapping mechanism.

According to some examples, the method includes operating the actuator system with the wrapping material spool pin to travel in a spiral motion around the incrementally exposed MTBH units as the pallet sleeve lifter lifts the pallet sleeve at subroutine block 214. For example, the load stabilization control system 1500 illustrated in FIG. 15 may operate the actuator system with the wrapping material spool pin to travel in a spiral motion around the incrementally exposed MTBH units as the pallet sleeve lifter lifts the pallet sleeve. Dispensing the wrapping material around the at least partially stacked pallet sleeve assembly is performed according to the number of wraps around the exposed MTBH units, the percent elongation over the length of the wrapping material, and/or the offset between layers of wrapping material.

According to some examples, the method includes transporting the wrapped palletized unit load elsewhere in the material handling facility at block 216. For example, the AMR 324 illustrated in FIG. 3A may transport the wrapped palletized unit load elsewhere in the material handling facility. Wrapped palletized unit loads may in some embodiments be taken to the automated crane storage and retrieval system 1200 or loaded into transport vehicles or containers for distribution to other locations.

According to some examples, the method includes placing an empty pallet under the fully elevated pallet sleeve at block 218. For example, the automated forklift 920 illustrated in FIG. 9A may place an empty pallet under the fully elevated pallet sleeve.

According to some examples, the method includes lowering the pallet sleeve onto the empty pallet to form an empty pallet sleeve assembly at block 220.

According to some examples, the method includes transporting the empty pallet sleeve assembly to the automated palletizing system to be loaded with MTBH at block 222. For example, the AMR 324 illustrated in FIG. 3A may transport the empty pallet sleeve assembly to the automated palletizing system to be loaded with MTBH.

FIG. 3A illustrates a perspective view of a robotic unloading system 300 that may be used to unload packages from vehicle trailers onto a conveyor system and an integrated robotic palletizer according to various embodiments of the present disclosure. FIG. 3B illustrates a side elevation view of the robotic unloading system 300, and FIG. 3C illustrates a plan view of the robotic unloading system 300.

Figure 6:
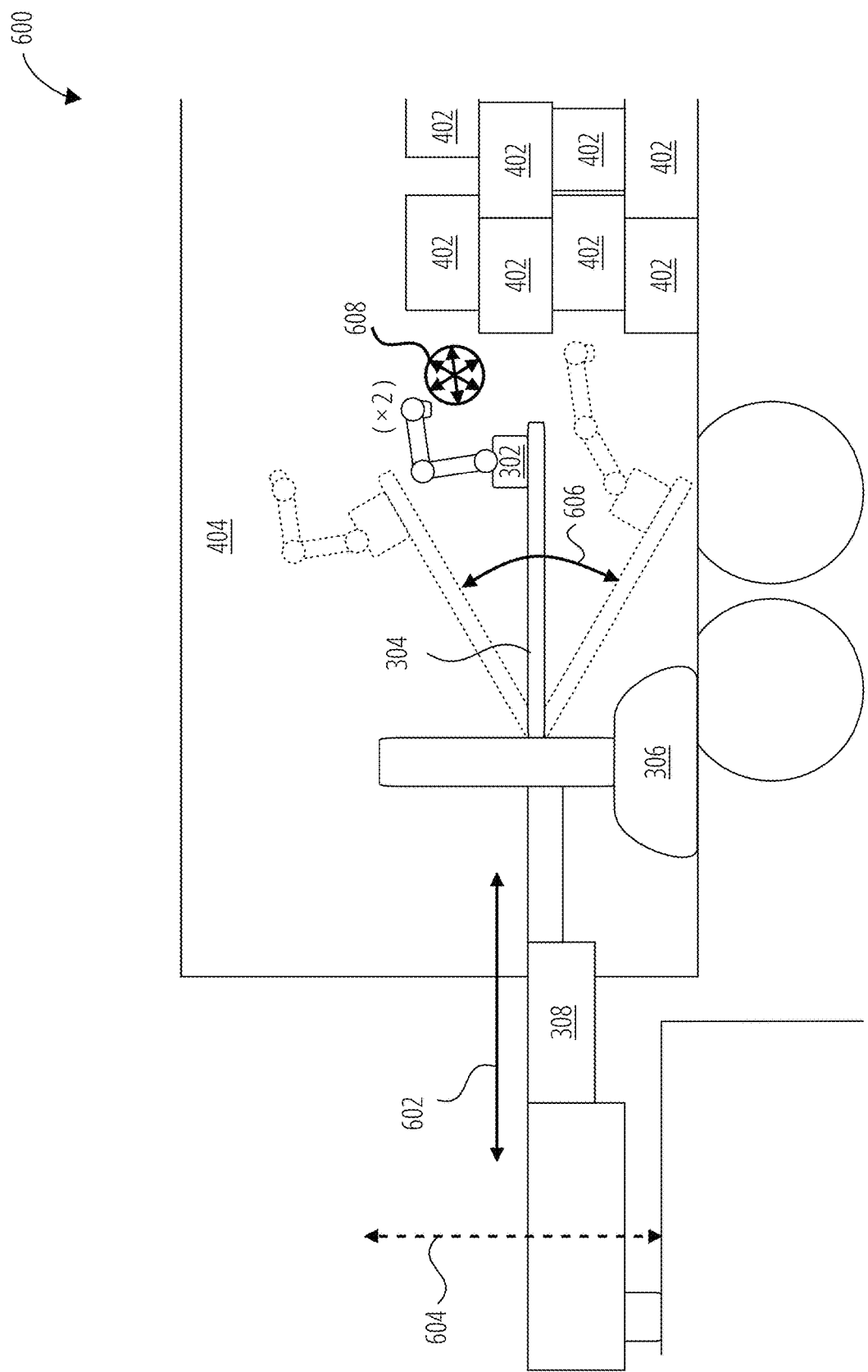
FIG. 6 illustrates robotic unloading system degrees of freedom 600 in accordance with one embodiment.

This robotic unloading system 300 is utilized in systems and methods for automated truck unloading, automated palletization, and packing of trailers, containers, and the like. A high number of robotic degrees of freedom (DOF) are used by an automated unloader 500 with articulated robots 302 to grasp, manipulate, and transport packages from an unloading area to an attached loading conveyor 304, which has the ability to pivot, translate or rotate up and down. The DOF present in one embodiment of the robotic unloading system 300 are illustrated in FIG. 6. In this embodiment two separate articulated robots 302 are presented in a manner in which they operate near each other with overlapping kinematic reach volumes and may coordinate with each other via an optimized 12-DOF kinematic solver. The ability to move up and down allows the robotic platform to get closer to the fluid loaded packages and reduces the distance that the articulated robots 302 need to travel. This may increase the throughput of the system.

The loading conveyor 304 transfers the materials to be handled to the telescoping transport conveyor 308. In some cases, the transport conveyor might be flexible, but in most embodiments, the use of a fixed telescopic type conveyor for the telescoping transport conveyor 308 is may support particular material handling characteristics related to the size of the MTBH that demand a continuous belt. The telescoping transport conveyor 308 may be a MaxReach telescoping conveyor or similar construction, and may be modified as needed to accommodate the automated unloader 500. A scanning tunnel 310 may be configured at a location along the telescoping transport conveyor 308. At the scanning tunnel 310, visual sensors such as cameras, barcode scanners, etc., may provide a five- or six-sided scan of MTBH traveling along the telescoping transport conveyor 308. Information gathered in the scanning tunnel 310 may be used for tracking of MTBH and sortation of MTBH at later stages of the robotic unloading system 300.

The automated unloader 500 may be equipped with a high number of robotic DOF as well as various perception systems that allow the robotic DOF to identify MTBH as well as the constraint space in which the automated unloader 500 may operate. The attached or fixed perception systems may be any combination of one-dimensional (1D), two-dimensional (2D), and three-dimensional (3D) perception systems. These perception systems may allow the automated unloader 500 to determine where the packages are and in what orientation they rest, allowing robotic end-effectors to optimize the contact normal from which they may grip the packages, the picking rate, and the probability of a successful pick. The automated unloader 500 may also provide six-sided perception of the packages, including the weight and instantaneous center of gravity of the packages, during MTBH manipulation or after placement into the system. These perception systems are typically very sensitive to noise and vibration, so the automated unloader 500 may utilize a type of support or grounded base 306, such as tracks or wheels, that provides a wide footprint and low contact pressure so as to distribute the weight of the system. Grounded base 306 may include a pivot point, allowing the automated unloader 500 to move in and out of the container while providing stability and support, even in the event that uneven or sloped terrain is encountered, which is not possible with traditional flexible and telescoping transport conveyors.

The transporting flexible or fixed telescoping transport conveyor 308 may have at least one connection point to traditional material handling equipment (MHE) or may transfer to mobile material handling systems. In this embodiment, the system transfers to a type of sorting MHE 312 that allows for the singular flow of goods to be split into n-number of different lanes for sortation. In one embodiment the sorting MHE 312 may be 2-Way Sortation manufactured by Regal Rexnord, Cellmation, or Intralox. Such sorting MHE 312 may split from one supply lane to two or four sort lanes in continuous flow quite easily. This may allow for downstream palletization to be optimized depending on the incoming materials that arrive at the material handling facility or may allow flow directly into a set of cross-docked MHE, bypassing palletization.

Where unloading to palletization is intended, a set of incline MHE 314 allows the product to be transferred from the lower height ("top of roller") of the transport conveyor to the automated palletizing system 318. An Interoll Incline Dual Conveyor may be used for this purpose. The incline MHE 314 may decouple the two subsystems and brings the MTBH to the correct location. The automated palletizing system 318 brings the product consistently to a known location in 3D space so that the speed of the palletizer is optimized. In most systems on the market, the flow of materials is random and may need to employ additional computation to locate the packages. The automated palletizing system 318 may use palletizing robots 326 such as the Robotiq Palletizer System to place MTBH 402 as it arrives at the top of the incline MHE 314. The palletizing robot 326 may be supported by a palletizing robot support gantry 328.

MTBH 402 may be placed into a protective pallet sleeve assembly 1100 such as empty pallet sleeve assembly 320 that allows for high-speed palletization without concern that the packages will fall over, slip, or move. The pallet sleeve assemblies 1100 allow for automated transport of the pallet whether empty, partially loaded, or full throughout the system. The pallet sleeve assembly 1100 may be optimized for automatic flow on pallet MHE, or with independent, agent-based automatic mobile robot or AMR 324 material handling systems. AMRs 324 may bring the pallet sleeve assembly 1100 directly into the automated palletizing system 318 or may interface with MHE. A 2-DOF MHE 316 may allow pallet sleeve assemblies 1100 to flow in and transfer at a perpendicular vector to a loading area without rotation about the Z-axis. An empty pallet sleeve assembly 320 and an at least partially stacked pallet sleeve assembly 322 are shown.

An AMR 324 may interface with the fixed MHE (such as the 2-DOF MHE 316) and offload empty pallet sleeve assemblies 320. The empty pallet sleeve assembly 320 may be the entry point of the pallet flow, and the at least partially stacked pallet sleeve assembly 322 may be the exit point. The AMR 324 may bring an empty pallet sleeve assembly 320 to the system, then may pick up an at least partially stacked pallet sleeve assembly 322 at the same or a different location. The MHE may be configured to support multiple different load and unload architectures and mappings depending on the flow of materials. The AMR 324 may navigate to any perimeter location to accept the transfer of and transport a pallet sleeve assembly 1100. The AMR 324 may also transport pallets without sleeves, as well as pallet sleeves not assembled around pallets.

Figure 4:
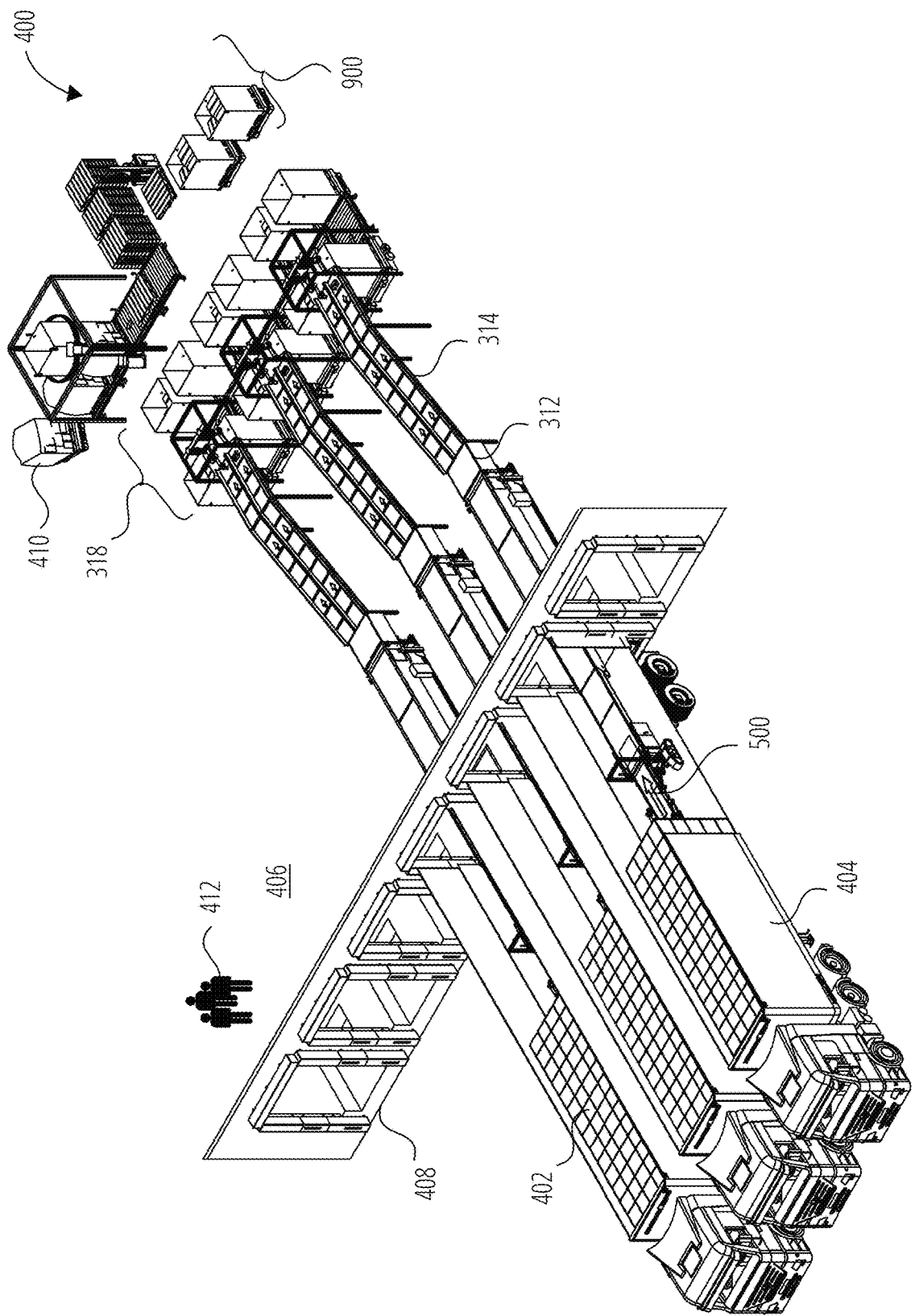
FIG. 4 illustrates a perspective view of an end-to-end system 400 that shows robotic unloading from the trailer to the palletized unit load according to various embodiments of the present disclosure.

FIG. 4 illustrates a perspective view of an end-to-end system 400 that shows the robotic unloading of MTBH 402 from transportation containers 404 at a material handling facility 406 through to the creation of wrapped palletized unit loads 410 according to various embodiments of the present disclosure, requiring little involvement by the operations team 412 of the material handling facility 406.

Therein are depicted three shipping transportation containers 404, trailers, or trucks, parked at a loading dock of a material handling facility 406. The docks 408 are found commonly in material handling facilities 406 and are meant to provide a portal for shipping containers to interface with the interior of the facilities while providing a weather seal.

An automated unloader 500 may be positioned by the operations team 412 inside each transported volume and may begin to robotically and automatically unload the MTBH 402. The MTBH 402 may be transported along fixed or flexible sorting MHE 312, then via incline MHE 314, to automated palletizing systems 318. A queue of empty pallet sleeve assemblies 320 as shown in FIG. 3A may be maintained and available for the automated palletizing systems 318 to bring the MTBH 402 from incline MHE 314 into the pallet sleeve assemblies 1100 described in greater detail with reference to FIG. 11A.

Sorting MHE 312 logically sorts the MTBH 402 to the correct lane of the incline MHE 314, which could include paths to separate palletization automated palletizing systems 318. Additionally, the MTBH might be diverted to an exception path for inspection, special handling, and other non-standard reasons during sorting on sorting MHE 312. In this embodiment, dual flows of incline MHE 314 go to automated palletizing systems 318 to provide each robotic arm with its own source and supply of products.

Once full, the at least partially stacked pallet sleeve assemblies 322 may be moved either to a storage location or to the automated pallet load stabilization system 900, which may provide automatic stretch wrapping of the pallet.

Figure 16:
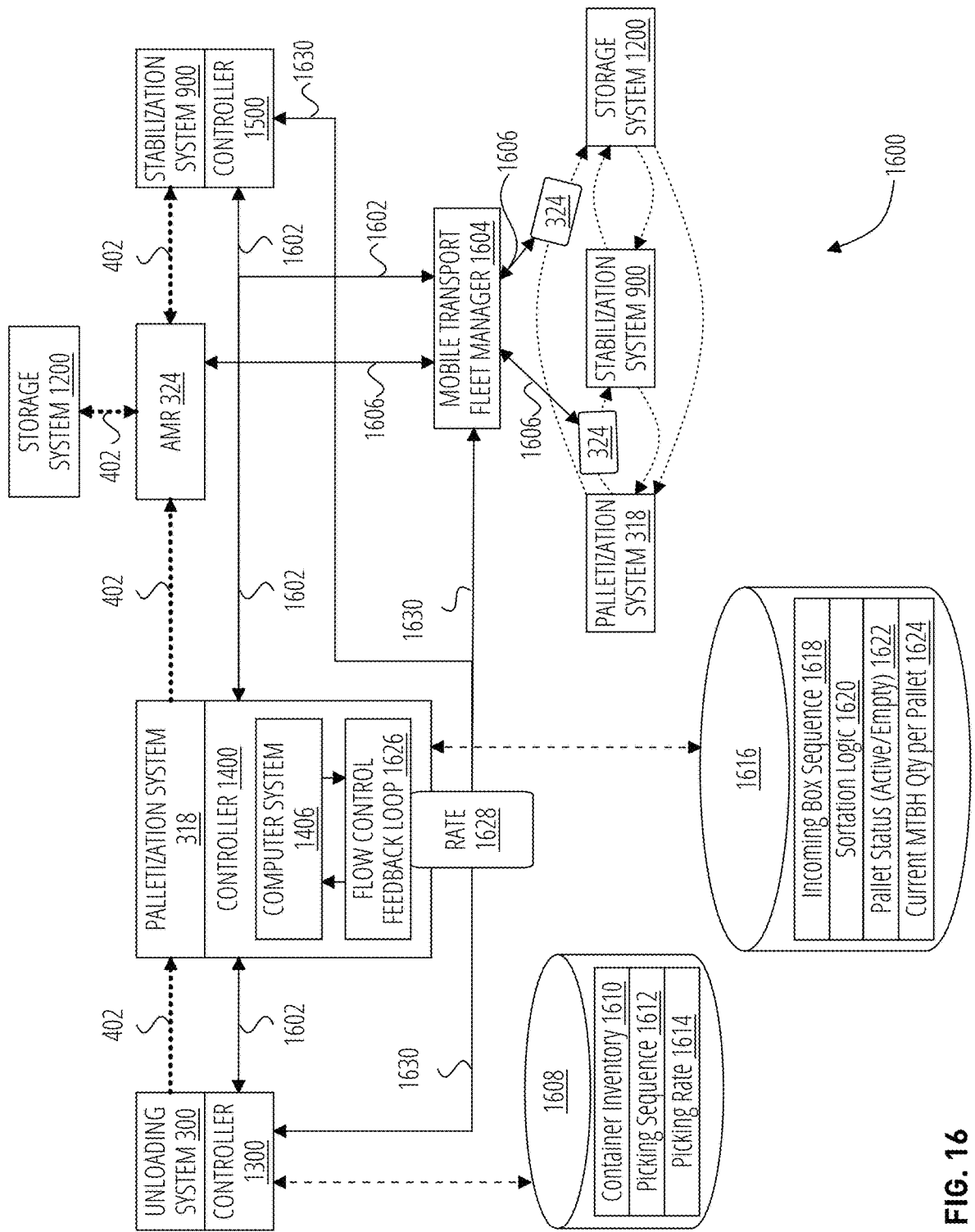
FIG. 16 illustrates an end-to-end control system diagram 1600 in accordance with one embodiment.

In one embodiment, a shipping customer may provide data including a shipping manifest, a SKU master, and a desired pallet configuration. The shipping manifest may include the SKU quantity and total weight of a load to be expected in one transportation container 404. The SKU master may include dimensions, weight, and type of MTBH 402 associated with a particular SKU. The pallet configuration may include a unique identifier, a SKU, a final destination, and a weight associated with a particular pallet to be made up from the MTBH 402 contained in the transportation container 404. The control systems of the end-to-end system 400, as illustrated in FIG. 16, may take this data as input and use it to determine which actions to take at each stage of the process to palletize MTBH 402 as desired by the customer. The end-to-end system 400 computing systems may return the configuration of each completed pallet for use by the customer, including the unique identifier, the box build, the quantity, an inspection status, a received indication, a weight, a timestamp of when the pallet was created and stabilized, and images of the pallet. If a pallet is placed into storage, pallet information may include location indicators to facilitate retrieval when needed.

Figure 5A:
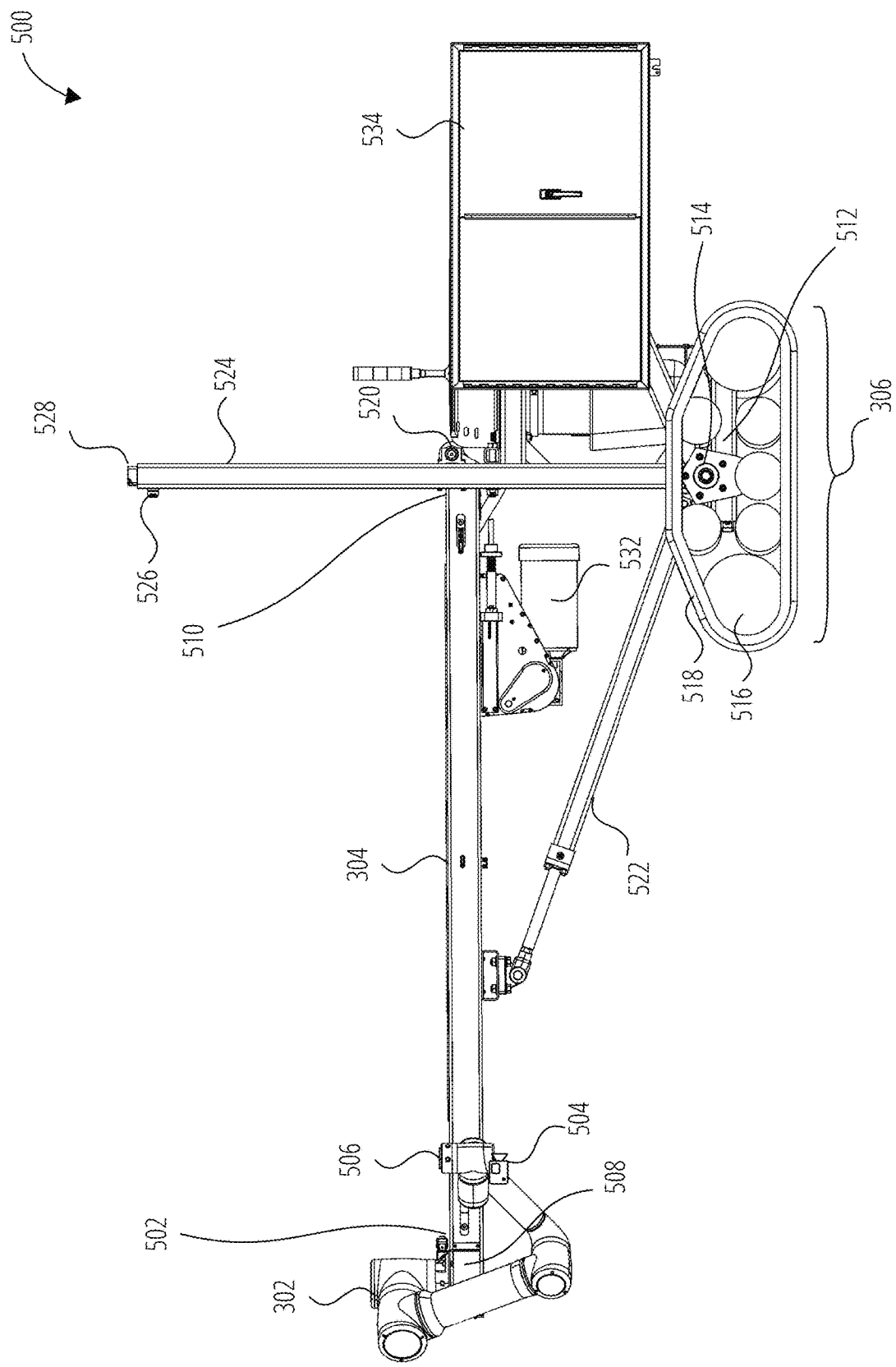
FIG. 5A illustrates a side elevation view of an automated unloader 500 according to various embodiments of the present disclosure.
Figure 5B:
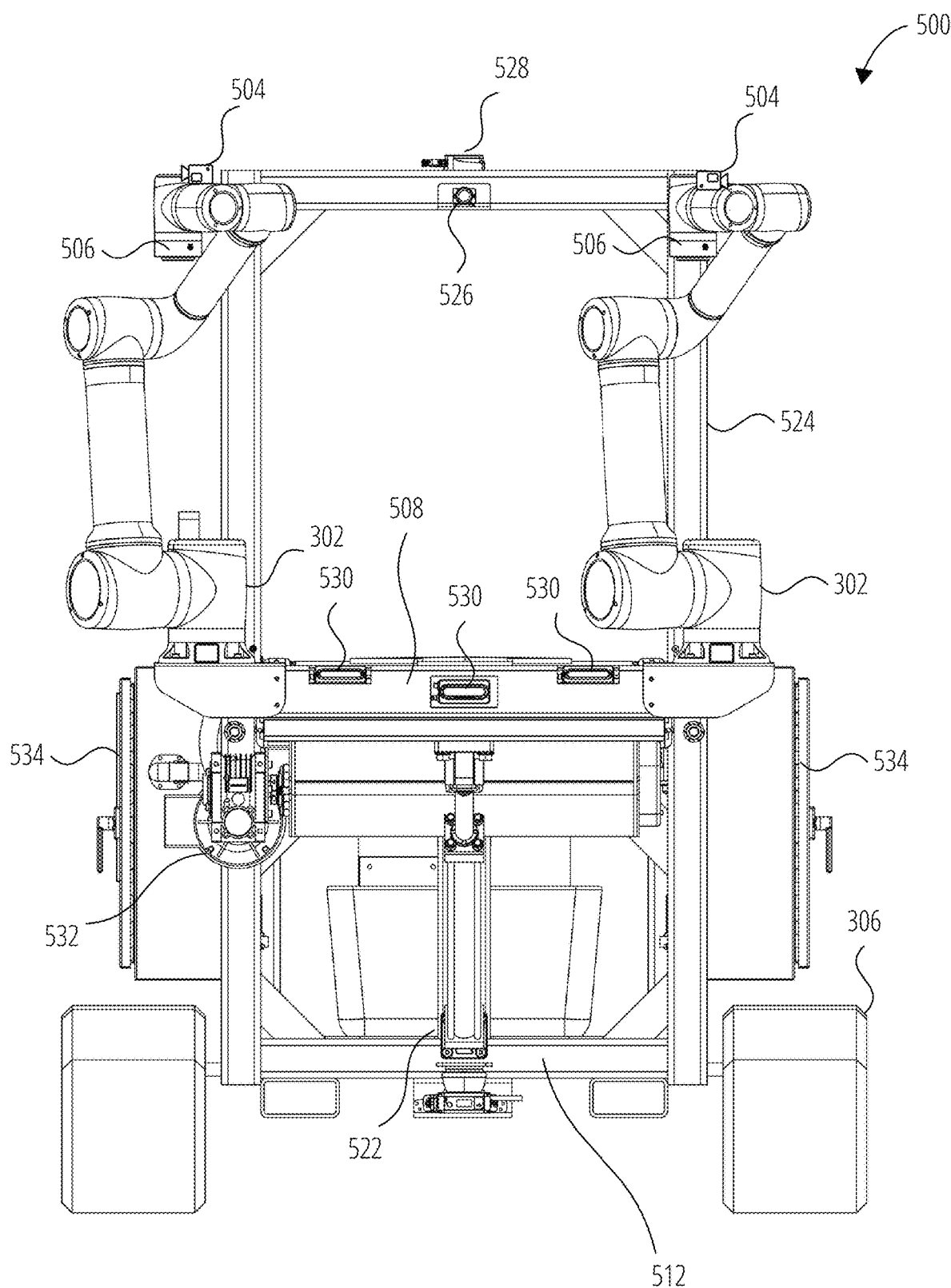
FIG. 5B illustrates a front elevation view of the automated unloader 500 in accordance with one embodiment.

FIG. 5A illustrates a side elevation view of an automated unloader 500 according to various embodiments of the present disclosure. FIG. 5B illustrates a front elevation view of the 500.

Figure 13:
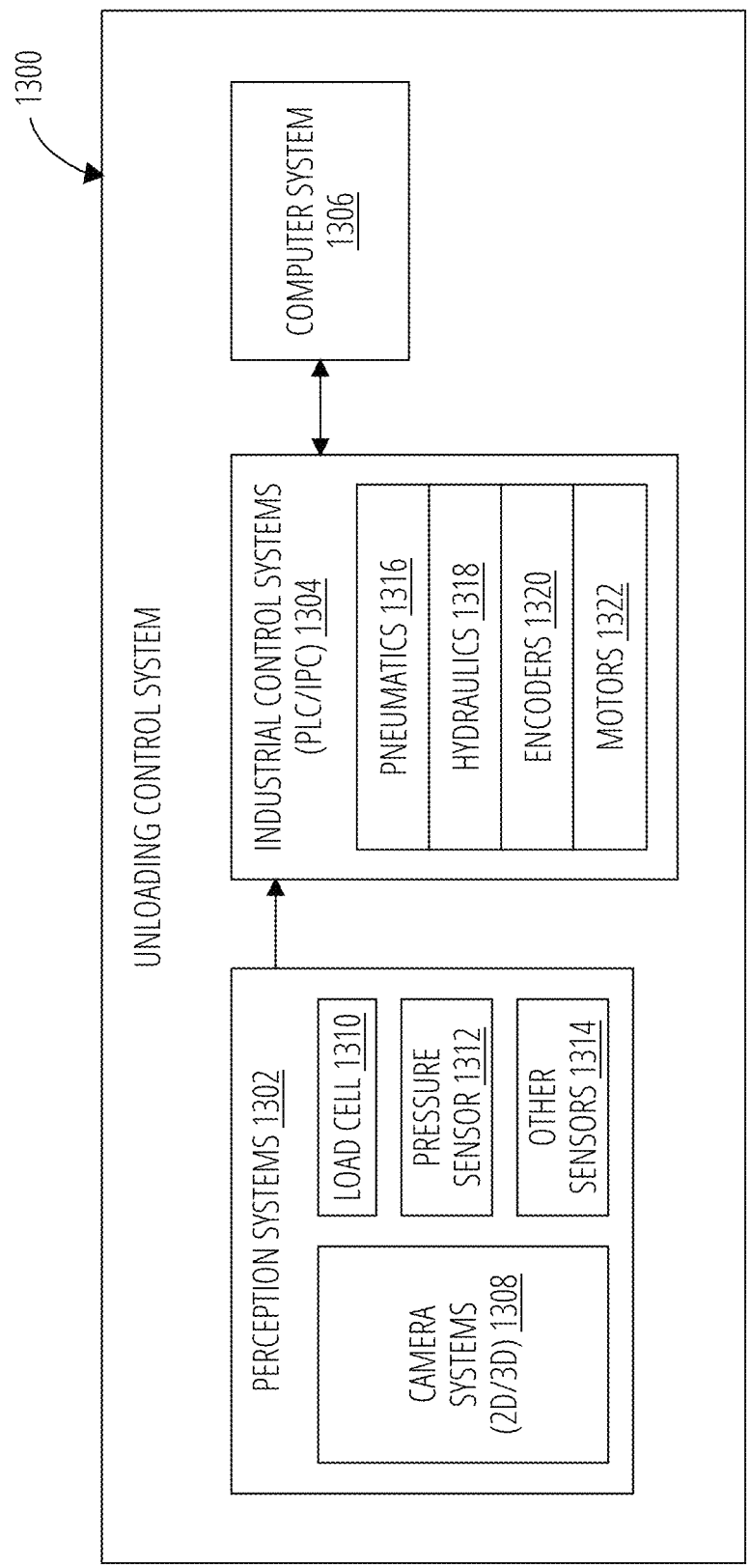
FIG. 13 illustrates an unloading control system 1300 in accordance with one embodiment.

The automated unloader 500 includes a high DOF robotic system, incorporating at least two articulated robots 302, each capable of at least six DOFs of motion. The articulated robots 302 may include robot joints that support their DOF of motion, allowing segments of robotic arms to bend, stretch, and reorient in space with respect to other portions of the robot and other objects in the environment. The articulated robots 302 may be located at the first loading conveyor end 502 of a loading conveyor 304. The articulated robots 302 may be mounted on a robot base 508 supported by the first loading conveyor end 502. The articulated robots 302 may incorporate integrated 1D, 2D, and 3D perception systems, including robot-mounted cameras 504 comprising 2D and 3D cameras, capable of capturing image data used to determine quantity, size, location, and orientation of items of MTBH within a transport container. The automated unloader 500 may use applied machine learning and artificial intelligence to detect boundaries of separate items of MTBH, such as boxes, cartons, or other items, classify them, locate them in 3D space, and optimize pick points and approach patterns of the articulated robots 302. These computational tasks may be separated into a dedicated on-board computing cluster that allows the automated unloader 500 to achieve a high level of autonomy and a high pick rate. Such a computing cluster may utilize the unloading control system 1300 as illustrated in FIG. 13.

The articulated robots 302 may use a variety of visual sensors and sensor control feedback loops to grip, manipulate, and transport packages to the loading conveyor 304. The articulated robots 302 may be configured with multiple types of end effectors 506 that may use vacuum generated suction or other techniques to grasp and manipulate the packages. Typically the number of robotic degrees of freedom in the system is greater than twelve and may be as high as thirty-three. DOFs for one embodiment are illustrated in FIG. 6.

The entire automated unloader 500 is supported by a grounded base 306 assembly that distributes the weight of the system and provides stability during operation. The grounded base 306 may attach to the second loading conveyor end 510 through a base support 512 connected to a grounded base pivot 514 that allows the grounded base 306 to orient as needed on uneven or sloped container surfaces while maintaining the loading conveyor 304 in its desired position. A feedback loop may be configured between the telescoping transport conveyor and strain gauges on the automated unloader 500 and the grounded base 306 that measure elastic deformation of components of the automated unloader 500 corresponding to forces on those components. A proportional-integral-derivative loop may be established for force feedback, allowing the upward and downward forces that may be applied by the telescoping transport conveyor to keep the grounded base 306 grounded to the bottom of the container. A standard industrial controller such as a Beckhoff controller may be used to accomplish this. The grounded base 306 may include wheels 516 and/or tracks 518 or other passive mobility components that allow the automated unloader 500 to be maneuvered and repositioned through the action of the telescoping transport conveyor and the efforts of the operations team.

The loading conveyor 304 provides additional degrees of freedom by rotating about loading conveyor pivot 520, with close loop control of the position via a translational actuator 522. The rotational position is recorded with a variety of ID perception technologies like rotary encoders, or linear variable distance transceivers. Encoder feedback may provide the locations of the articulated robots 302 in free space at the end of the pivoting conveyor. Joint information may be provided based on a robot-mounted camera 504. Each time this camera scans an area, it may highlight a field of view captured as a 2D image or a 3D point cloud data. 2D data may be used to classify boxes, identifying where the boundaries and edges of each box are located. 3D data may be used along with the lines defining the box outlines to identify points on the surfaces in order to determine a picking position. In one embodiment, a picking position may be established as the coordinates of a point in the center of a picking face of the MTBH.

A mounting gantry 524 provides a mounting point for additional perception systems that record 1D, 2D, and 3D data to estimate the state and pose of the system. In one embodiment, these perception systems may include a forward-sensing multidimensional sensor system 526 and a multi-channel inertia measurement system 528. The robot base 508 may include sensor cutouts 530 that allow additional sensors such as cameras, light detection and ranging (LIDAR), and other sensors to detect objects and obstacles in front of the automated unloader 500. Vibration, shock, acceleration, and alignment to the global magnetic field lines are recorded by such sensors during automated unloader 500 operation.

A localized control system is presented that distributes power to the various devices and components, as well as provides the edge distributed logic. This localized control system may include a motor 532 and an industrial control box 534 that supports a programmable logic controller.

FIG. 6 illustrates robotic unloading system degrees of freedom 600 in accordance with one embodiment. The robotic unloading system degrees of freedom 600 comprise the degrees of freedom (DOFs) achievable by at least two articulated robots 302, along with the loading conveyor 304 and telescoping transport conveyor 308 of a robotic unloading system 300, these DOFs being available in determining the handling of MTBH 402 to be unloaded from a transportation container 404.

One DOF 602 may be provided by the extension and retraction of the telescoping transport conveyor 308. DOF 602 may allow the telescoping transport conveyor 308 to propel the automated unloader 500 along a vector of motion further into or out from a transportation container 404. In this manner, relocation of the automated unloader 500 to deal with subsequent walls of MTBH 402 as visible walls of MTBH 402 are unloaded may be automated through control of the telescoping transport conveyor 308, without needing intercession by an operations team.

In some embodiments, another DOF 604 may be provided but vertical movement of the telescoping transport conveyor 308. In another embodiment, the ability of the telescoping transport conveyor 308 to move vertically may instead be used to apply a downward preloading force to the grounded base 306 such that the automated unloader 500 may traverse ramped or uneven transportation container 404 surfaces without excessive jarring to MTBH 402 or components of the automated unloader 500.

Another DOF 606 may be provided by an upward and downward pivoting motion of the loading conveyor 304 around a loading conveyor pivots. Each of two articulated robots 302 may be equipped to move with at least 6 DOFs 608. In such an embodiment, at least fourteen robotic unloading system degrees of freedom 600 may be achieved.

In one embodiment, the loading conveyor 304 may be capable of pivoting horizontally as well as vertically, providing an additional DOF. Articulated robots 302 capable of seven or more DOFs may also be employed. Such a system may have seventeen or eighteen DOFs. One of ordinary skill in the art will readily apprehend how additional degrees of freedom may be achieved, as well as the technical complexities and benefits of attaining them in a system such as that disclosed herein.

Figure 7:
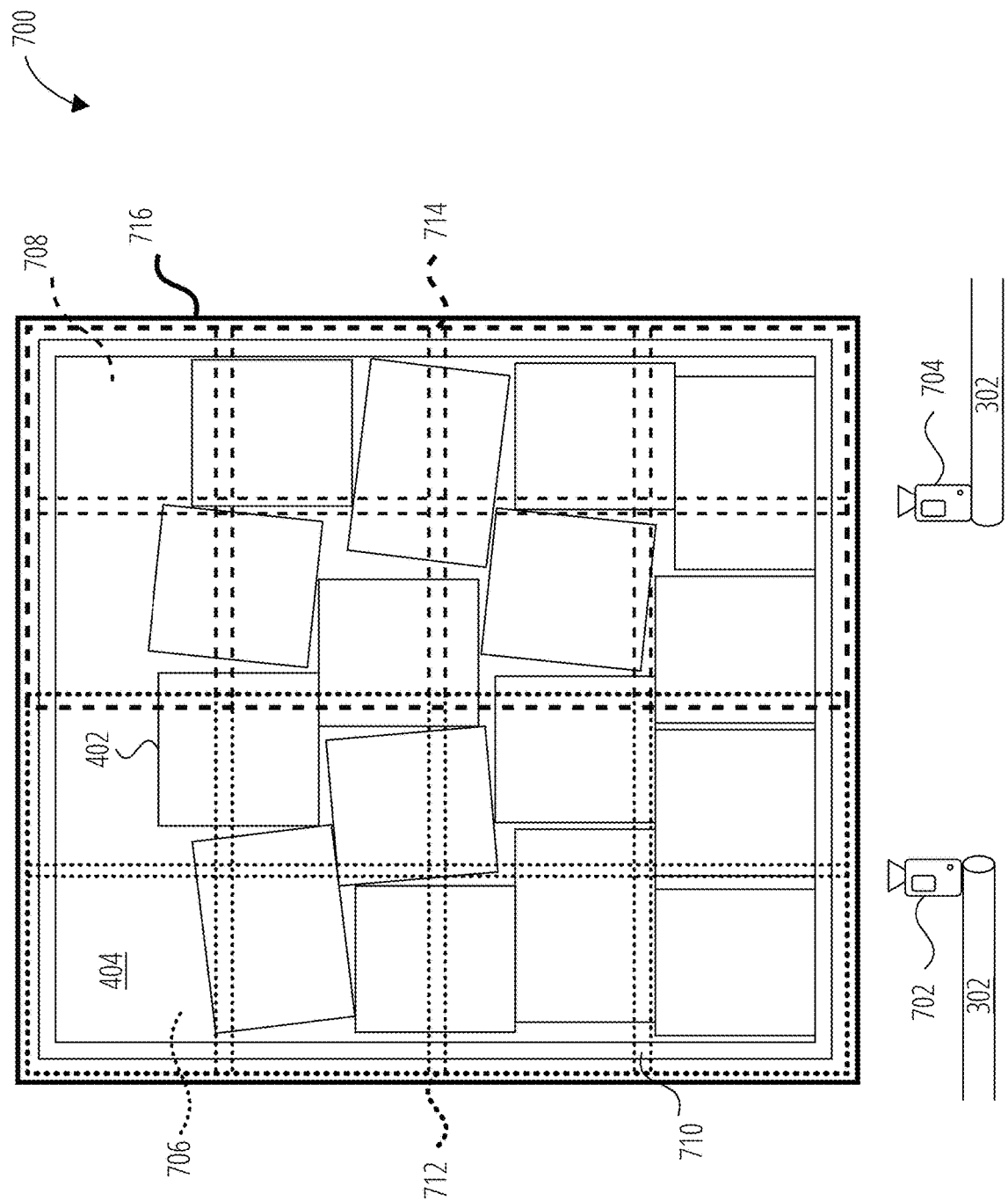
FIG. 7 illustrates primary frame of reference generation 700 in accordance with one embodiment.

FIG. 7 illustrates primary frame of reference generation 700 in accordance with one embodiment. A 2D camera and 3D camera 702 may take one or more fields of view perception scan 706 of at least a portion of the interior of a transportation container 404 carrying MTBH 402. In an embodiment where the 2D camera and 3D camera 702 are mounted on a left-hand articulated robot 302 mounted on the automated unloader 500 previously described, the fields of view perception scan 706 performed by the 2D camera and 3D camera 702 may be focused on the left-hand portion of the transportation container 404 and MTBH 402. Similarly, a 2D camera and 3D camera 704 may perform one or more fields of view perception scan 708 as shown.

Each perception scan may cover an area of overlap 710 that is scanned in more than one perception scan. An example is shown as area of overlap 710 herein, but multiple bands are illustrated indicating where fields of view perception scan 706 may overlap with each other, where fields of view perception scan 708 may overlap with each other, and where fields of view perception scan 706 and fields of view perception scan 708 may overlap with each other, in order to provide complete scan coverage of the inside of the transportation container 404 and the MTBH 402 therein.

Figure 8:
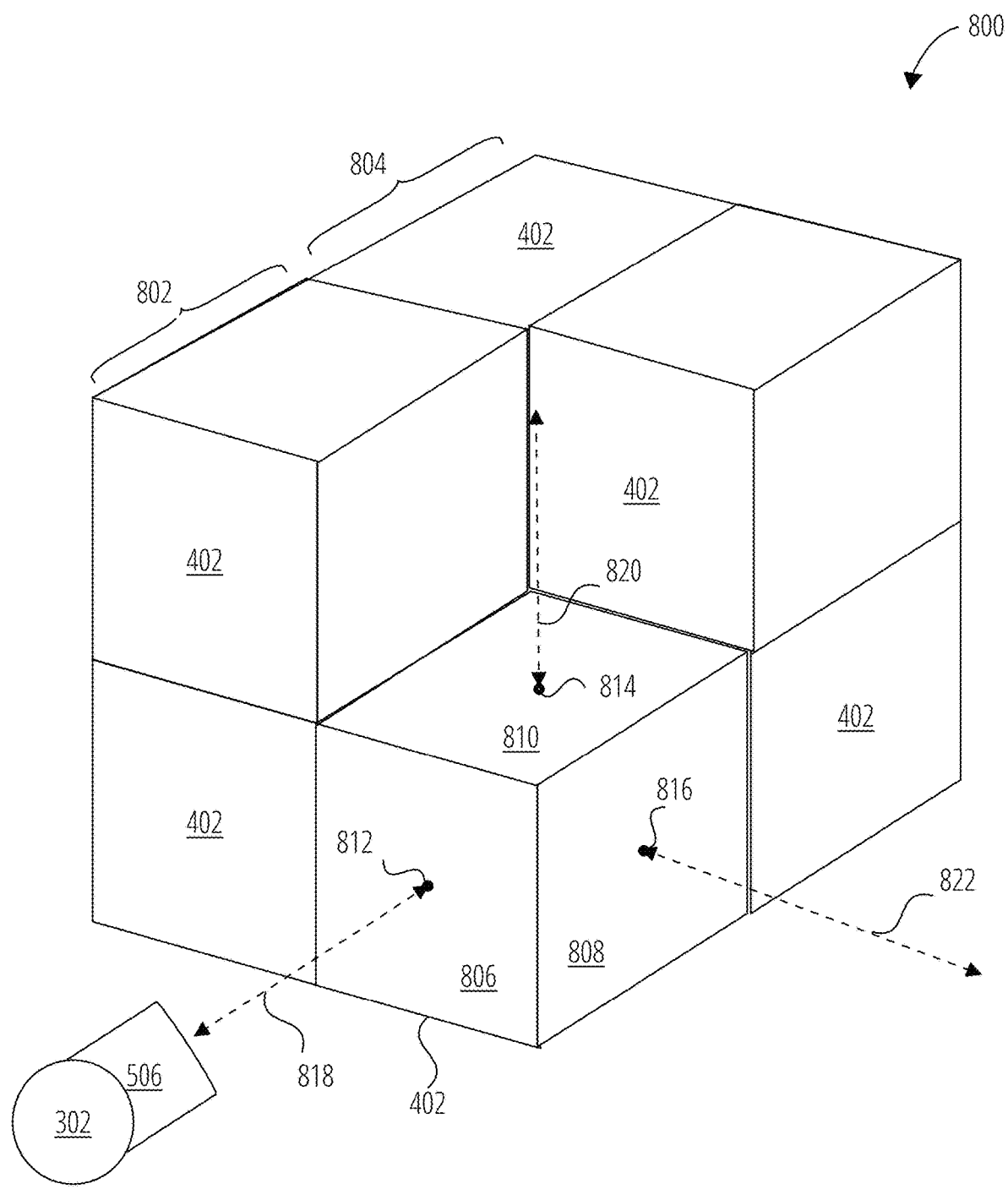
FIG. 8 illustrates MTBH calculated picking data 800 in accordance with one embodiment.

One or more fields of view perception scan 706 may be used to develop a frame of reference 712 for the 2D camera and 3D camera 702. Similarly, one or more fields of view perception scan 708 may be used to develop a frame of reference 714 for the 2D camera and 3D camera 704. Such frames frame of reference may be determined as a function of a tilting angle of the loading conveyor 304 and the at least two articulated robots 302 with the attached 2D camera and 3D camera 702 or 2D camera and 3D camera 704. These two frames of reference, frame of reference 712 and frame of reference 714, may be used to generate a primary frame of reference 716 for the automated unloader 500, FIG. 8 illustrates MTBH calculated picking data 800 in accordance with one embodiment. A first wall of MTBH 802 and a second wall of MTBH 804 are illustrated where the first wall of MTBH 802 includes MTBH 402 determined from perception scans to be closer to the nearest articulated robot 302, the second wall of MTBH 804 being farther from the articulated robot 302.

The visible MTBH 402 may be detected through perception scans and may be analyzed to detect available picking faces, such as picking face 806, picking face 808, and picking face 810 as shown. Other picking faces may be inferred from perception scan data but may or may not be included in calculations to determine picking data. In one embodiment, hidden faces may be analyzed as a particular picking sequence may be expected to reveal picking faces not accessible at the time of the perception scan.

For the three picking faces visible for the MTBH 402 under examination in this figure, a picking position may be determined for each face. The picking position may reside in a calculated cartesian central point on the picking face. Such picking positions are shown as picking position 812 on picking face 806, picking position 814 on picking face 810, and picking position 816 on picking face 808.

For each picking face, a picking orientation may also be calculated. The picking orientation may be in a direction that is normal to the plane of the picking face, such that the end effector 506 of an articulated robot 302 may make secure contact against the picking face, then begin moving in the direction normal to that face to initiate picking of the MTBH 402. Examples of picking orientations are shown here as picking orientation 818 for picking face 806, picking orientation 820 for picking face 810, and picking orientation 822 for picking face 808.

FIG. 9A illustrates a plan view of an automated pallet load stabilization system 900 supported with mobile robotics, the interface between the robotic material handling system, according to various embodiments of the present disclosure. FIG. 9B illustrates a side elevation view of the automated pallet load stabilization system 900. The automated pallet load stabilization system 900 is shown during an automated pallet stretch wrap operation.

AMRs 324 may bring in at least partially stacked pallet sleeve assemblies 322 that have been loaded with MTBH 402. The order of the sequence and queue may be controlled by a fleet management system that instructs the pickup and drop-off of the pallet sleeve assemblies 1100 and pallet 904 to the system. The AMRs 324 may interface with and transfer the at least partially stacked pallet sleeve assemblies 322 to MHE 906. The at least partially stacked pallet sleeve assemblies 322 may be moved with precision into a location appropriate for interface with the rotary ring 918 of a rotary pallet wrapping mechanism 916. A pallet sleeve lifter 910 may be actuated to interface with a pallet sleeve 908 and may pull the pallet sleeve 908 upward incrementally, exposing the packages for stretch-wrapping by the rotary pallet wrapping mechanism 916. The concurrent wrapping and lifting action 1000 is illustrated in greater detail in FIG. 10 in accordance with one embodiment.

The rotary pallet wrapping mechanism 916 travels in a spiral motion, carrying with it a wrapping material spool pin 924 holding a spool of wrapping material, wrapping the pallet with any combination of rotations per translation, and with variable stretch. The rotary pallet wrapping mechanism 916 automatically starts and stops the pallet wrapping. The rotary ring 918 provides clearance for the actuator system 914. The rotary ring 918, actuator system 914, wrapping material spool pin 924, and other elements of the rotary pallet wrapping mechanism 916 may be provided through an available industrial wrapping machine such as a Smart Wasp X1300 Ring Type High Speed Fully Automatic Pallet Wrapping Machine or a similar machine.

An at least partially stacked pallet sleeve assembly 322 located within the rotary ring 918 may have its pallet sleeve 908 lifted by the pallet sleeve lifter 910 as the actuator system 914 actuates the process of wrapping the pallet and the MTBH 402 it carries. Wrapping may start at the bottom, where the MTBH 402 is exposed through the lifting of the pallet sleeve 908 by the pallet sleeve lifter 910. As the pallet and MTBH 402 are wrapped, the pallet sleeve 908 is lifted completely off the pallet and may remain suspended. A pallet dispenser 902 may provide a repository for pallets 904 near the rotary pallet wrapping mechanism 916. The automated forklift 920 may pick up an empty pallet 922 from a pallet dispenser 902 and may then bring the empty pallet 922 to the MHE 906 as the MHE 906 moves the wrapped palletized unit load 410 out from its position in the rotary ring 918. An AMR 324 may pick up the wrapped palletized unit load 410 and take it away from the automated pallet load stabilization system 900. The MHE 906 may receive the empty pallet 904 from the automated forklift 920 and move it to a position below the suspended pallet sleeve 908. The pallet sleeve lifter 910 may then reverse its action and deposit the pallet sleeve 908 onto the pallet 904 to form an empty pallet sleeve assembly 320, which may in turn be handed off by the MHE 906 to an AMR 324 and returned to the automated palletizing system 318, to be used as described with respect to FIG. 3A. The entire automation of the rotary pallet wrapping mechanism 916 may be supported with a support structure 912.

The wrapping material may be made of Linear low-density polyethylene (LLDP) and may be dispensed with various attributes in terms of the number of wraps, percent elongation over length, and offset between layers. Calculations for stretch wrapping film used in one embodiment are provided in the table below.

| | | Film | | |
|---|---|---|---|---|
| Gauge | Roll Weight | Weight of Wrapped Film | Force to Load | # of Pallets Per Roll |
| 90 Gauge | 5,000'/ 36 lbs. | 12.5 oz. | 22 lbs/sq. in. | 43 |
| 80 Gauge | 5,000'/ 32 lbs. | 10.75 oz. | 24 lbs/sq. in | 47 |
| 63 Gauge/ 80 ga. EQ. | 5,000'/ 25.75 lbs. | 8.25 oz. | 28 lbs/sq. in | 49 |

In one embodiment, the automated pallet load stabilization system 900 may process one pallet 904 in 60 seconds. In a typical configuration, a wrapped palletized unit load 410 may be removed from the automated pallet load stabilization system 900 and an empty pallet 904 may be provided within ten to twelve seconds. In such a configuration, the automated pallet load stabilization system 900 may process pallets 904 with a cycle time of seventy-two seconds, or 50 pallets 904 per hour. In one embodiment, three parallel configurations of robotic unloading systems 300 may be operated to concurrently unload three trucks or shipping containers, palletize their contents, and send their contents to the automated pallet load stabilization system 900. This may in some embodiments provide an unloading, palletizing, and stabilizing capability of 3,000 cases per hour.

FIG. 10 illustrates a concurrent wrapping and lifting action 1000 in accordance with one embodiment. The concurrent wrapping and lifting action 1000 may be performed by concurrent action of elements of the rotary pallet wrapping mechanism 916, such as the actuator system 914 traveling along the rotary ring 918 and carrying a wrapping material spool pin 924, and the pallet sleeve lifter 910. These components may be supported by a support structure 912 as previously described, but which is not shown here for ease of illustration. One of ordinary skill in the art will readily understand the support needed to implement these features.

An at least partially stacked pallet sleeve assembly 322 may be positioned within the rotary ring 918 of the rotary pallet wrapping mechanism 514. The pallet sleeve 908 of the at least partially stacked pallet sleeve assembly 322 may be engaged by a pallet sleeve lifter 910. The pallet sleeve lifter 910 may begin to perform a pallet sleeve lifting action 1002 in order to raise the pallet sleeve 908 and begin exposing the MTBH 402 loaded onto the pallet 904

The actuator system 914 may initiate rotational wrapping actuation 1004 and a wrapping material spool pin lifting action 1006, traveling around the rotary ring 918 and thus moving the wrapping material spool pin 924 around the MTBH 402 to be wrapped. This may result in the rotational wrapping 1008 of the MTBH 402 in wrapping material 1010, starting at the pallet 904 level and spiraling upward as the pallet sleeve 908 is raised, until all MTBH 402 has been freed from the pallet sleeve 908 and securely wrapped.

In one embodiment, the connection between the actuator system 914 and the wrapping material spool pin 924 may be dynamically adjustable, such that the actuator system 914 moves in the horizontal plane and not vertically while raising the wrapping material spool pin 924. In another embodiment, the rotary ring 918 may be configured to lift concurrently with the pallet sleeve 908, raising the actuator system 914, which may be statically connected to the wrapping material spool pin 924, which may thus be lifted as well. In one embodiment, a stationary wrapping material spool pin 924 may be used in conjunction with a device that rotates the pallet sleeve assembly, provided the pallet sleeve lifter 910 accommodates pallet sleeve rotation. One of ordinary skill in the art will readily apprehend other configurations for implementing this disclosure.

Figure 11B:
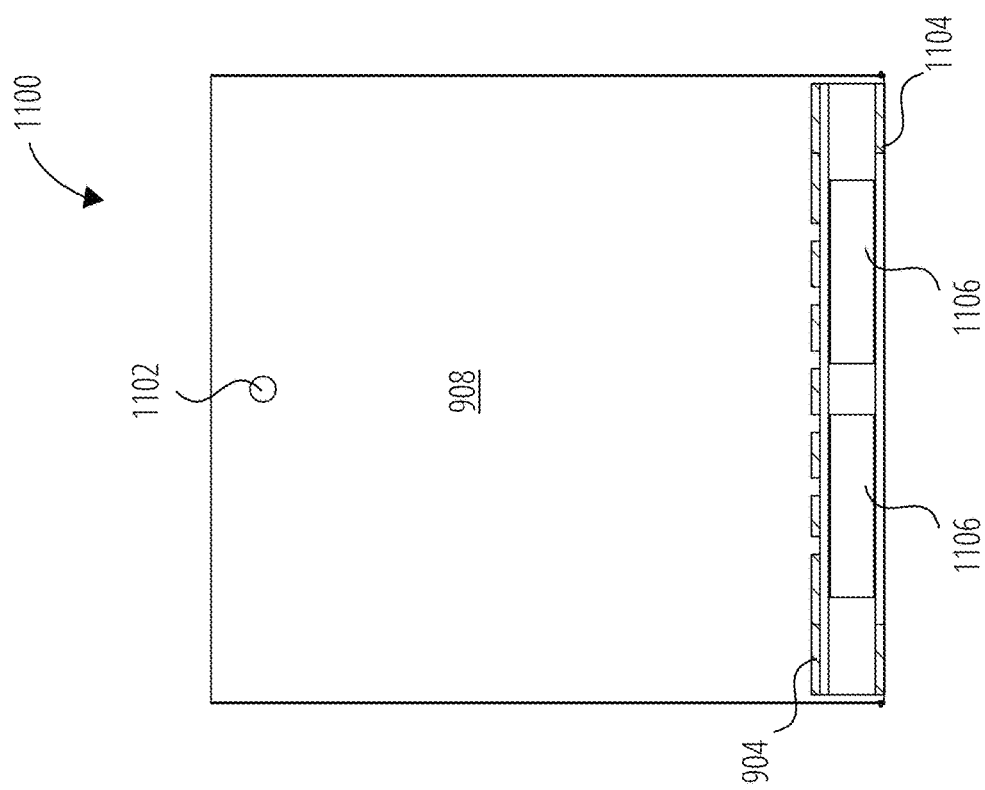
FIG. 11B illustrates a front elevation view of the pallet sleeve assembly 1100 in accordance with one embodiment.
Figure 11A:
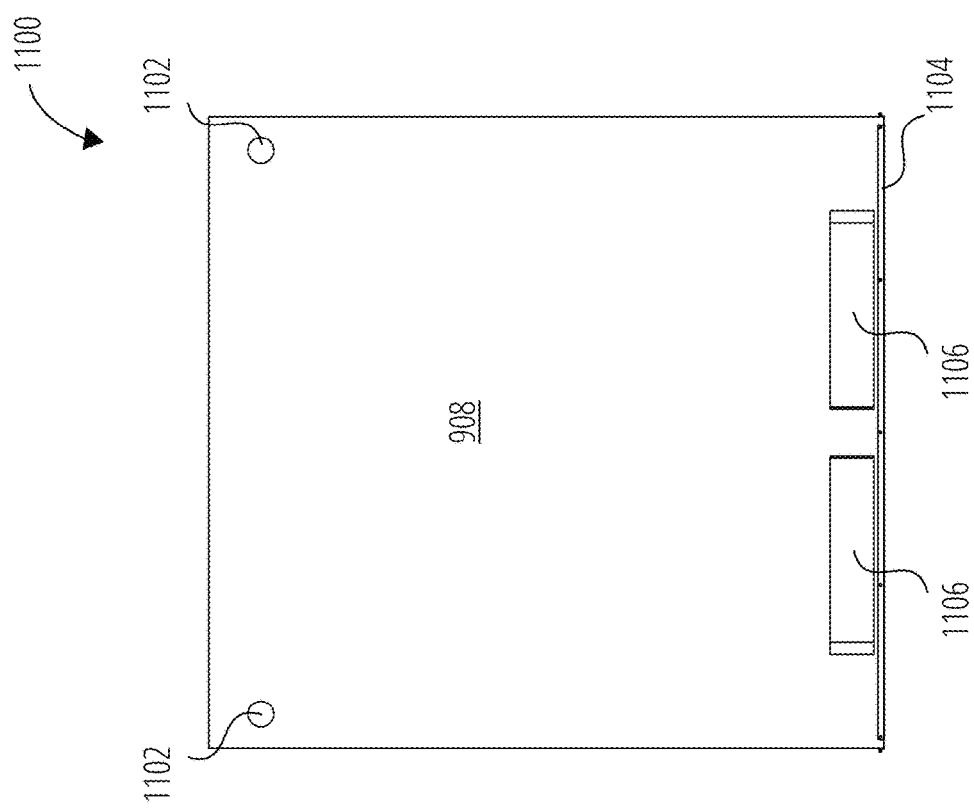
FIG. 11A illustrates a side elevation view of a pallet sleeve assembly 1100 according to various embodiments of the present disclosure.
Figure 11C:
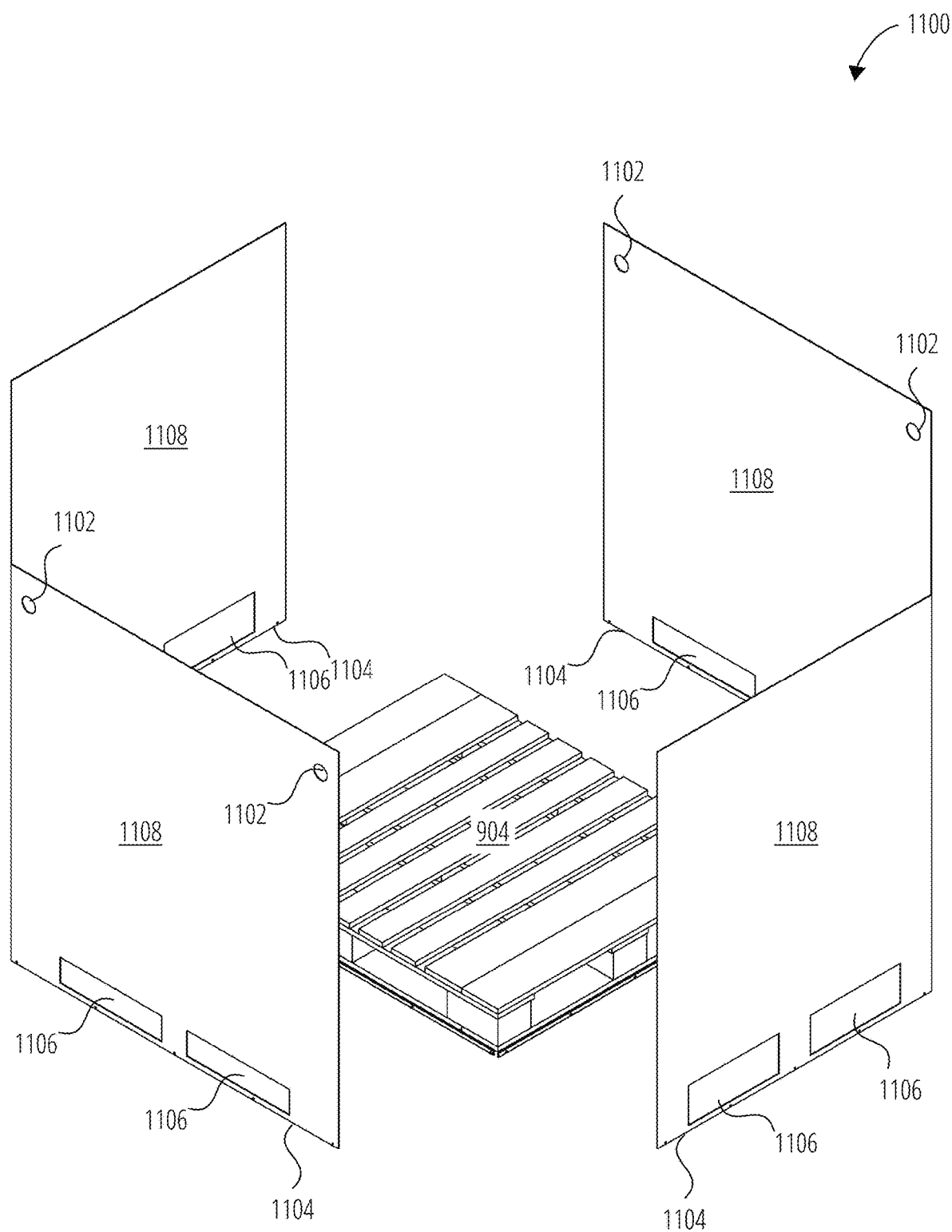
FIG. 11C illustrates a perspective exploded view of a pallet sleeve assembly 1100 in accordance with one embodiment.

FIG. 11A illustrates a side elevation view of a pallet sleeve assembly 1100 according to various embodiments of the present disclosure. FIG. 11B illustrates a front elevation view of the pallet sleeve assembly 1100, and FIG. 11C illustrates a perspective exploded view of a pallet sleeve assembly 1100 showing the interface between pallet sleeve 908 and pallet 904 carrying a load in need of stabilization. The pallet sleeve assembly 1100 is a multi-part assembly that supports the palletization, transportation, storage, retrieval, and de-palletizing of products. It is meant to be lightweight and mass-producible at low cost and therefore has few elements to it.

A pallet sleeve 908 may comprise structural walls. These structural walls may be made out of aluminum, steel, plastic, wood, or other suitably lightweight, rigid, and sturdy materials such that they retain their shape during loading, transportation, storage, retrieval, and unloading. The main purpose of a pallet sleeve assembly 1100 is to provide support during the palletization steps, as well as during transport and storage if the at least partially stacked pallet sleeve assembly 322 is not to be wrapped for storage. A conventional and commonly used pallet 904 may be 40 inches wide by 48 inches long by 5.6 inches tall. One of ordinary skill in the art will readily apprehend that a pallet sleeve 908 may be variously sized in the horizontal plane based on the dimensions of different pallet 904 and rotary ring 918 footprints, and in the vertical plane to accommodate different load heights. The pallet sleeve 908 may be sized to easily slide over a pallet while fitting within a rotary ring 918 of an automated pallet load stabilization system 900 as illustrated in FIG. 9A, which may have an inner diameter of around 74 inches. For example, a pallet sleeve 908 may be 42 inches by 40 inches, giving it an inch of clearance all around a conventional pallet, while allowing it to still fit within a conventional rotary ring as previously described. A pallet sleeve 908 may be 66 inches tall in order to support loads of up to five feet in height on a conventional 5.6-inch tall pallet or may be made taller to support taller loads or shorter to support shorter loads while reducing material usage.

Lifting features 1102 may be provided to assist in the location and lifting of pallet sleeve 908 from pallet 904. Such lifting features 1102 may be tooling holes that provide a kinematic mount to engage during assembly or disassembly as part of the stretch wrapping process, as described with respect to FIG. 9A. The lifting features 1102 may be designed to allow an actuator such as the pallet sleeve lifter 910 to engage with and lift the pallet sleeve up during the pallet building operation, and then to lower it down afterward.

Clearance holes 1106 may be configured to allow a forklift to enter pallet sleeve 908 and engage with pallet 904 and pallet sleeve 908 together. The clearance hole 1106 may be provided on all sides of the pallet sleeve 908. A wear surface 1104 may be included to provide a non-metal-to-metal, wear-resistant interface between the sleeve and the MHE that it will move on. The wear surface 1104 may be made from materials such as ultra-high molecular weight (UHMW) polyethylene, acetal, polyvinyl chloride (PVC), or acrylonitrile butadiene styrene (ABS). The four sides of the pallet sleeve 908, or sleeve walls 1108, may be unique pieces that are assembled in place. Sheet metal or other methods for fixing the parts together may be utilized.

Figure 12B:
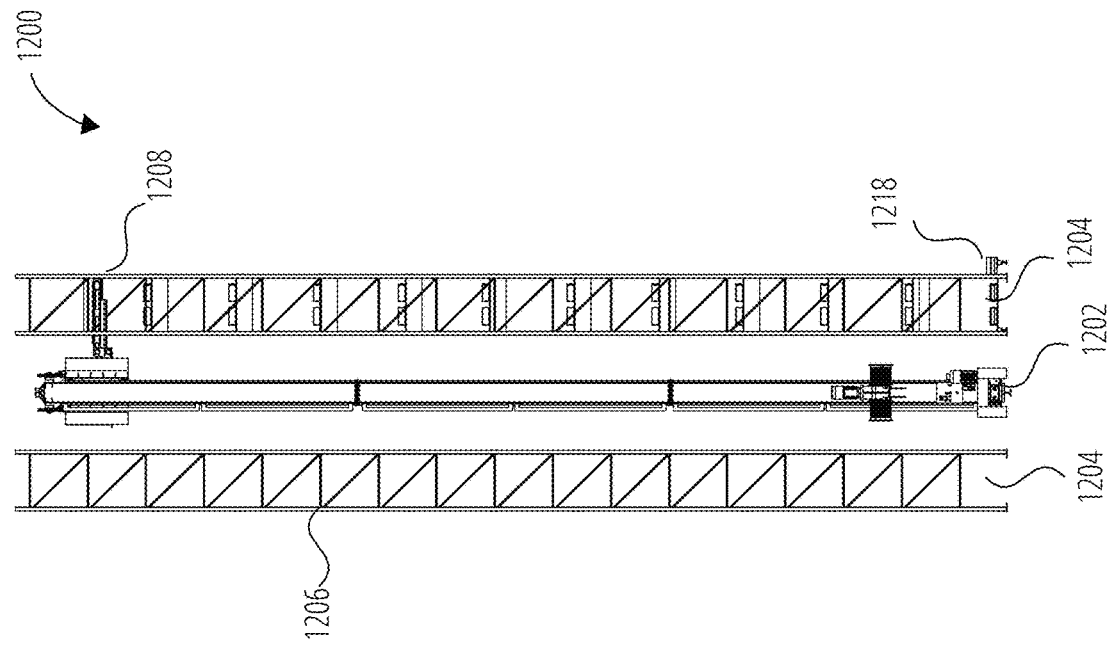
FIG. 12B illustrates a front elevation view of the automated crane storage and retrieval system 1200 in accordance with one embodiment.
Figure 12A:
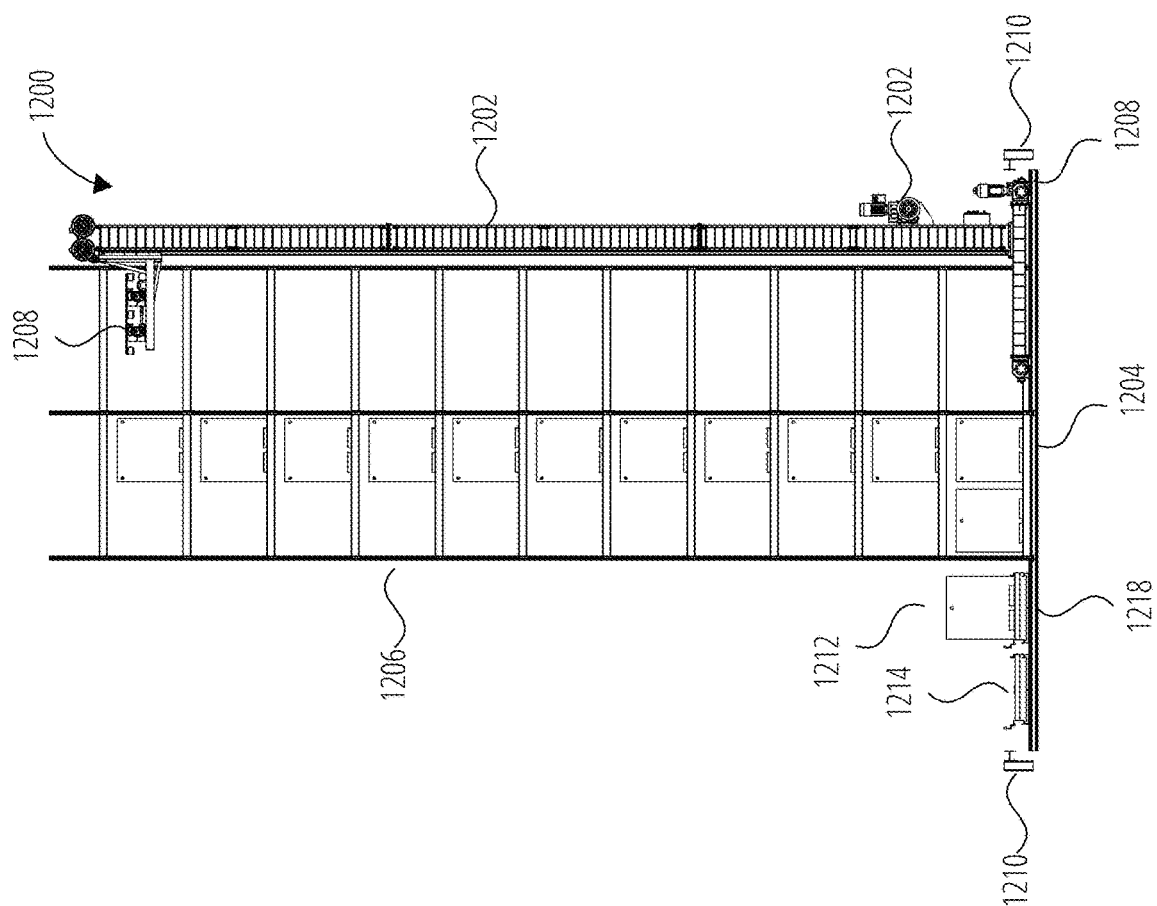
FIG. 12A illustrates a side elevation view of an automated crane storage and retrieval system 1200 according to various embodiments of the present disclosure.
Figure 12C:
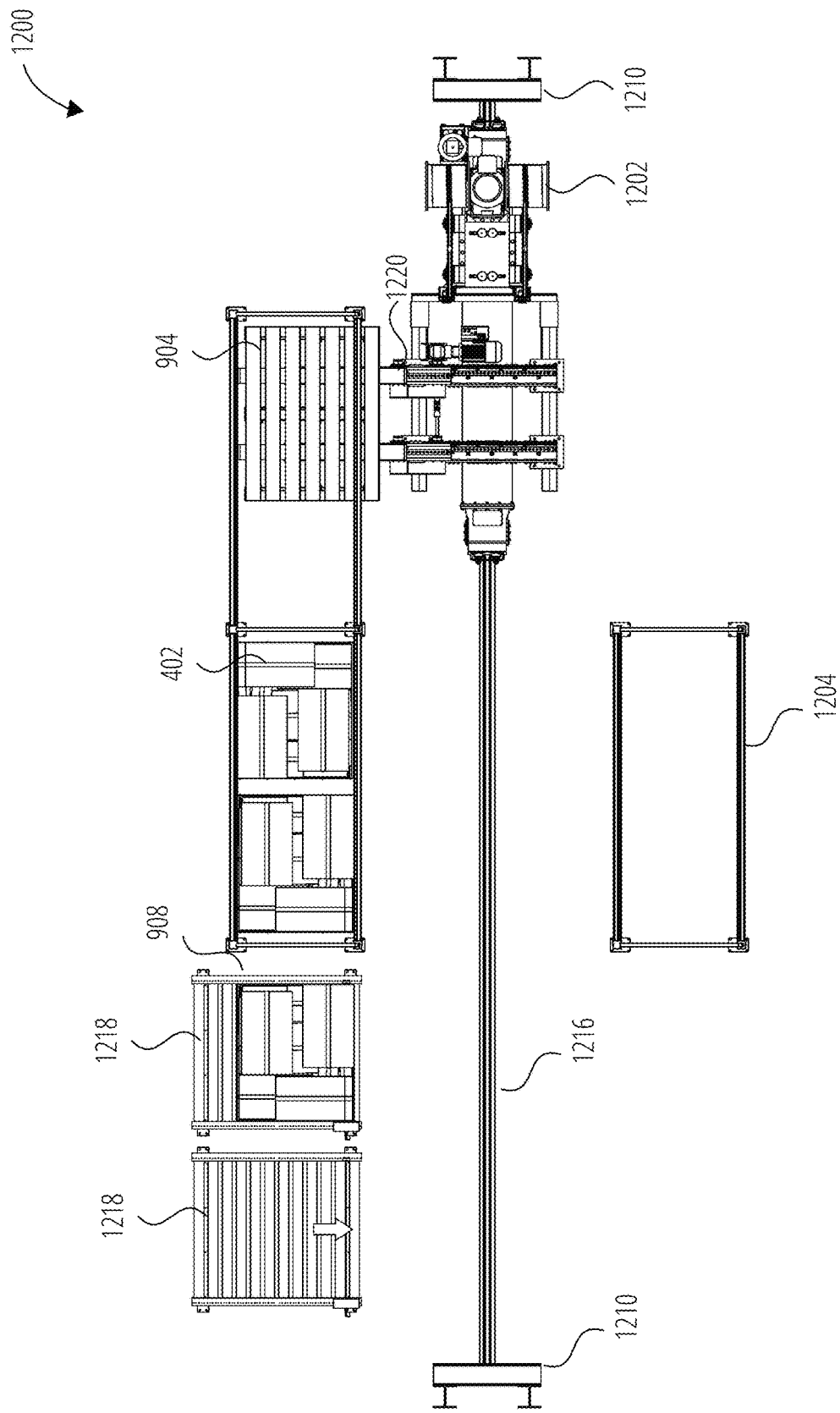
FIG. 12C illustrates a plan view of the automated crane storage and retrieval system 1200 in accordance with one embodiment.

FIG. 12A illustrates a side elevation view of an automated crane storage and retrieval system 1200 according to various embodiments of the present disclosure. FIG. 12B illustrates a front elevation view of the automated crane storage and retrieval system 1200, and FIG. 12C illustrates a plan view of the automated crane storage and retrieval system 1200.

Manual systems such as forklifts and very narrow aisle or reach trucks may be used. For this embodiment, an automated crane storage and retrieval system 1200 including a pallet crane 1202 is depicted. This allows for full automation of the flow of materials from the inbound docks to the palletizer, to the stretch wrapper, and into storage as shown. When a product is put into queue 1212, pallet crane 1202 may move to the pickup location 1208 and the pallet end-effector 1220 may grab pallet 904. Similarly, when a pallet is in storage the operation may be reversed. An additional drop-off location 1214 may allow the mobile robot or manual forklift to drop the product off at queue 1212. Storage racks 1204 may be configured, each having enough clearance to place the pallet-sleeve pair into a storage location and to retrieve them. High bay pallet racking 1206 may be used, where racking heights may extend up to 130' tall and provide hundreds of thousands of storage locations. The height of the pallet crane 1202 is governed by the height of the clearance available, the storage racks 1204 it needs to reach, and the stability of the crane configuration. The pallet sleeve 908 may be designed to accept transfer from the pallet crane 1202. A pallet sleeve 908 may be designed to accept thousands of use cycles and may have an estimated return on investment of roughly 500 pallets assuming that each pallet costs $1.50-1.75 in stretch wrap materials. End stops 1210 of the pallet crane 1202 may allow side-to-side movement of the pallet crane 1202 between storage racks 1204. During the transport of pallet sleeve 908, the sleeve may remain on the outside of the pallet with its bottom surface riding along with the pallet on the MHE. The pallet sleeve 908 may be designed to be a removable outer shell. Additionally, the pallet sleeve assembly 1100 may be designed to allow a remote automatic pallet crane 1202 that is not on rails 1216 to come and remove cases from the storage as long as enough clearance is present between the pallet sleeve 908 and the storage racks 1204.

Pallet sleeve assemblies 1100 may enter from MHEs 1218 and the pallet crane 1202 may traverse its rails 1216 to pick them up. Once on pallet crane 1202, pallet sleeve assemblies 1100 may be transported to any storage location contained in the storage racks 1204. The end stops 1210 of the pallet crane 1202 are shown as relatively near each other; however, typical configurations of an automated crane storage and retrieval system 1200 may be very long. This depicts one of the core capabilities of the system, in that pallet sleeve assemblies 1100 may be stored in very large storage systems without fear that the pallet stack may become unstable, additionally with a special type of robotic system cases could be removed while the pallet is in storage.

FIG. 13 illustrates an unloading control system 1300 in accordance with one embodiment. The unloading control system 1300 may comprise perception systems 1302, industrial control systems 1304, and computer system 1306 configured to perform the disclosed activities, as described with respect to the automated truck unloading routine 1700 of FIG. 17 and the end-to-end control system diagram 1600 of FIG. 16.

In one embodiment, the perception systems 1302 may receive input from camera systems 1308, load cells 1310, pressure sensors 1312, and other sensors 1314 such as LIDAR, inertia measurement units, sonic locators, etc. The industrial control systems 1304 may include control for the pneumatics 1316 and hydraulics 1318 for the industrial equipment of the robotic unloading system 300, as well as encoders 1320 and motors 1322 for the mechanical and robotic components of the robotic unloading system 300.

Figure 23:
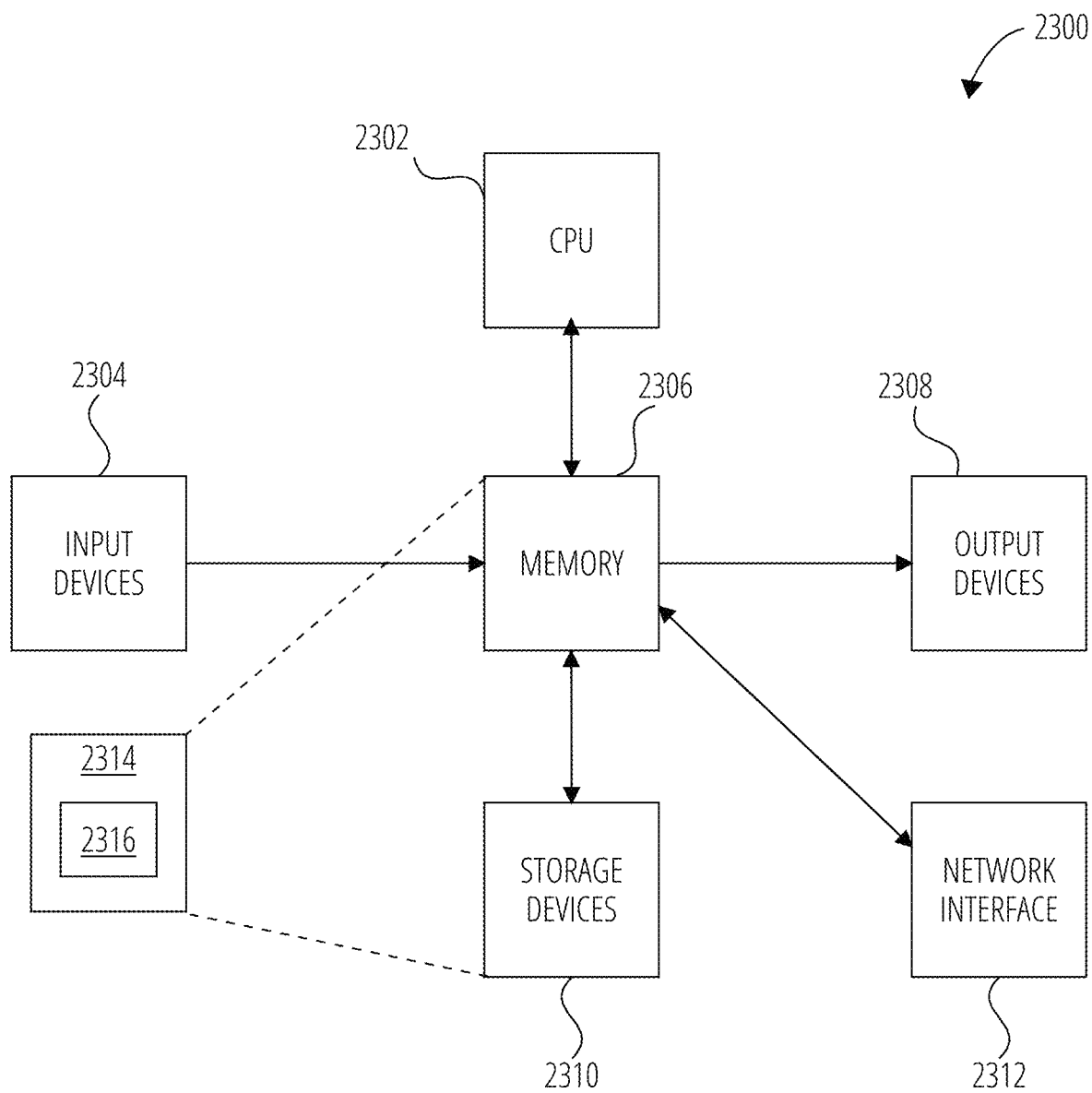
FIG. 23 illustrates an embodiment of a computing device 2300 to implement components and process steps of the system described herein.

The computer system 1306 of the unloading control system 1300 may comprise computing devices 2300 such as are described with respect to FIG. 23. The data and logic needed to perform the disclosed activities may be stored on any number of computing devices 2300 including the computer system 1306, which may be connected via wired and/or wireless network technology.

"Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Figure 14:
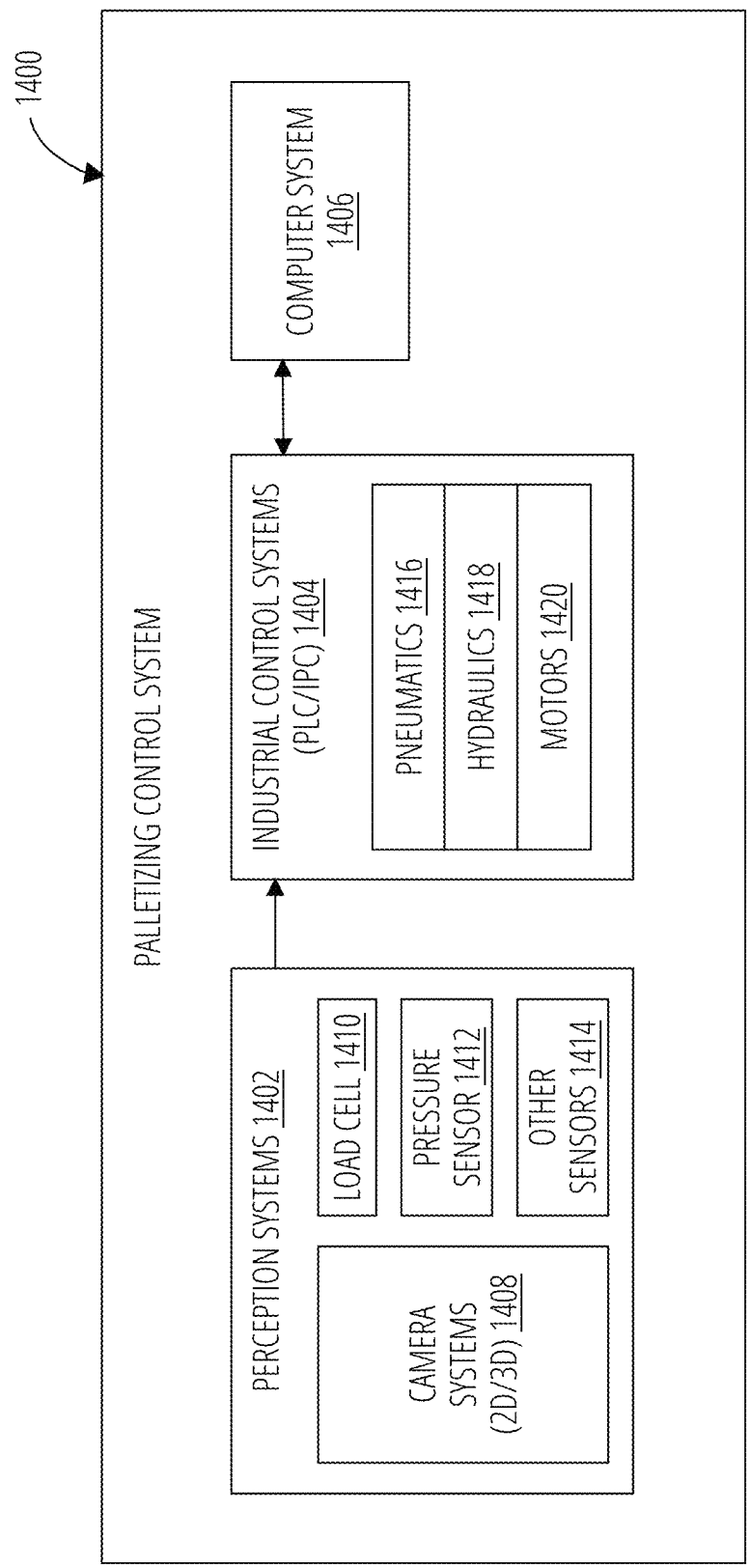
FIG. 14 illustrates a palletizing control system 1400 in accordance with one embodiment.

FIG. 14 illustrates an unloader palletizing control system 1400 in accordance with one embodiment. The palletizing control system 1400 may comprise perception systems 1402, industrial control systems 1404, and computer systems 1406 configured to perform the disclosed activities, as described with respect to the automated palletizing system 318 of FIG. 3A-FIG. 3C and the end-to-end control system diagram 1600 of FIG. 16.

In one embodiment, the perception systems 1402 may receive input from camera systems 1408, load cells 1410, pressure sensors 1412, and other sensors 1414 such as LIDAR, inertia measurement units, sonic locators, etc. The industrial control systems 1404 may include control for the pneumatics 1416, hydraulics 1418, and motors 1420 for the industrial equipment of the automated palletizing system 318.

The computer system 1406 of the palletizing control system 1400 may comprise computing devices 2300 such as are described with respect to FIG. 23. The data and logic needed to perform the disclosed activities may be stored on any number of computing devices 2300 including the computer system 1406, which may be connected via wired and/or wireless network technology.

Figure 15:
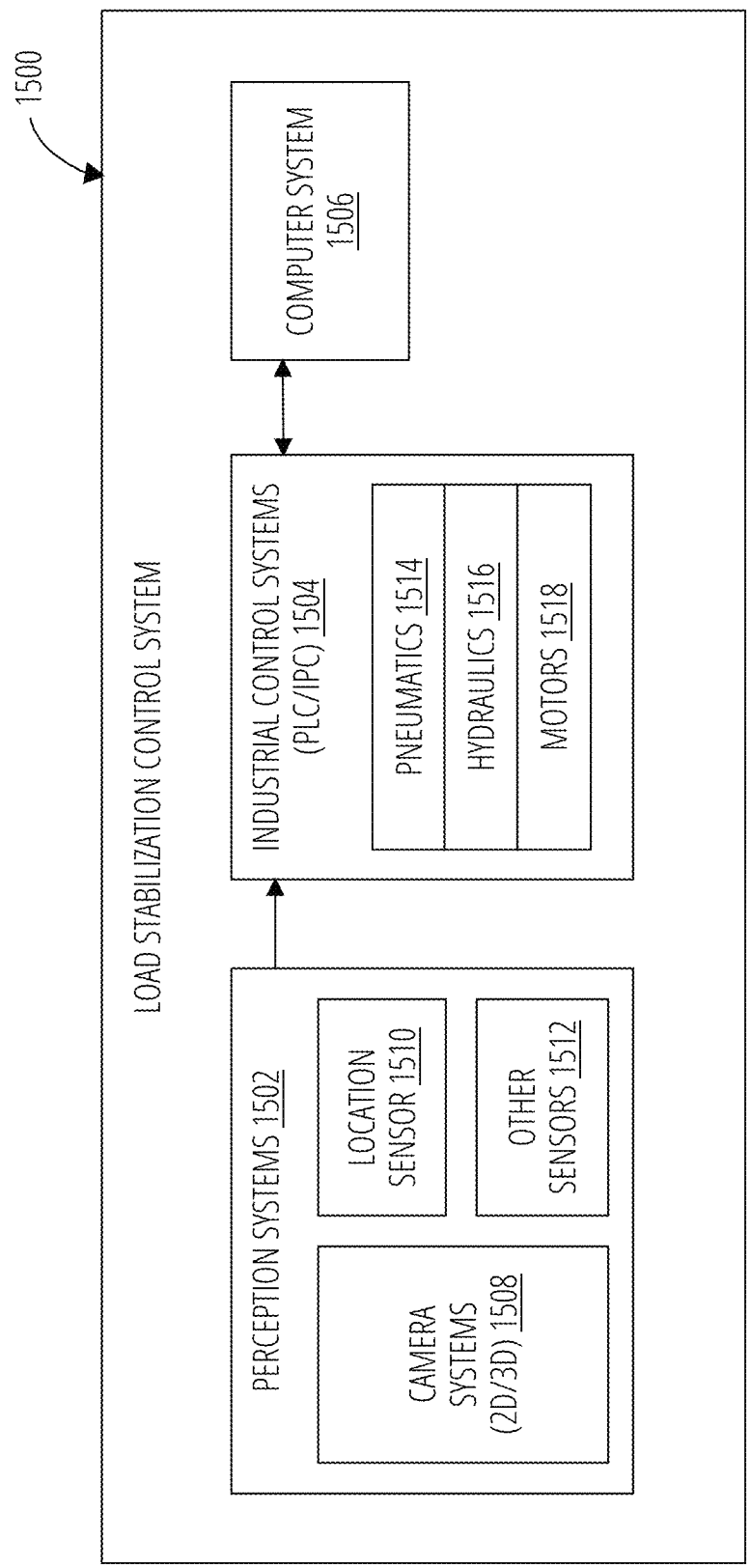
FIG. 15 illustrates a load stabilization control system 1500 in accordance with one embodiment.

FIG. 15 illustrates an unloader load stabilization control system 1500 in accordance with one embodiment. The load stabilization control system 1500 may comprise perception systems 1502, industrial control systems 1504, and computer systems 1506 configured to perform the disclosed activities, as described with respect to the automated pallet load stabilization system 900 of FIG. 9A and FIG. 9B and the end-to-end control system diagram 1600 of FIG. 16.

In one embodiment, the perception systems 1502 may receive input from camera systems 1508, location sensors 1510, and other sensors 1512 such as LIDAR, inertia measurement units, sonic locators, etc. The industrial control systems 1504 may include control for the pneumatics 1514, hydraulics 1516, and motors 1518 for the industrial equipment of the automated pallet load stabilization system 900.

The computer system 1506 of the load stabilization control system 1500 may comprise computing devices 2300 such as are described with respect to FIG. 23. The data and logic needed to perform the disclosed activities may be stored on any number of computing devices 2300 including the computer system 1506, which may be connected via wired and/or wireless network technology.

FIG. 16 illustrates an end-to-end control system diagram 1600 in accordance with one embodiment. The end-to-end control system diagram 1600 shows key communications and MTBH flow between the robotic unloading system 300, the automated palletizing system 318, the mobile transport fleet manager 1604 and the AMRs 324 it manages, the automated pallet load stabilization system 900, and the automated crane storage and retrieval system 1200, in order to manage unloading, handling, and storage of MTBH 402 throughout a material handling facility.

The robotic unloading system 300 may be configured with an unloading control system 1300, such as that illustrated in FIG. 13. The automated palletizing system 318 may be configured with a robotic unloading system 300 such that illustrated in FIG. 14. The automated pallet load stabilization system 900 may be configured with a load stabilization control system 1500 such as that illustrated in FIG. 15. Each of these controllers may include computer systems that transmit control communications 1602 to each other over a wired or wireless network. These controllers may further be networked to communicate with the mobile transport fleet manager 1604 that manages the AMRs 324 via wireless fleet control 1606. In one embodiment, all of the computer systems within a material handling facility may be wired to a facility-wide EtherCAT network.

The unloading control system 1300 may access and update stored unloading data 1608, such as container inventory 1610, picking sequence 1612, and picking rate 1614. The palletizing control system 1400 may access and update stored palletization data 1616 such as incoming box sequence 1618, sortation logic 1620, pallet status 1622, and current MTBH quantity per pallet 1624.

During a typical material unloading and handling job, MTBH 402 may be transferred from the robotic unloading system 300 to the automated palletizing system 318, via conveyors and other MHE. After palletization, the MTBH 402 may be carried by AMRs 324 to either the automated pallet load stabilization system 900 in order to be wrapped for storage without a pallet sleeve or sent directly to the automated crane storage and retrieval system 1200 for storage within a pallet sleeve. Shrink wrapped pallet loads may be accepted by AMRs 324 and carried thence to the automated crane storage and retrieval system 1200.

The speed at which the end-to-end system functions may be determined by the rate at which MTBH 402 is palletized at the automated palletizing system 318. The palletizing control system 1400 may receive manifest information, including the quantity, size, and type of MTBH 402 included in a container to be unloaded. Using this information, the palletizing control system 1400 may determine a set of pallet loads to be filled as unloaded MTBH 402 arrives at the automated palletizing system 318. This data may be used by sorting MHE feeding the automated palletizing system 318.

In one embodiment, MHE may direct the MTBH to a small buffer lane. However, when the MTBH flows directly to the automated palletizing system 318, the number in the shipping manifest may be accounted for as palletized and may be used to inform the automated unloader 500 as to the picking order to optimally fill the pallet or pallets in progress. The automated unloader 500 may be programmed to pick-to-exhaustion to reduce the amount of MTBH that needs to be sidelined or sorted to a buffer area.

In one embodiment, the manifest data, in combination with other stored unloading data 1608, as well as picking sequence 1612 data that may be provided by the unloading control system 1300, may be used by the computer system 1406 of the palletizing control system 1400 as inputs to a flow control feedback loop 1626 to monitor or calculate a rate 1628 at which palletization is performed by the automated palletizing system 318. Rate data 1630 may then be communicated out as part of control communications 1602 to other control components such as the mobile transport fleet manager 1604, the unloading control system 1300 of the robotic unloading system 300, and the load stabilization control system 1500 of the automated pallet load stabilization system 900. These components may use the rate data 1630 to control the speeds at which they perform their local tasks, in order to provide the smoothest flow of MTBH 402 across the entire end-to-end system.

Figure 17:
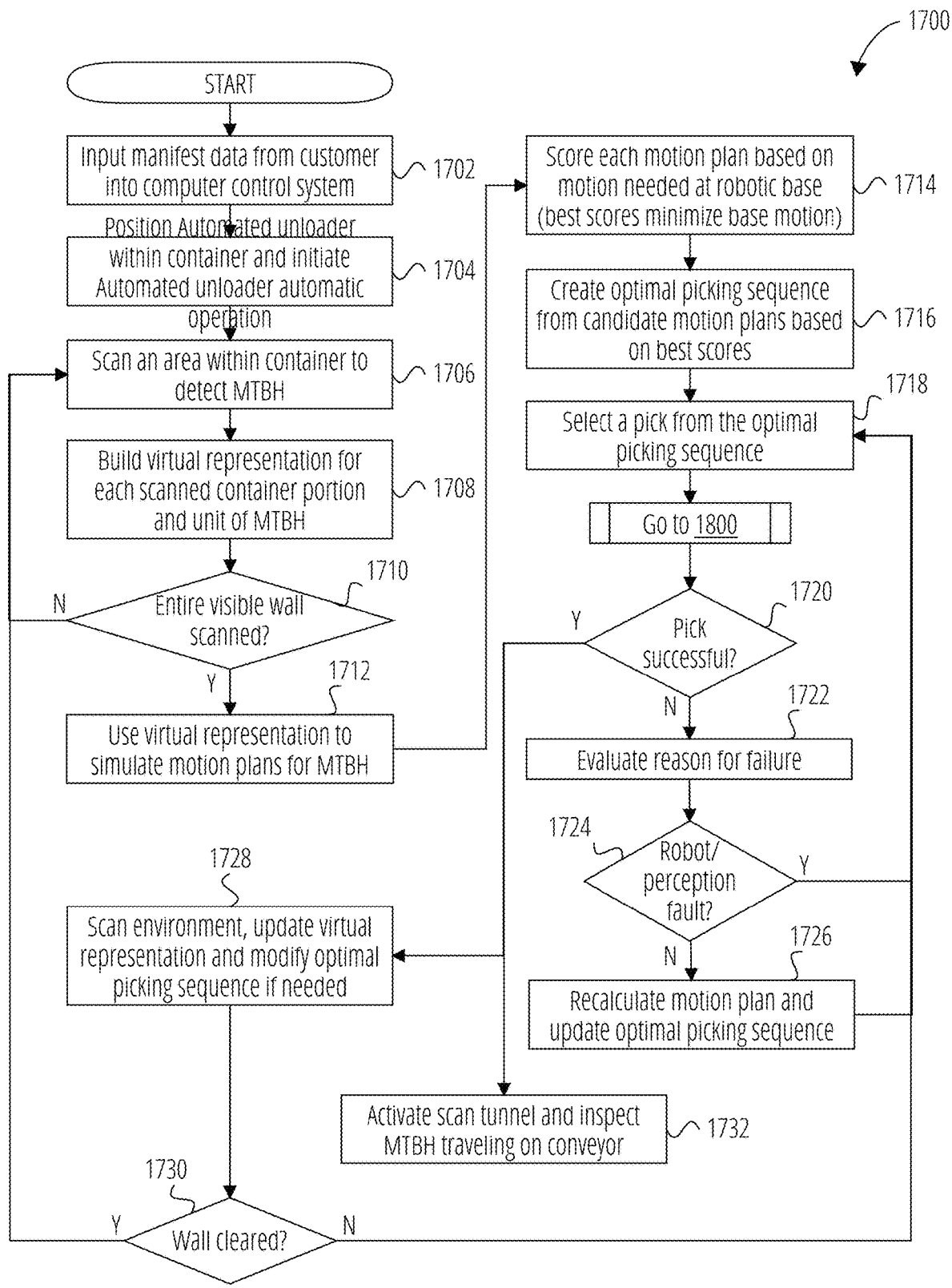
FIG. 17 illustrates an automated truck unloading routine 1700 in accordance with one embodiment.

FIG. 17 illustrates an example automated truck unloading routine 1700 that may be performed by the automated unloader (Automated unloader) such as the automated unloader 500 illustrated in FIG. 5A and FIG. 5B. Although the example automated truck unloading routine 1700 depicts a particular sequence of operations, the sequence may be altered without departing from the scope of the present disclosure. For example, some of the operations depicted may be performed in parallel or in a different sequence that does not materially affect the function of the automated truck unloading routine 1700. In other examples, different components of an example device or system that implements the automated truck unloading routine 1700 may perform functions concurrently or in a specific sequence.

According to some examples, the automated truck unloading routine 1700 includes inputting shipping manifest data provided by a customer into a computer control system at block 1702. The computer control system may include one or more computing devices 2300 as described with respect to FIG. 23. Shipping manifest data may include an inventory of each item of MTBH within a container, including the SKU, weight, height, width, and length of each MTBH.

According to some examples, the automated truck unloading routine 1700 includes positioning an automated unloader 500 within a transportation container. An onsite operations team at the material handling facility may receive the container, trailer, or truck at a loading dock as shown in FIG. 4. The container may be opened by the team and the Automated unloader may be manually placed within the container at a location suitable for the automated unloader's initial scans and movements upon beginning automated operation. The team may then place the Automated unloader into its automated mode, and the Automated unloader may and initiate automatic operation at block 1704.

According to some examples, the automated truck unloading routine 1700 includes scanning an area within container to detect MTBH at block 1706. The scan may be performed by perception sensors such as cameras, LIDAR, barcode scanners, etc. In one embodiment, the sensors may provide a detailed scan of a three-foot by three-foot area, such that one scan may not cover an entire wall of boxes or packages comprising the MTBH stacked within a trailer, truck, or other container. To provide complete coverage, each articulated robot may use its camera to create a map of its side of the container, ensuring an overlap between the scans taken. In such a case, the Automated unloader may begin scanning at a default upper-left position based on anticipated or inputted dimensions of the shipping container or trailer. In another embodiment, a lower resolution overall scan may be acquired first to indicate initial dimensions for a wall of MTBH stacked within the container, with more detailed scanning beginning with upper-leftmost MTBH detected. A scan may in some embodiments take on the order of 0.5 seconds to acquire and process, allowing scans to be taken of multiple areas without a deleterious loss of time.

The system may scan the face of boxes stacked within a container, and may locate them in three-dimensional space with regard to three cartesian locations and three rotational offsets from a principle axis. This is the amount of information needed to define a three-dimensional object in three-dimensional space. The three translational components and three rotational components may define the position and orientation of the boxes in space, and from that the face of each side, and the contact normal point that is represented as the centroid of the picking face.

In circumstances where the picking face is not flat, an approximation of the centroid over the surface topology may be made. In one embodiment, the automated unloader 500 may comprise two separate industrial collaborative robots attached to the base of the Automated unloader, as illustrated in FIG. 5A. Each robot may be responsible for scanning its own portion of the shipping container (i.e., the right portion or the left portion, as sensed by the robots facing directly into the container). The two portions may include some overlap to ensure that no gaps are left in the scanned MTBH data.

According to some examples, the automated truck unloading routine 1700 includes building virtual representation for each scanned container portion and unit of MTBH at block 1708. The virtual representation in one embodiment may be generated by the master robot controller or robot operating system (ROS) computer. The program may have underlying code that sets up the expected environment and parameters, and interfaces to provide TCP/IP control over the motion of the robot. Behavior trees may be used to complete the virtual representation from the robotic scans. Behavior trees provide a mathematical model comprising a root node, control flow nodes, and execution notes, and are used to represent complex operations as a series of simple operations, as is well understood by those of skill in the art. The software stack for the system may run on a simulation framework such as Gazebo. RViz or similar programs may be used to represent the visualization of perception sensors.

The virtual representation may use an estimate of six DOF for the pose of each unit of MTBH detected within the container. In one embodiment, the Automated unloader control system may access the shipping manifest inputted in block 1702 via an application programming interface (API) connection to the customer's warehouse management system. The virtual representation may be verified for expected boxes, and data provided by the manifest may be used to confirm that the boxes detected are within the handling constraints of the unloading robots. For example, unloading robots may be able to handle MTBH with dimensions at or below 24 inches and having a weight of 30 pounds or less. Where any detected and manifested items exceed those parameters, these may be ignored in the resulting unloading plans, or may necessitate handling such as pushing to one side rather than picking up.

If the entire visible wall has not yet been scanned at decision block 1710, the automated truck unloading routine 1700 may return to block 1706 in order to identify and scan a next area of the container interior. This next scanning area may overlap with the previous area scanned such that no gaps are left in the scanned MTBH data. If the entire visible wall has been scanned at decision block 1710, the automated truck unloading routine 1700 may continue to block 1712.

According to some examples, the automated truck unloading routine 1700 includes using the virtual representation built iteratively through the completion of block 1708 for the entire visible wall scanned to simulate motion plans for MTBH at block 1712. For each candidate item of MTBH, motion paths that are feasible, safe, and complete from source location to destination location may be calculated. However, each face of the MTBH is not always available, so the picking sequence may also be taken into account. The motion plans for each MTBH may be functions of the incremental positions to be assumed by the moveable base attaching the industrial collaborative robots to the loading conveyor. Motion plans such as those provided in the Open Motion Plan Library (OMPL) generated by Kavraki Lab may be used.

Different motion plans may control the robots for different segments. For example, where it is important that the robot follow a particular line of motion, cartesian motion planning may be used. Where space to operate is constrained, a probabilistic roadmap may be constructed and stored as a graph with nodes corresponding to collision-free configurations and edges corresponding to feasible paths of motion between those configurations. Motion plans may take in the state of the environment (such as absolute and relative locations of the six sides of each box within the bounds of a container), the state of the automated unloader 500 (such as robot joint angles, encoder data, and information from other sensors), and a high-level plan from behavior trees. The output of the motion plan may be a trajectory comprising a sequence of six floating point variables representing the joint angles as a function of time, which may be sent to the motors of the robots for execution.

The scanned data may be added to a learning library in some embodiments and may be input into machine learning in order to train a machine learning algorithm to more expeditiously detect and identify MTBH from classification and segmentation of features detected through scanning sensors. In one embodiment, a machine learning installation such as Fizyr may be used. Machine learning may over time assist in understanding the pose of MTBH for a good pick given candidates detected. Successful and failed picks may be used for reinforcement learning.

The virtual representation may also be stored for use in internal testing and verification, as well as continuous integration of new data, such that a "digital twin" of the real-world packing configuration of the shipping container is maintained. The digital twin conceptualization, familiar in the fields of automation and robotics, provides the ability to test operation code in a simulation environment before or in parallel with execution in the real environment.

According to some examples, block 1714 of the automated truck unloading routine 1700 includes scoring each motion plan generated at block 1712 based on motion needed at the robotic base in order to accomplish the pick. As described with respect to FIG. 5A and FIG. 5B, industrial collaborative robots that accomplish the picking may be mounted on a base residing at the end of a loading conveyor that is capable of lateral motion forward and backward (i.e., extension further into the container or retraction toward and out of the container opening), as well as rotational motion from left to right (pivoting at the illustrated loading conveyor pivot). In one embodiment, the load conveyor may also be able to pivot upward and downward at the loading conveyor pivot through lifting mechanisms. These ranges of motion provided at the base may also be referred to as auxiliary degrees of freedom (in contrast with the six degrees of freedom that may be provided by each individual robot). The best scores for each motion plan may be associated with plans that minimize this lateral and rotational motion of the base, as well as vertical adjustments where applicable. In one embodiment, factors such as position, velocity, acceleration, jerk, snap, trajectory normalized distance, and other attributes related to the configuration space, free space, target space, and obstacle space may be involved in scoring. The scoring algorithm may apply different weights to these variables based on the different physical environment configurations and properties of the MTBH. For example, jerk and snap may be weighted more heavily when the MTBH is anticipated to contain fragile objects.

According to some examples, the automated truck unloading routine 1700 includes creating an optimal picking sequence from the candidate motion plans having the best scores at block 1716. Optimal picking sequences may include dual arm picking strategies for difficult MTBH (contrasting with a typical case of one robotic arm picking one item of MTBH independent of the actions of the other robot). The optimal picking sequences may also account for synchronization between the motions of the two arms, in order to prevent the actions of one robot to disrupt the actions of or even damage the other robot. Optimal picking sequences may also take into account timing for the motions of the tilting conveyor and may maximize the manipulability of the robot arms. To calculate these picking sequences, motion plans on each feasible face may be examined.

According to some examples, the automated truck unloading routine 1700 includes selecting a pick from the optimal picking sequence at block 1718. Each robot may independently perform a series of picks from the sequence according to the steps of the pick routine for individual articulated robot 1800 illustrated in FIG. 18. In one embodiment, the system may place the first item of MTBH onto an exception path conveyor rather than the loading conveyor, so that this item may be easily inspected later by the operations team. Where the container has been snake SKU loaded, or where its contents are mixed, the system may place the first of each unique SKU onto the exception path conveyor.

Different sizes of MTBH may impact the speed at which the articulated robots may perform the picks of the picking sequence. For very small boxes, the automated unloader 500 may be able to unload 700 to 1,400 cases per hour (CPH). Small and medium boxes, which the end effectors of the articulated robots may be primarily designed to handle, may be unloaded at a rate of 800 to 1,100 CPH and 800 to 1,200 CPH, respectively. Large boxes, such as those that are more than 20 inches in each dimension, may have a typical unloading rate of 600 to 900 CPH.

At decision block 1720, the automated truck unloading routine 1700 may determine whether or not the pick performed via pick routine for individual articulated robot 1800 was successful. If it is determined that the pick was not successful, the reason for failure may be evaluated at block 1722. A pick failure may be the result of an articulated robot fault, an end effector fault, a perception fault, a motion planning fault, or various other static or dynamic conditions in the unloading environment. If the failure is determined to be a robot, end effector, or perception fault at decision block 1724, the automated truck unloading routine 1700 may return to select a different pick from the optimal picking sequence at block 1718.

If the failure was determined to be due to reasons other than robot, end effector, or perception fault at decision block 1724, the motion plan may be recalculated and the picking sequence updated at block 1726. The motion plan and picking sequence may be recalculated based on the aspect ratio of the picking face of the item being picked, the item's weight as indicated in the shipping manifest, and/or individual dimensions of the object, such as its height, its width, or its length. The motion plan and picking sequence may also be updated based on the item's position relative to other MTBH, or other parameters of the environment comprising the container and MTBH. The new pick may be executed at this time or may be included in the picking sequence for later execution. The automated truck unloading routine 1700 may return to block 1718 to continue picking MTBH.

In one embodiment, if a fault, exception, or other failure occurs during operation in automatic mode, the operations team may stop automatic operation and enter a manual or maintenance mode. In one embodiment, the operations team may choose to manually remove the MTBH incurring the exception, setting it to the side, and may then allow the automated unloader 500 to continue operating in automated mode.

If the pick is determined to have been successful at decision block 1720, the automated truck unloading routine 1700 may continue to block 1728. According to some examples, the automated truck unloading routine 1700 includes scanning the environment, updating the virtual representation, and modifying the optimal picking sequence if needed at block 1728. In this manner, the digital twin of the container environment may be updated to account for the removal of the picked MTBH and may include MTBH newly revealed by the gap created by picking the previous item. If a new item of MTBH is detected, its position may be resolved and it may be added to the virtual representation. If a box that is already part of the virtual representation is detected, its scanned position may be compared to its position in the virtual representation to ensure that it has not moved to an extent that would disrupt its previously identified pick strategy. For example, if the MTBH has moved more than a position change threshold, its virtually represented position and its portion of the motion plan may be updated. Such a threshold may be absolute, such as three inches, or proportional, such as 40% of the item's dimension in the direction of motion (i.e., 4 inches for a 10-inch wide object that has shifted horizontally). In one embodiment, robot-mounted cameras or other sensors may be instructed to scan manually or automatically on-demand at any time during operation if a fault is detected in performance or the visual representation.

From decision block 1720, for successful picks, the automated truck unloading routine 1700 may also branch to block 1732. At block 1732, the scanning tunnel may be activated to inspect MTBH placed on the conveyor by the articulated robot performing pick routine for individual articulated robot 1800. In this manner, MTBH may be inspected as it travels along the telescoping transport conveyor toward the automated palletizing system. The scanning tunnel may perform a five- or six-sided scan to identify the MTBH with respect to expected items in the manifest using optical character recognition (OCR), machine learning, pattern matching, or other identification techniques that may be employed based on 2D and 3D imaging performed in the scanning tunnel. These techniques and actions may include turning on light panes when MTBH breaks a retro-reflective sensor beam, capturing an image from the scanning tunnel cameras, extracting logistics information such as SKU based on extraction and analysis of MTBH labels from image data, and verifying the extracted labels with the manifest for the container being unloaded.

At decision block 1730, the automated truck unloading routine 1700 may determine whether the visible wall scanned in blocks 1706 to 1710 has been entirely cleared. If the wall has not yet been cleared, the automated truck unloading routine 1700 may return to block 1718 to execute the next pick in the picking sequence. If the wall has been cleared at decision block 1730, the automated truck unloading routine 1700 may return to block 1706 to examine a next wall of MTBH, or to determine that no additional MTBH remains in the container. Once all MTBH has been removed from the container, the automated unloader 500 may retract back onto the dock automatically and may wait to be put into service with a new container.

Figure 18:
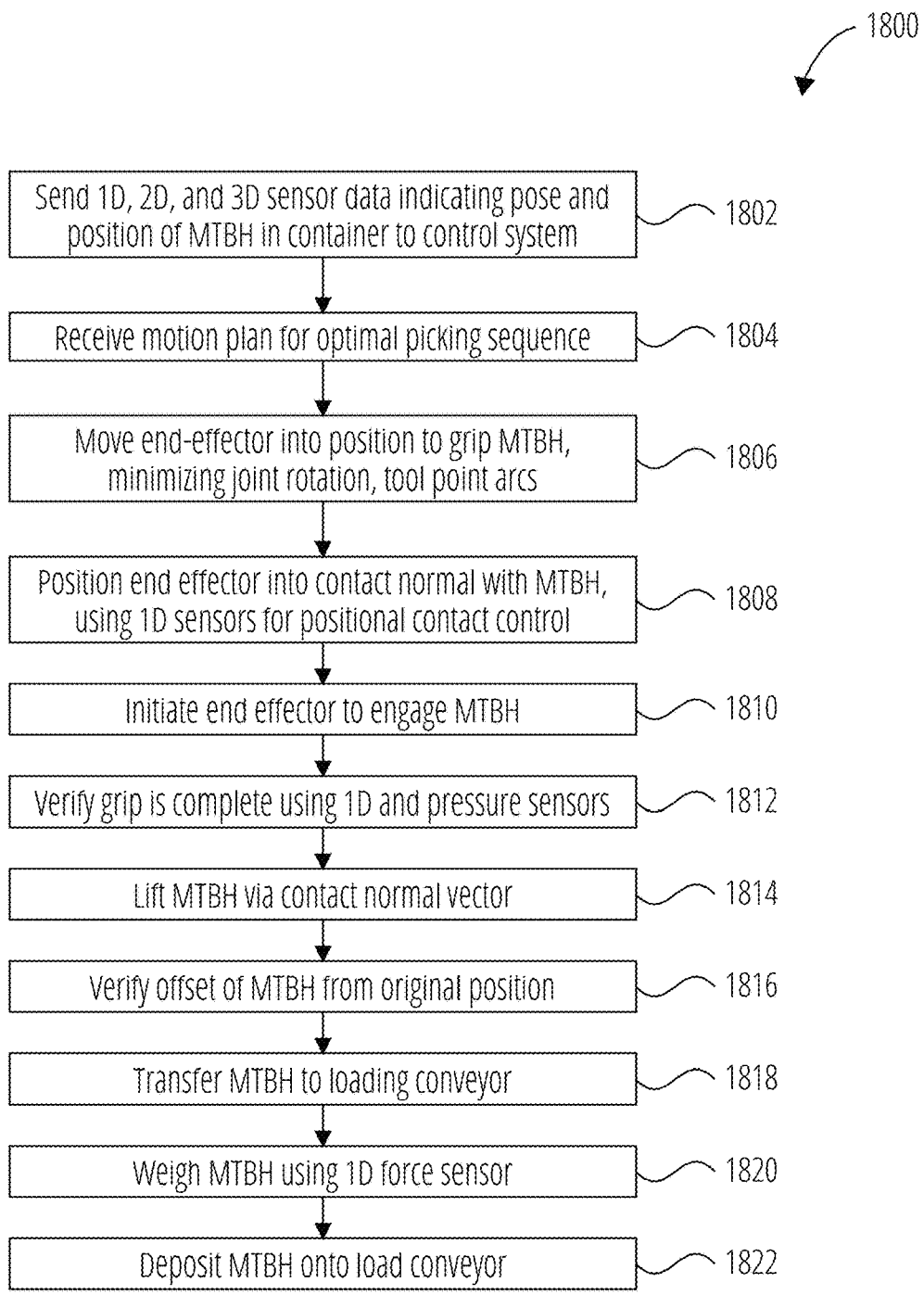
FIG. 18 illustrates a pick routine for individual articulated robot 1800 in accordance with one embodiment.

FIG. 18 illustrates an example pick routine for individual articulated robot 1800. Although the example pick routine for individual articulated robot 1800 depicts a particular sequence of operations, the sequence may be altered without departing from the scope of the present disclosure. For example, some of the operations depicted may be performed in parallel or in a different sequence that does not materially affect the function of the pick routine for individual articulated robot 1800. In other examples, different components of an example device or system that implements the pick routine for individual articulated robot 1800 may perform functions concurrently or in a specific sequence.

According to some examples, the pick routine for individual articulated robot 1800 includes sending 1D, 2D, and 3D sensor data indicating pose and position of MTBH in a container to a control system at block 1802. 1D sensors may include pressure sensors, load cells, sonic locators, or similar sensors that capture information relative to a one-dimensional point in space. 2D sensors may include cameras capable of capturing two-dimensional images representing a field of vision within the container. 3D sensors may include imaging technologies capable of detecting or calculating depths within a field of vision as well as the planar data captured by a 2D sensor. The control system may include or be connected to the unloading control system 1300 described with respect to FIG. 13.

According to some examples, the pick routine for individual articulated robot 1800 includes receiving motion plan for optimal picking sequence at block 1804. Motion plans may act to minimize the motion needed across non-robotic or auxiliary DOFs, as is described with respect to automated truck unloading routine 1700. The picking sequence data may instruct the robot how to move across its at least six DOF within three-dimensional space in order to contact a desired surface of an item of MTBH.

According to some examples, the pick routine for individual articulated robot 1800 includes moving its end effector into position to grip MTBH, minimizing joint rotation and tool point arcs at block 1806, following the discrete steps provided by the motion plan.

According to some examples, the pick routine for individual articulated robot 1800 includes positioning an end effector into contact normal with MTBH, using 1D sensors for positional contact control at block 1808. Contact normal refers to a position in which the end effector may engage with the MTBH in such a way that motion in a direction normal or perpendicular to the face of contact allows the articulated robot to pick the MTBH out of a wall or stack of other MTBH.

According to some examples, the pick routine for individual articulated robot 1800 includes initiating the end effector to engage MTBH at block 1810. In one embodiment, the end effector may be a pneumatic vacuum end effector. Initiating such an end effector may include making physical contact with a flat surface of the MTBH and engaging vacuum suction so as to pull the MTBH securely against the end effector, such that it may be held by this vacuum force as the articulated robot pulls it against the friction forces exerted by neighboring MTBH, and remains securely held against gravitational and inertial forces as the robot arm traverses empty space from the MTBH wall or stack to the loading conveyor. In another embodiment, the end effector may comprise fingers that engage with a pinching motion, or some other securement feature that may be engaged with MTBH, as will be readily understood by one of skill in the art.

According to some examples, the pick routine for individual articulated robot 1800 includes verifying grip is complete using ID and pressure sensors at block 1812. If the grip is not verified as complete, the robot may return to the beginning of the pick routine for individual articulated robot 1800, or may exit the pick routine for individual articulated robot 1800, allowing other actions to be taken in order to achieve a successful grip.

According to some examples, the pick routine for individual articulated robot 1800 includes lifting MTBH via the contact normal vector at block 1814 once the grip has been verified. In one embodiment, an offset of the MTBH from its original position may be verified at block 1816. This may provide another layer of confirmation that the grip is complete, and may allow a point of observation and calculation to ensure that nothing is currently obstructing the intended path of motion for the MTBH to the loading conveyor.

According to some examples, the pick routine for individual articulated robot 1800 includes transferring the MTBH to the loading conveyor at block 1818. The automated truck unloading routine 1700 may then at block 1820 weigh the MTBH using 1D force sensor at block 1820. In some embodiments, weighing may be completed by some other process, such as matching to a package manifest, using sensors in the loading conveyor or along other points of transit away from the container. The pick routine for individual articulated robot 1800 may conclude with depositing MTBH onto the loading conveyor at block 1822.

Figure 19:
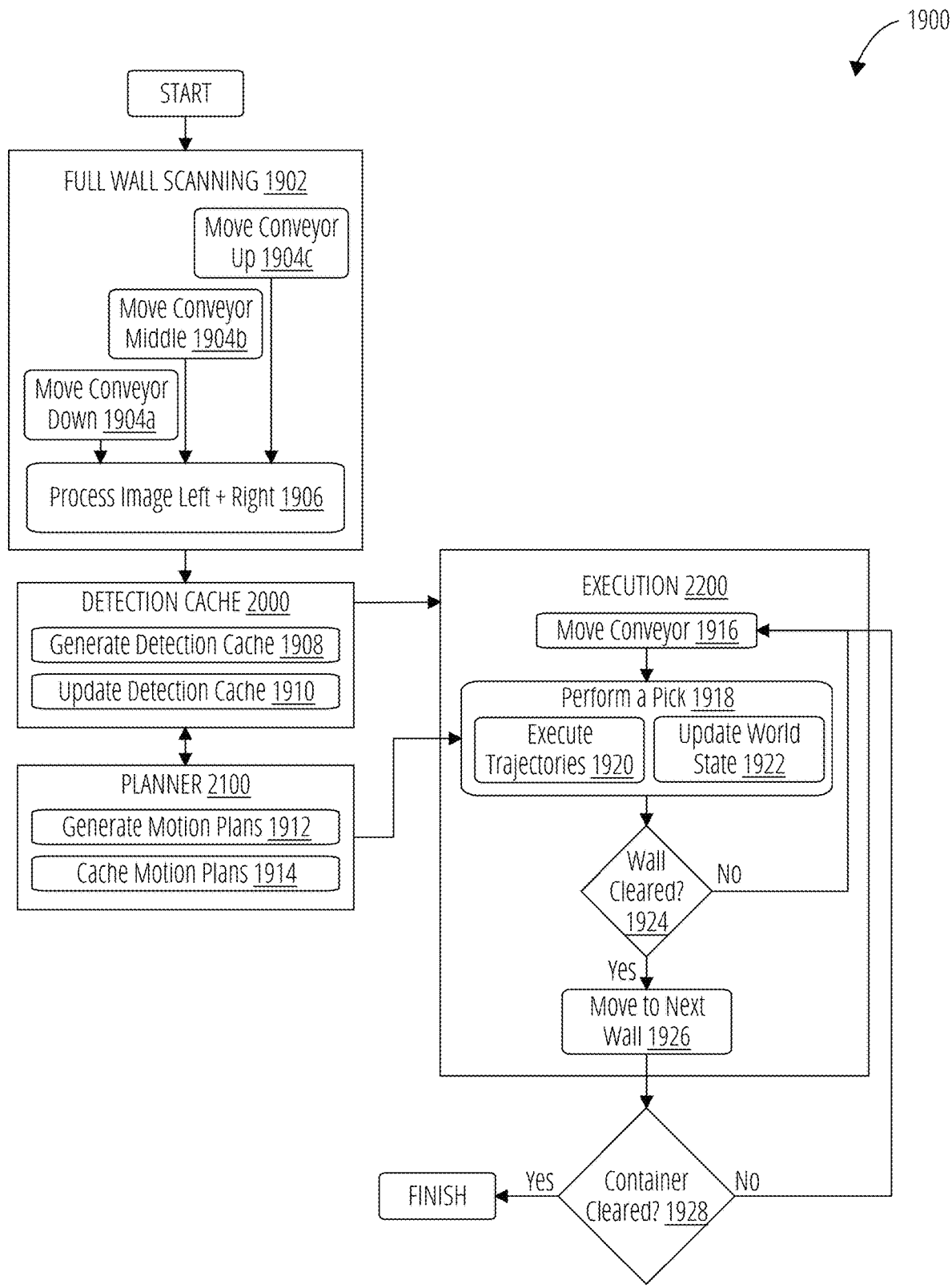
FIG. 19 illustrates an automated truck unloading flow diagram 1900 in accordance with one embodiment.

FIG. 19 illustrates an automated truck unloading flow diagram 1900 in accordance with one embodiment. The steps illustrated may be performed by the unloading control system 1300 described in FIG. 13. Broadly speaking, the automated truck unloading flow diagram 1900 indicates how the unloading control system 1300 may perform the automated truck unloading routine 1700 in one embodiment.

The automated truck unloading flow diagram 1900 may begin with a full wall scanning 1902 step. A move conveyor down 1904a step, a move conveyor middle 1904b step, and a move conveyor up 1904c step may be performed, each followed by a process left and right images 1906 step. In this manner, or in more or fewer similar steps, a full wall of MTBH may be scanned within a container.

After full wall scanning 1902 is complete, the flow of work may proceed to the detection cache flow diagram 2000. This is described in greater detail with respect to FIG. 20. Broadly speaking, the detection cache flow diagram 2000 may include generate detection cache 1908 steps and update detection cache 1910 steps.

Figure 21:
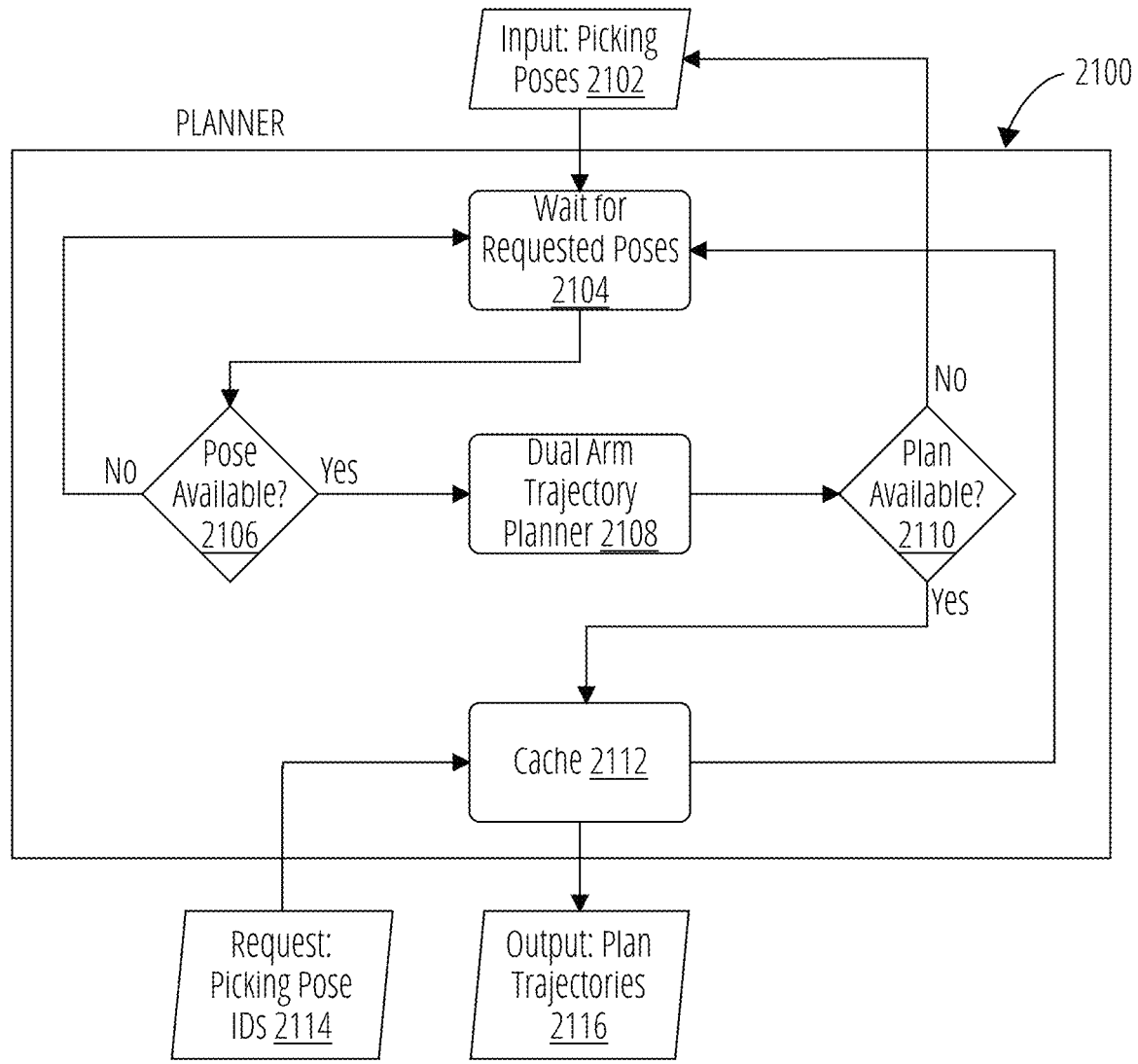
FIG. 21 illustrates a planner flow diagram 2100 in accordance with one embodiment.

Data generated during flow described in the detection cache flow diagram 2000 may be used by planner operations as described by planner flow diagram 2100 illustrated in FIG. 21. Through operation according to the planner flow diagram 2100, motions plans may be generated at a generate motion plans 1912 step, and may be cached at a cache motion plans 1914 step.

Figure 22:
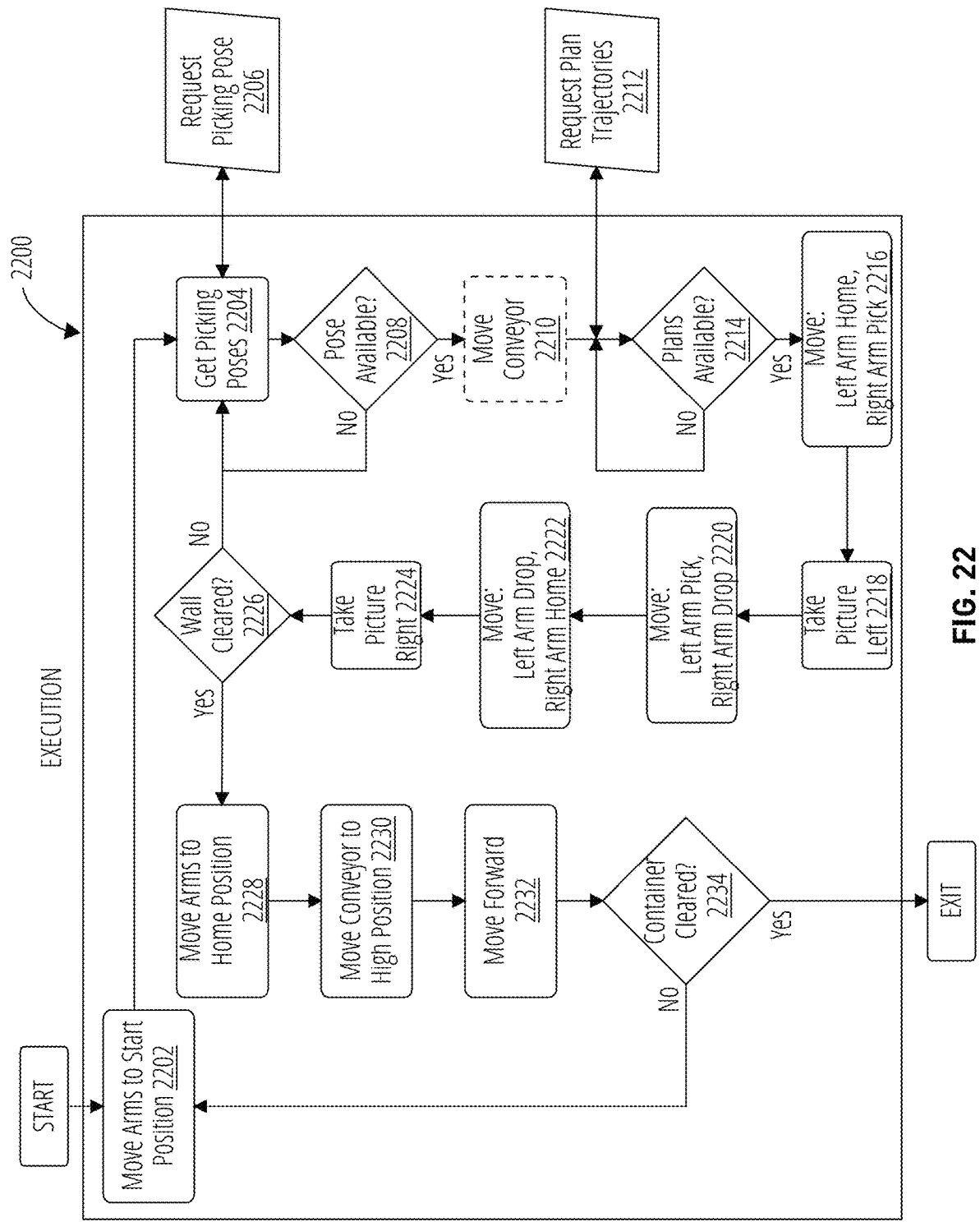
FIG. 22 illustrates an execution flow diagram 2200 in accordance with one embodiment.

Detection cache data from the detection cache flow diagram 2000 and planning data from the planner flow diagram 2100 may be provided for use during execution as described with respect to the execution flow diagram 2200 illustrated in FIG. 22. The execution flow diagram 2200 may proceed with a move conveyor 1916 step to locate robotics within proximity to perform a pick 1918, as indicated by motion plans generated through operation according to the planner flow diagram 2100. Completing the perform a pick 1918 step may include action to execute trajectories 1920 to contact the picking face and action to update world state 1922 based on changes incurred through the execute trajectories 1920 step. A wall cleared 1924 check may be made, and if the wall is not cleared, the execution flow diagram 2200 may return to the move conveyor 1916 step. If the wall is cleared, the execution flow diagram 2200 may proceed to move to next wall 1926. Execution flow diagram 2200 may continue as long as there is MTBH in the container. Execution may end when all walls are cleared, as determined at a container cleared 1928 check.

Figure 20:
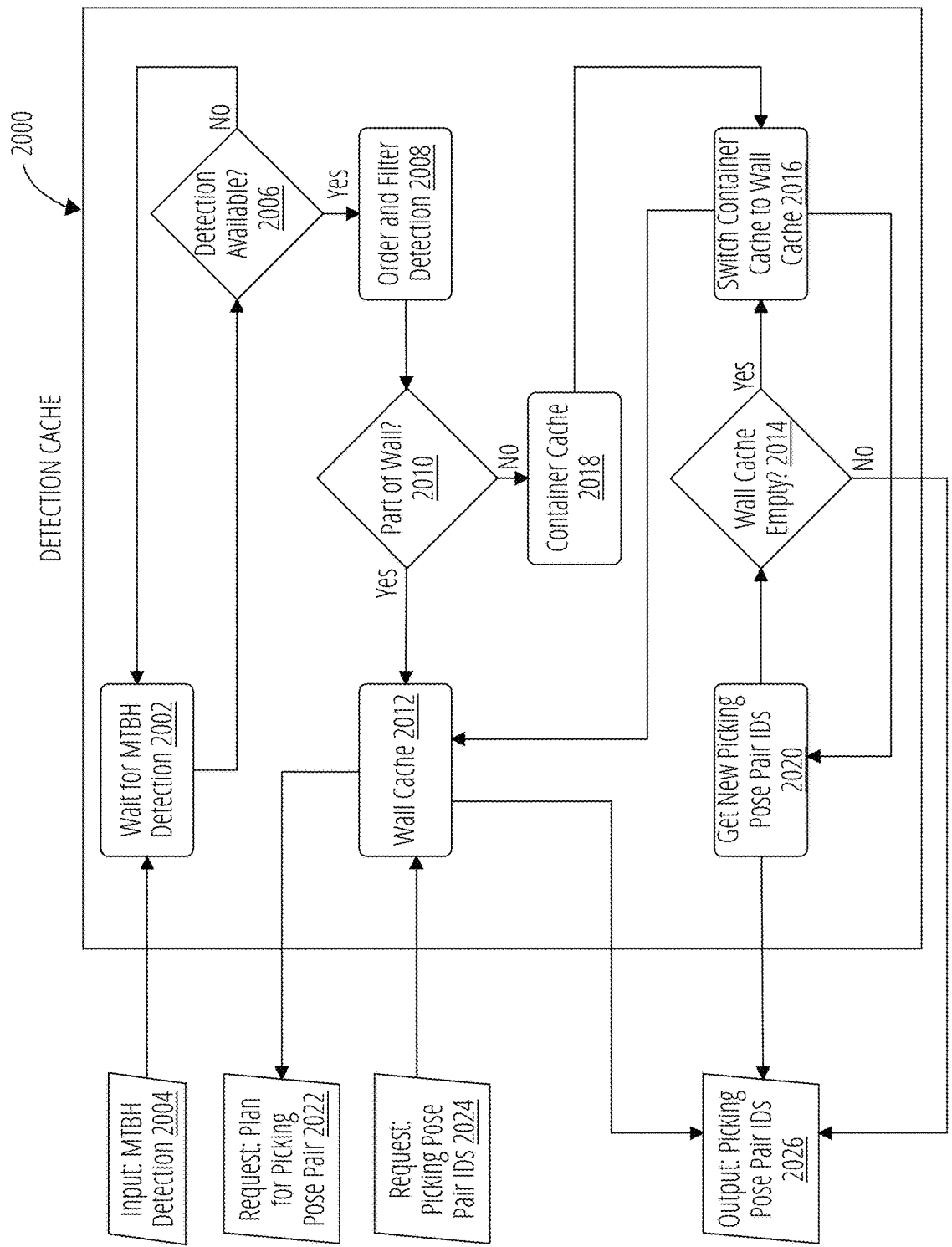
FIG. 20 illustrates a detection cache flow diagram 2000 in accordance with one embodiment.

FIG. 20 illustrates a detection cache flow diagram 2000 in accordance with one embodiment. The detection cache flow diagram 2000 may begin by waiting to receive data on MTBH detection 2002. The detection cache flow diagram 2000 may receive MTBH detection 2004 data based on analysis of image and point cloud data captured during perception scans. If at the detection available 2006 check, data is not available, the detection cache flow diagram 2000 will continue to wait. If available, an order and filter detection 2008 step may be performed.

MTBH detection data may contain information on material to be handled that corresponds to picking poses for gripping that material and segmentations of the paths to be traversed to achieve the picking poses. Picking poses refers to the position an articulated robot may need to achieve in order to grasp an item of MTBH. These picking poses for detected MTBH may or may not pertain to MTBH that is part of the scanned wall for which unloading is in progress. If the data is determined at the part of wall 2010 check, it may be saved in a wall cache 2012. If it is not part of the wall, it may be saved in container cache 2018.

The detection cache flow diagram 2000 may request a picking pose pair plan 2022 as output from the planner flow diagram 2100. A picking pose pair may refer to the two picking poses indicated for a coordinated action step by the two articulated robots. One of the pair of picking poses may be for execution by the left-hand articulated robot, while the other of the pair may be executed by the right-hand articulated robot. The picking pose pair plan may include a set of trajectories describing the movements each of the two articulated robots may need to perform to complete the next portion of a motion plan. The planner flow diagram 2100 may include acting to send a request for the identifiers (IDs) for the picking pose pair the plan has been requested for (picking pose pair IDs 2024) back to the detection cache. These picking pose pair IDs 2026 may be provided by the detection cache to the planner or to execution flow.

If the wall cache empty 2014 check indicates the wall cache is empty, the switch container cache to wall cache 2016 may be performed. At this point, a get new picking pose pair IDs 2020 task may be completed, and the picking pose pair IDs 2026 output.

For the following parameters:
d: vector of detections
wallCache: vector of all the detections that are close to the system
containerCache: vector of all the detections that do not belong in the wall cache
pseudocode corresponding to this detection cache flow diagram 2000 may be as follows:

```
When MTBH d are received
    Order and filter d - sort d by depth first, then top, then
from center
    if the d is close
        assign it to the wallCache
    else
        assign to the containerCache
When request for trajectories reference received
    check wallCache
    if wallCache empty
        wallCache equals containerCache
    go back to top
    return d IDs
For picking pose pair
    if there is no plan
        request plan with pair
    End For
```

The planner flow diagram 2100 may take as input a requested pair of picking poses from detection cache 2102. These are the picking poses for two different detections provided by the detection cache. The planner flow diagram 2100 may include a wait for requested poses 2104 if no poses are deemed available at the pose available 2106 check. If picking poses are available, the dual arm trajectory planner 2108 may act to determine a plan for the requested picking poses. If a plan available 2110 check indicates no plan is available, the planner may wait for the next request. In one embodiment, the planner may send a success or failure indication to the detection cache.

If a plan is available as determined at the plan available 2110 check, the send trajectory to cache 2112 step may be performed. The planner may request picking pose IDs from detection cache 2114, and may output plan trajectories for requested picking pose pair 2116. These are the generated trajectories. Each trajectory has three different sub-trajectories, namely: 1) Home, 2) Pick and 3) Drop. Each sub-trajectory of each arm may be synchronized in orchestration with the entire system, as described with respect to the execution flow diagram 2200 illustrated in FIG. 22.

For the following parameters:
p=<$p_l$, $p_r$>>: pair of picking poses requested
t=<$t_l$, $t_r$>: pair of planned trajectories
    pseudocode corresponding to this detection cache flow diagram 2000 may be as follows:

```
When p are received:
    assign p_l to left arm and p_r to right arm
    t =< t_l,t_r > = Create motion plan from t =< t_l,t_r >
    if t is not empty:
        cache t and assign a unique ID to it
        return with Plan successful
    else
        return with Plan failed
When queried with specific ID:
    return corresponding t
```

FIG. 22 illustrates an execution flow diagram 2200 in accordance with one embodiment. The execution flow diagram 2200 may begin with move arms to start position 2202, so that the articulated robot arms are in an intended initial position. This may be the same as a default home position for each articulated robot, or may be a pose optimized for the next expected action based on awareness of an entire motion plan and picking sequence. The execution flow diagram 2200 may get picking poses 2204 by sending a signal to request picking pose from detection cache 2206.

If a picking pose available 2208 indicates a picking pose is not available, the detection cache flow diagram 2000 may return to the get picking poses 2204 step. If a picking pose is available, the execution flow diagram 2200 may perform a move conveyor 2210 step if needed to move the loading conveyor between up, center, and down positions to bring the articulated robots into a position appropriate to the picking pose. The planner flow diagram 2100 may then request motion plan trajectories from planner 2212. A motion plans available 2214 check may indicate no plans are available, at which point the request motion plan trajectories from planner 2212 step may be repeated. If plans are available, these plans may be executed.

In one embodiment, executing the plans includes a first move left arm home, pick with right arm 2216 step, followed by a take picture to the left 2218 step. Next, a pick with left arm, drop with right arm 2220 step may be executed, followed by a drop with left arm, move right arm home 2222 step, then a take picture to the right 2224 step. Based on the pictures taken to the left and right, a wall cleared 2226 check may be performed. If it is determined that the wall has not been cleared, additional picking poses may be obtained.

If it is determined that the wall has been cleared, a move arms to home position 2228 step may be performed, followed by a move conveyor to high position 2230 step, then a move forward 2232 step. A container cleared 2234 check may be made. If the container has not been cleared, the execution flow diagram 2200 may return to the first move arms to start position 2202 step and repeat. If the container has been cleared, the execution flow diagram 2200 may be exited.

For the following parameters:
startPose: This is the start position of the arms (two arrays of six floats describing the joint configuration for each robot)
graspPoses: This is the pair of IDs for the grasp poses
homePose: This is the home position for the arms
dropPose: This is the six dimensional drop pose for the arms
pickPose: This is the pick position for the arms depending on the grasp pose
highPose: This is the highest position for the conveyor
wallCache: vector of all the detections that are close to the system
containerCache: vector of all the detections that do not belong in the wall cache
    pseudocode corresponding to this detection cache flow diagram 2000 may be as follows:

```
while containerCache not empty
    move arms to startPose
    while wallCache not empty
        query detection cache for next pair of graspPoses
        if one of graspPoses is above reachable space
            move conveyor up
        else if graspPoses are below reachable space
            move conveyor down
        endif
        while plan not available
            query for available plan for the graspPoses
        end while
        move left_arm homePose and right_arm pickPose
        take picture of scene with left camera
        move left_arm pickPose and right_arm dropPose
        move left_arm dropPose and right_arm homePose
        take picture of scene with right camera
    end while
    move both arms homePose
    move conveyor to highPose
    move forward
end while
```

FIG. 23 depicts an embodiment of a computing device 2300 to implement components and process steps of the systems described herein. Some or all portions of the computing device 2300 and its operational logic may be contained within the physical components of a robot, within a conventional desktop computer, within a computer server, and/or within a cloud server in communication with robotic and other computing devices. In one embodiment, aspects of the computing device 2300 on networked or cloud based computing platforms may provide control for more than one robot at a time, allowing multiple robots to work in concert within a working space such as a material handling facility.

Input devices 2304 of a robot, desktop computer, programmable logic controllers (PLCs), industrial personal computers (IPCs), etc., comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 2304 are contact sensors which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 2304 are provided via various machine signal conductors (e.g., busses or network interfaces) and circuits to memory 2306.

The memory 2306 is typically what is known as a first or second level memory device, providing for storage (via configuration of matter or states of matter) of signals received from the input devices 2304, instructions and information for controlling operation of the central processing unit or CPU 2302, and signals from storage devices 2310. The memory 2306 and/or the storage devices 2310 may store computer-executable instructions and thus forming logic 2314 that when applied to and executed by the CPU 2302 implement embodiments of the processes disclosed herein. Logic 2314 may include portions of a computer program, along with configuration data, that are run by the CPU 2302 or another processor. Logic 2314 may include one or more machine learning models 2316 used to perform or supplement performance of the disclosed actions.

Information stored in the memory 2306 is typically directly accessible to the CPU 2302 of the device. Signals input to the device cause the reconfiguration of the internal material/energy state of the memory 2306, creating in essence a new machine configuration, influencing the behavior of the computing device 2300 by configuring the CPU 2302 with control signals (instructions) and data provided in conjunction with the control signals.

Second or third level storage devices 2310 may provide a slower but higher capacity machine memory capability. Examples of storage devices 2310 are hard disks, optical disks, large capacity flash memories or other non-volatile memory technologies, and magnetic memories.

In one embodiment, memory 2306 may include virtual storage accessible through connection with a cloud server using the network interface 2312, as described below. In such embodiments, some or all of the logic 2314 may be stored and processed remotely.

The CPU 2302 may cause the configuration of the memory 2306 to be altered by signals in storage devices 2310. In other words, the CPU 2302 may cause data and instructions to be read from storage devices 2310 in the memory 2306 from which may then influence the operations of CPU 2302 as instructions and data signals, and from which it may also be provided to the output devices 2308. The CPU 2302 may alter the content of the memory 2306 by signaling to a machine interface of memory 2306 to alter the internal configuration, and then converted signals to the storage devices 2310 to alter its material internal configuration. In other words, data and instructions may be backed up from memory 2306, which is often volatile, to storage devices 2310, which are often non-volatile.

Output devices 2308 are transducers which convert signals received from the memory 2306 into physical phenomenon such as vibrations in the air, or patterns of light on a machine display, or vibrations (i.e., haptic devices) or patterns of ink or other materials (i.e., printers and 3-D printers).

The network interface 2312 receives signals from the memory 2306 and converts them into electrical, optical, or wireless signals to other machines, typically via a machine network. The network interface 2312 also receives signals from the machine network and converts them into electrical, optical, or wireless signals to the memory 2306. The network interface 2312 may allow a robot to communicate with networked desktop or server computing systems, a cloud server, a mobile device, other robots, and other network-enabled devices.

While this disclosure has been described with reference to illustrative embodiments, this description is not intended to be construed in a limiting sense. Various modifications and combinations of the illustrative embodiments as well as other embodiments of the disclosure will be apparent to persons skilled in the art upon reference to the description.

LISTING OF DRAWING ELEMENTS

100 automated unloading and palletizing routine
102 block
104 block
106 block
108 subroutine block
110 subroutine block
112 subroutine block
114 subroutine block
116 subroutine block
118 subroutine block
120 subroutine block
122 subroutine block
124 subroutine block
126 subroutine block
128 block
130 block
132 block
134 block
136 block
138 subroutine block
140 subroutine block
142 block
200 pallet load stabilizing routine
202 block
204 block
206 block
208 subroutine block
210 subroutine block
212 subroutine block
214 subroutine block
216 block
218 block
220 block
222 block
300 robotic unloading system
302 articulated robot
304 loading conveyor
306 grounded base
308 telescoping transport conveyor
310 scanning tunnel
312 sorting MHE
314 incline MHE
316 2-DOF MHE
318 automated palletizing system
320 empty pallet sleeve assembly
322 at least partially stacked pallet sleeve assembly
324 AMR
326 palletizing robot
328 palletizing robot support gantry
400 end-to-end system
402 MTBH
404 transportation container
406 material handling facility
408 docks
410 wrapped palletized unit load
412 operations team
500 automated unloader
502 first loading conveyor end 504 robot-mounted camera
506 end effector
508 robot base
510 second loading conveyor end
512 base support
514 grounded base pivot
516 wheels
518 tracks
520 loading conveyor pivot
522 translational actuator
524 mounting gantry
526 forward-sensing multidimensional sensor system
528 multi-channel inertia measurement system
530 sensor cutout
532 motor
534 industrial control box
600 robotic unloading system degrees of freedom
602 DOF
604 DOF
606 DOF
608 6 DOFs
700 primary frame of reference generation
702 2D camera and 3D camera
704 2D camera and 3D camera
706 field of view perception scan
708 field of view perception scan
710 area of overlap
712 frame of reference
714 frame of reference
716 primary frame of reference
800 MTBH calculated picking data
802 first wall of MTBH
804 second wall of MTBH
806 picking face
808 picking face
810 picking face
812 picking position
814 picking position
816 picking position
818 picking orientation
820 picking orientation
822 picking orientation
900 automated pallet load stabilization system
902 pallet dispenser
904 pallet
906 MHE
908 pallet sleeve
910 pallet sleeve lifter
912 support structure
914 actuator system
916 rotary pallet wrapping mechanism
918 rotary ring
920 automated forklift
922 empty pallet
924 wrapping material spool pin
1000 concurrent wrapping and lifting action
1002 pallet sleeve lifting action
1004 rotational wrapping actuation
1006 wrapping material spool pin lifting action
1008 rotational wrapping
1010 wrapping material
1100 pallet sleeve assembly
1102 lifting feature
1104 wear surface
1106 clearance hole
1108 sleeve wall
1200 automated crane storage and retrieval system
1202 pallet crane
1204 storage rack
1206 high bay pallet racking
1208 pickup location
1210 end stop
1212 queue
1214 additional drop-off location
1216 rails
1218 MHE
1220 pallet end-effector
1300 unloading control system
1302 perception systems
1304 industrial control systems
1306 computer system
1308 camera systems
1310 load cell
1312 pressure sensor
1314 other sensors
1316 pneumatics
1318 hydraulics
1320 encoders
1322 motors
1400 palletizing control system
1402 perception systems
1404 industrial control systems
1406 computer system
1408 camera systems
1410 load cell
1412 pressure sensor
1414 other sensors
1416 pneumatics
1418 hydraulics
1420 motors
1500 load stabilization control system
1502 perception systems
1504 industrial control systems
1506 computer system
1508 camera systems
1510 location sensor
1512 other sensors
1514 pneumatics
1516 hydraulics
1518 motors
1600 end-to-end control system diagram
1602 control communication
1604 mobile transport fleet manager
1606 wireless fleet control
1608 stored unloading data
1610 container inventory
1612 picking sequence
1614 picking rate
1616 stored palletization data
1618 incoming box sequence
1620 sortation logic
1622 pallet status
1624 current MTBH quantity per pallet
1626 flow control feedback loop
1628 rate
1630 rate data
1700 automated truck unloading routine
1702 block
1704 block
1706 block
1708 block
1710 decision block
1712 block
1714 block 1716 block
1718 block
1720 decision block
1722 block
1724 decision block
1726 block
1728 block
1730 decision block
1732 block
1800 pick routine for individual articulated robot
1802 block
1804 block
1806 block
1808 block
1810 block
1812 block
1814 block
1816 block
1818 block
1820 block
1822 block
1900 automated truck unloading flow diagram
1902 full wall scanning
1904a move conveyor down
1904b move conveyor middle
1904c move conveyor up
1906 process left and right images
1908 generate detection cache
1910 update detection cache
1912 generate motion plans
1914 cache motion plans
1916 move conveyor
1918 perform a pick
1920 execute trajectories
1922 update world state
1924 wall cleared
1926 move to next wall
1928 container cleared
2000 detection cache flow diagram
2002 waiting to receive data on MTBH detection
2004 MTBH detection
2006 detection available
2008 order and filter detection
2010 part of wall
2012 wall cache
2014 wall cache empty
2016 switch container cache to wall cache
2018 container cache
2020 get new picking pose pair IDs
2022 picking pose pair plan
2024 picking pose pair IDs
2026 picking pose pair IDs
2100 planner flow diagram
2102 requested pair of picking poses from detection cache
2104 wait for requested poses
2106 pose available
2108 dual arm trajectory planner
2110 plan available
2112 send trajectory to cache
2114 request picking pose IDs from detection cache
2116 output plan trajectories for requested picking pose pair
2200 execution flow diagram
2202 move arms to start position
2204 get picking poses
2206 request picking pose from detection cache
2208 picking pose available
2210 move conveyor
2212 request motion plan trajectories from planner
2214 motion plans available
2216 move left arm home, pick with right arm
2218 take picture to the left
2220 pick with left arm, drop with right arm
2222 drop with left arm, move right arm home
2224 take picture to the right
2226 wall cleared
2228 move arms to home position
2230 move conveyor to high position
2232 move forward
2234 container cleared
2300 computing device
2302 CPU
2304 input devices
2306 memory
2308 output devices
2310 storage devices
2312 network interface
2314 logic
2316 machine learning model

What is claimed is:

1. A method comprising:
positioning a robotic unloading system at an entrance of or within a transportation container, the transportation container including materials to be handled (MTBH);
the robotic unloading system including:
a telescoping transport conveyor;
an automated unloader attached to the telescoping transport conveyor, the automated unloader including:
a loading conveyor with a first loading conveyor end and a second loading conveyor end;
at least two articulated robots attached to the first loading conveyor end, wherein each articulated robot includes:
at least six degrees of freedom;
at least one of a 2D camera and a 3D camera;
robot joints; and
an end effector;
a grounded base including:
wheels or tracks;
a base support including a loading conveyor pivot, the base support attached to the second loading conveyor end; and
a translational actuator, wherein the loading conveyor pivot is configured to allow raising and lowering of the loading conveyor by extending or retracting the translational actuator;
a control system; and
logic to:
coordinate operation of the at least two articulated robots, wherein coordination includes position and movement of each robot and components of each robot, with respect to time;
perform a perception scan of at least a portion of a visible wall of materials to be handled (MTBH), wherein the perception scan captures a 2D image and a 3D image including 3D point cloud data of the MTBH;
build a six-degrees of freedom pose for each unit of MTBH, including:
analyze the 2D image to determine which segment of the 2D image belongs to each MTBH;

extrapolate for each unit of MTBH, at least one of size, orientation, origin of interest, and center of mass from the 2D image;
query the 3D image to obtain depth information, orientation of each MTBH in 3D, and dimensions of each side of each MTBH, as expressed in a field of view of at least one of the 2D camera and the 3D camera of each of the at least two articulated robots; and
for each of the at least two articulated robots, determine a frame of reference of the 2D camera and a frame of reference of the 3D camera as a function of a tilting angle of the loading conveyor and a position configuration of the robot joints;
determine a primary frame of reference of the automated unloader using at least one of the frame of reference of the 2D camera and the frame of reference of the 3D camera;
build a virtual representation of each unit of the MTBH detected in the perception scan, wherein the virtual representation creates six-degrees of freedom poses for each unit of MTBH with respect to the primary frame of reference of the automated unloader;
calculate picking poses comprising picking positions and picking orientations, wherein the picking positions are in the center of a face of each unit of MTBH, and the picking orientations are normal to one face of each unit of MTBH;
determine at least one motion plan using a search-based algorithm with inputs including at least one of:
the picking poses for each unit of MTBH;
minimization of torque on the robot motors;
minimization of motion path length; and
collision avoidance with other dynamic or static elements of a surrounding environment;
select a motion plan based on a scoring algorithm, wherein the scoring algorithm is based at least in part on picking poses of each unit of MTBH with respect to other units of MTBH;
determine a picking sequence based at least in part on:
the selected motion plan for each MTBH;
the picking poses of each unit of MTBH with respect to the other units of MTBH; and
coordinated operation of the at least two articulated robots;
execute the picking sequence; and
unloading the MTBH from the transportation container.

2. The method of claim 1, further comprising positioning the robotic unloading system further into the transportation container, after removing at least one visible wall of MTBH, to allow the at least two articulated robots access to remaining MTBH.

3. The method of claim 1, further comprising operating the robotic unloading system to unload remaining MTBH from the transportation container.

4. The method of claim 1,
the robotic unloading system further comprising a grounded base pivot rotationally coupling the grounded base to the base support, the grounded base pivot configured to allow the grounded base wheels or tracks to remain in contact with the ground;
the method further comprising applying downward force to the base support using the telescoping transport conveyor.

5. The method of claim 1, wherein attributes of the scoring algorithm further comprise at least one of the minimization of torque on the robot motors, the minimization of motion path length, position, velocity, acceleration, jerk, snap, trajectory normalized distance, and attributes related to configuration space, free space, target space, and obstacle space.

6. The method of claim 1, further comprising:
receiving unloaded MTBH from the transportation container into an automated palletizing system;
the automated palletizing system including:
at least one palletizing robot support gantry configured to receive at least one palletizing robot;
the at least one palletizing robot mounted to the at least one palletizing robot support gantry;
at least one pallet sleeve assembly under the at least one palletizing robot, the at least one pallet sleeve assembly including:
a pallet;
at least one pallet sleeve on the pallet, the at least one pallet sleeve comprising four structural walls;
wherein:
the at least one palletizing robot including an articulated arm with a palletizing robot end-effector, and is configured to:
receive units of MTBH, with the palletizing robot end-effector, that have been picked up by executing the picking sequence; and
deposit each unit of MTBH into the at least one pallet sleeve assembly until an at least partially stacked pallet sleeve assembly has been formed; and
operating the automated palletizing system to form at least partially stacked pallet sleeve assemblies.

7. The method of claim 4, further comprising:
receiving the at least partially stacked pallet sleeve assemblies into an automated pallet load stabilization system;
the automated pallet load stabilization system including:
a rotary pallet wrapping mechanism, comprising:
a support structure;
a rotary ring larger in diameter than the at least partially stacked pallet sleeve assembly, the rotary ring providing clearance for an actuator system around the at least partially stacked pallet sleeve assembly;
an actuator system with at least two-degrees of freedom, configured to traverse vertically along the support structure; and
a wrapping material spool pin attached to the actuator system, wherein the wrapping material spool pin is configured to hold a spool of wrapping material and dispense wrapping material from the spool of wrapping material onto MTBH units on the at least partially stacked pallet sleeve assemblies; and
a pallet sleeve lifter configured to lift the at least one pallet sleeve from the pallet;
the logic further comprising:
locate the at least partially stacked pallet sleeve assembly in a position appropriate for interfacing with the actuator system and the pallet sleeve lifter;
actuate the pallet sleeve lifter to interface with the pallet sleeve on the at least partially stacked pallet sleeve assembly and lift the pallet sleeve incrementally upward, thereby incrementally exposing the MTBH units for stretch-wrapping by the rotary pallet wrapping mechanism;
operate the actuator system with the wrapping material spool pin to travel in a spiral motion around the incrementally exposed MTBH units as the pallet sleeve lifter lifts the pallet sleeve, resulting in a wrapped palletized unit load and a fully elevated pallet sleeve;

operating the automated pallet load stabilization system to create the wrapped palletized unit load and the fully elevated pallet sleeve.

8. The method of claim 4, further comprising:
receiving the at least partially stacked pallet sleeve assemblies into an automated pallet load stabilization system;
the automated pallet load stabilization system including:
a rotary pallet wrapping mechanism, comprising:
a support structure;
a rotating base for receiving a pallet or the at least partially stacked pallet sleeve assembly;
an actuator system with at least two degrees of freedom, configured to traverse vertically along the support structure; and
a wrapping material spool pin attached to the actuator system, wherein the wrapping material spool pin is configured to hold a spool of wrapping material and dispense wrapping material from the spool of wrapping material; and
a pallet sleeve lifter configured to lift the at least one pallet sleeve from the pallet;
the logic further comprising:
locate the at least partially stacked pallet sleeve assembly on the rotating base in a position appropriate for interfacing with the actuator system and the pallet sleeve lifter;
actuate the pallet sleeve lifter to interface with the pallet sleeve on the at least partially stacked pallet sleeve assembly and lift the pallet sleeve incrementally upward, thereby incrementally exposing the MTBH units for stretch-wrapping by the rotary pallet wrapping mechanism; and
operate the actuator system with the wrapping material spool pin dispensing wrapping material in a spiral motion around the incrementally exposed MTBH units as the pallet sleeve lifter lifts the pallet sleeve, resulting in a wrapped palletized unit load and a fully elevated pallet sleeve;
operating the automated pallet load stabilization system to create the wrapped palletized unit load and the fully elevated pallet sleeve.

9. The method of claim 8,
wherein dispensing the wrapping material around the at least partially stacked pallet sleeve assembly is performed according to at least one of the:
number of wraps around the exposed MTBH units;
percent elongation over length of the wrapping material; and
offset between layers of wrapping material.

10. The method of claim 6, further comprising transporting the at least one partially stacked pallet sleeve assembly or the wrapped palletized unit load using an autonomous mobile robot (AMR).

11. The method of claim 10, further comprising:
operating an automated forklift configured to transport an empty pallet;
placing the empty pallet under the fully elevated pallet sleeve using the automated forklift;
lowering the fully elevated pallet sleeve onto the empty pallet to form an empty pallet sleeve assembly.

12. A robotic system comprising:
a telescoping transport conveyor;
an automated unloader attached to the telescoping transport conveyor, the automated unloader including:
a loading conveyor with a first loading conveyor end and a second loading conveyor end;
at least two articulated robots attached to the first loading conveyor end, wherein each articulated robot includes:
at least six degrees of freedom;
at least one of a 2D camera and a 3D camera;
robot joints; and
an end effector;
a grounded base including:
wheels or tracks;
a base support including a loading conveyor pivot, the base support attached to the second loading conveyor end; and
a translational actuator, wherein the loading conveyor pivot is configured to allow raising and lowering of the loading conveyor by extending or retracting
the translational actuator;
a control system; and
logic to:
coordinate operation of the at least two articulated robots, wherein coordination includes position and movement of each robot and components of each robot, with respect to time;
perform a perception scan of at least a portion of a visible wall of materials to be handled (MTBH), wherein the perception scan captures a 2D image and a 3D image including 3D point cloud data of the MTBH;
build a six-degrees of freedom pose for each unit of MTBH, including:
analyze the 2D image to determine which segment of the 2D image belongs to each MTBH;
extrapolate for each unit of MTBH, at least one of size, orientation, origin of interest, center of mass from the 2D image;
query the 3D image to obtain depth information, orientation of each MTBH in 3D, and dimensions of each side of each MTBH, as expressed in a field of view of at least one of the 2D camera and the 3D camera of each of the at least two articulated robots; and
for each of the at least two articulated robots, determine a frame of reference of the 2D camera and a frame of reference of the 3D camera as a function of a tilting angle of the loading conveyor and a position configuration of the robot joints;
determine a primary frame of reference of the automated unloader using at least one of the frame of reference of the 2D camera and the frame of reference of the 3D camera;
build a virtual representation of each unit of the MTBH detected in the perception scan, wherein the virtual representation creates six-degrees of freedom poses for each unit of MTBH with respect to the primary frame of reference of the automated unloader;
calculate picking poses comprising picking positions and picking orientations, wherein the picking positions are in the center of a face of each unit of MTBH, and the picking orientations are normal to one face of each unit of MTBH;
determine at least one motion plan using a search-based algorithm with inputs including at least one of:
the picking poses for each unit of MTBH;
minimization of torque on the robot motors;
minimization of motion path length; and
collision avoidance with other dynamic or static elements of a surrounding environment;

select a motion plan based on a scoring algorithm, wherein the scoring algorithm is based at least in part on picking poses of each unit of MTBH with respect to other units of MTBH;

determine a picking sequence based at least in part on:
the selected motion plan for each MTBH;
the picking poses of each unit of MTBH with respect to the other units of MTBH; and
coordinated operation of the at least two articulated robots; and execute the picking sequence.

13. The robotic system of claim 12, further comprising a grounded base pivot rotationally coupling the grounded base to the base support, the grounded base pivot configured to allow the grounded base wheels or tracks to remain in contact with the ground, wherein the telescoping transport conveyor is configured to apply downward force to the base support.

14. The robotic system of claim 12, wherein attributes of the scoring algorithm further comprise at least one of the minimization of torque on the robot motors, the minimization of motion path length, position, velocity, acceleration, jerk, snap, trajectory normalized distance, and attributes related to configuration space, free space, target space, and obstacle space.

15. The robotic system of claim 12, further comprising an automated palletizing system, the automated palletizing system including:
at least one palletizing robot support gantry configured to receive at least one palletizing robot;
the at least one palletizing robot mounted to the at least one palletizing robot support gantry;
at least one pallet sleeve assembly under the at least one palletizing robot, the at least one pallet sleeve assembly including:
a pallet;
at least one pallet sleeve on the pallet, the at least one pallet sleeve comprising four structural walls;
wherein:
the at least one palletizing robot including an articulated arm with a palletizing robot end-effector, and is configured to:
receive units of MTBH, with the palletizing robot end-effector, that have been picked up by executing the picking sequence; and
deposit each unit of MTBH into the at least one pallet sleeve assembly until an at least partially stacked pallet sleeve assembly has been formed.

16. The robotic system of claim 15, further comprising an automated pallet load stabilization system including:
a rotary pallet wrapping mechanism, comprising:
a support structure;
a rotary ring larger in diameter than the at least partially stacked pallet sleeve assembly, the rotary ring providing clearance for an actuator system around the at least partially stacked pallet sleeve assembly;
the actuator system with at least two-degrees of freedom, configured to traverse vertically inside the rotary ring; and
a wrapping material spool pin attached to the actuator system, wherein the wrapping material spool pin is configured to hold a spool of wrapping material and dispense wrapping material from the spool of wrapping material;
a pallet sleeve lifter configured to lift the at least one pallet sleeve from the pallet;
the logic further comprising:
locate the at least partially stacked pallet sleeve assembly in a position appropriate for interfacing with the rotary ring;
actuate the pallet sleeve lifter to interface with the pallet sleeve on the at least partially stacked pallet sleeve assembly and lift the pallet sleeve incrementally upward, thereby incrementally exposing the MTBH units for stretch-wrapping by the rotary pallet wrapping mechanism;
operate the actuator system with the wrapping material spool pin to travel in a spiral motion around the incrementally exposed MTBH units as the pallet sleeve lifter lifts the pallet sleeve, resulting in a wrapped palletized unit load and a fully elevated pallet sleeve.

17. The robotic system of claim 15, further comprising an automated pallet load stabilization system including:
a rotary pallet wrapping mechanism, comprising:
a support structure;
a rotating base for receiving a pallet or the at least partially stacked pallet sleeve assembly;
an actuator system with at least two-degrees of freedom, configured to traverse vertically along the support structure inside the rotary ring; and
a wrapping material spool pin attached to the actuator system, wherein the wrapping material spool pin is configured to hold a spool of wrapping material and dispense wrapping material from the spool of wrapping material;
a pallet sleeve lifter configured to lift the at least one pallet sleeve from the pallet;
the logic further comprising:
locate the at least partially stacked pallet sleeve assembly on the rotating base in a position appropriate for interfacing with the actuator system and the pallet sleeve lifter;
actuate the pallet sleeve lifter to interface with the pallet sleeve on the at least partially stacked pallet sleeve assembly and lift the pallet sleeve incrementally upward, thereby incrementally exposing the MTBH units for stretch-wrapping by the rotary pallet wrapping mechanism;
operate the actuator system with the wrapping material spool pin to dispense wrapping material in a spiral motion around the incrementally exposed MTBH units as the pallet sleeve lifter lifts the pallet sleeve, resulting in a wrapped palletized unit load and a fully elevated pallet sleeve.

18. The robotic system of claim 16, the logic further comprising:
dispense the wrapping material according to at least one of:
number of wraps around the exposed MTBH units;
percent elongation over length of the wrapping material; and
offset between layers of wrapping material.

19. The robotic system of claim 16, further comprising:
an autonomous mobile robot (AMR) configured to transport the at least partially stacked pallet sleeve assembly or the wrapped palletized unit load.

20. The robotic system of claim 19, further comprising:
an automated forklift configured to transport an empty pallet;
the logic further comprising;
place the empty pallet under the fully elevated pallet sleeve using the automated forklift;

lower the fully elevated pallet sleeve onto the empty pallet to form an empty pallet sleeve assembly.

\* \* \* \* \*